US011820536B2

(12) United States Patent
Tsuboi et al.

(10) Patent No.: US 11,820,536 B2
(45) Date of Patent: Nov. 21, 2023

(54) INTERFERENCE POWER ESTIMATION METHOD, INTERFERENCE POWER ESTIMATION APPARATUS AND PROGRAM

(71) Applicant: NIPPON TELEGRAPH AND TELEPHONE CORPORATION, Tokyo (JP)

(72) Inventors: Hideyuki Tsuboi, Musashino (JP); Yutaka Imaizumi, Musashino (JP); Kazuto Goto, Musashino (JP); Kota Ito, Musashino (JP); Naoki Kita, Musashino (JP); Hiroyuki Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 305 days.

(21) Appl. No.: 17/279,649

(22) PCT Filed: Sep. 2, 2019

(86) PCT No.: PCT/JP2019/034343
§ 371 (c)(1),
(2) Date: Mar. 25, 2021

(87) PCT Pub. No.: WO2020/066470
PCT Pub. Date: Apr. 2, 2020

(65) Prior Publication Data
US 2022/0035043 A1    Feb. 3, 2022

(30) Foreign Application Priority Data
Sep. 28, 2018    (JP) ................................ 2018-183559

(51) Int. Cl.
*B64G 3/00*        (2006.01)
*B64G 1/66*        (2006.01)
(Continued)

(52) U.S. Cl.
CPC ................. *B64G 3/00* (2013.01); *B64G 1/66* (2013.01); *H04W 52/243* (2013.01); *B64G 1/1021* (2013.01)

(58) Field of Classification Search
CPC .......... B64G 3/00; B64G 1/66; B64G 1/1021; B64G 1/242; H04W 52/243; H04B 17/345
See application file for complete search history.

(56) References Cited

U.S. PATENT DOCUMENTS

2004/0024756 A1 *  2/2004  Rickard ................ G06F 16/907
2008/0103695 A1 *  5/2008  Whiting ............... G01C 21/203
                                                        701/469

FOREIGN PATENT DOCUMENTS

EP    1197099 B1 *  11/2005  ......... H04B 7/18504

OTHER PUBLICATIONS

Meaning and explanation of typical orbits of artificial satellites, Weblio dictionary, Aug. 2, 2018 (Reading Day), https://www.weblio.jp/content/ Representative Orbits of Satellites [Aug. 2, 2018 17:52:55].

(Continued)

*Primary Examiner* — John J Lee
(74) *Attorney, Agent, or Firm* — Harness, Dickey & Pierce, P.L.C.

(57) ABSTRACT

A projection unit (12) of an interference power estimation device (1) projects an orbit of a satellite onto a map representing a ground surface. A range acquisition unit (13) determines a plurality of ranges on the map so that the projected orbit is included in the ranges. An altitude calculation unit (14) calculates an altitude of the orbit of the satellite in each of the ranges. A range interference calculation unit (16) calculates, for each of the ranges, an interference power between the satellite at a position determined by a latitude and a longitude of the range and the altitude calculated for the range and a radio station installed on the (Continued)

ground surface. An estimation result calculation unit (17) selects, as an estimation result, a maximum value among the interference powers calculated for each of the ranges.

11 Claims, 26 Drawing Sheets

(51) Int. Cl.
*H04W 52/24* (2009.01)
*B64G 1/10* (2006.01)

(56) References Cited

OTHER PUBLICATIONS

International Frequency Policy Office, Radio Policy Division, Radio Department, General Communication Infrastructure Bureau, Ministry of Internal Affairs and Communications, International adjustment of frequencies in small satellites, Radio wave use homepage, Jul. 26, 2009, p. 5.

* cited by examiner

Fig. 23

STATION DB EDIT

◉ GROUND STATION  ○ SATELLITE  ○ OTHER THAN COMMUNICATION SYSTEM  ○ INTERFERENCE PROVIDING STATION  ○ INTERFERENCE RECEIVING STATION

STATION NAME: STATION 4

LATITUDE: 35.73XX   LONGITUDE: 139.94XX   ALTITUDE: [  ] km

---SYSTEM DATA---

FREQUENCY BAND: 2GHz ▾   SYSTEM NAME: SYSTEM 23 ▾

DEVICE TYPE: [  ] ▾   POLARIZATION: VERTICAL ▾   TRANSMISSION BANDWIDTH: 0.1 GHz ▾

TRANSMISSION POWER: 20 dBmV ▾    [DISPLAY FILTER CHARACTERISTICS]

INTERFERENCE RECEPTION REQUIRED I/N: 10 dB

---ANTENNA DATA---

─ANTENNA (TRANSMISSION)─

ANTENNA NAME: B ▾    ANTENNA GAIN: 13 dBi    [DISPLAY ANTENNA PATTERN]

ANTENNA AZIMUTH ANGLE: 38 deg    [←] OPPOSITE STATION

ANTENNA GROUND HEIGHT: 30 m    ANTENNA ELEVATION ANGLE: 0 deg

─ANTENNA (RECEPTION)─

ANTENNA NAME: A ▾    ANTENNA GAIN: 5 dBi    [DISPLAY ANTENNA PATTERN]

ANTENNA AZIMUTH ANGLE: 76 deg    [←] OPPOSITE STATION

ANTENNA GROUND HEIGHT: 27 m    ANTENNA ELEVATION ANGLE: -3 deg

[SAVE]   [CANCEL]

INTERFERENCE POWER ESTIMATION METHOD, INTERFERENCE POWER ESTIMATION APPARATUS AND PROGRAM

CROSS-REFERENCE TO RELATED APPLICATIONS

This application is a 371 U.S. National Phase of International Application No. PCT/JP2019/034343 filed on Sep. 2, 2019, which claims priority to Japanese Application No. 2018-183559 filed on Sep. 28, 2018. The entire disclosures of the above applications are incorporated herein by reference.

TECHNICAL FIELD

The present invention relates to an interference power estimation method, an interference power estimation device, and a computer program.

BACKGROUND ART

According to information (refer to Non-Patent Literature 1, for example) of major artificial satellite orbits, satellite orbits are roughly classified into orbits of a geostationary satellite and an circulating satellite, and the orbit of the circulating satellite is further classified into, for example, a synchronous orbit, a recurrent orbit, a sub-recurrent orbit, a polar orbit, a sun synchronous orbit, and a combination of these orbits (such as a combination of the sun synchronous orbit and the sub-recurrent orbit).

FIG. 20 is a diagram illustrating the orbit of a geostationary satellite and the orbit of a circulating satellite as some examples of various satellite orbits. Hereinafter, the origin O of an XYZ space is defined to be the center of the Earth. The Z axis extends through the North Pole and the South Pole, and the XY plane vertical to the Z axis is the equatorial plane passing through the equator. FIG. 20($a$) illustrates the orbit of the geostationary satellite. The orbit of the geostationary satellite is an orbit through which the artificial satellite completes revolution around the Earth in 24 hours or revolution directly above the equator in 24 hours in accordance with rotation of the Earth, which is completed once in 24 hours. Specifically, the orbit of the geostationary satellite is shaped in a circle centered at the Earth at the altitude of 35,800 km, and the satellite constantly moves on the circle at constant speed. When viewed from the ground, the geostationary satellite is always stationary at one point in the overhead space. For example, to constantly observe the Japanese archipelago and its periphery, the weather observation satellite "Himawari" (Reference Literature 1) is positioned at the altitude of 35,800 km and the east longitude of 140.7° above the equator as a geostationary satellite orbit.

(Reference Literature 1): "Artificial Satellite Himawari 8 and 9", [online], [Sep. 13, 2018 search], Mitsubishi Electric Corporation, the Internet <URL: http://www.mitsubishielectric.co.jp/society/space/satellite/observation/himawari8-9.html>

FIG. 20($b$) illustrates the orbit of a recurrent satellite as an exemplary orbit of the circulating satellite. The recurrent satellite completes revolution around the Earth in 24/N hours while rotation of the Earth is completed once in 24 hours.

The number N is an integer. Specifically, the recurrent satellite completes N revolutions around the Earth and returns to the original position in one day. The orbit of the circulating satellite illustrated in FIG. 20($b$) is an ellipse, and the Earth is positioned at one of the two foci of the ellipse. The satellite flies fast on the orbit closest to the Earth (on the perigee altitude side) and flies slow on the orbit far from the Earth (on the apogee altitude side). A small-sized low-earth-orbit satellite, which has recently become popular, or the like is placed on the orbit of the recurrent satellite and returned to a determined position at least once per day to perform transmission to and reception from a ground station, thereby communicating observed information with a command control facility on the ground and receiving an observation instruction from the ground.

Non-Patent Literature 2 discloses that a satellite station and an earth station interfere with ground professional-use radio stations in other countries in some cases. In particular, a small-sized satellite is not a geostationary satellite and orbits around the Earth across borders. In addition, the launch cost of such a small-sized satellite tends to decrease. As a result, it is expected that the number of small-sized satellites increases in the near future. Thus, it is thought that wireless communication between such a small-sized satellite (satellite station) and an earth station interferes with ground professional-use radio stations in other countries, and the frequency of occurrence of a situation affected by the interference increases. It will become more important to perform preliminary interference evaluation for evaluating and calculating in advance the power (amount) of such interference between a satellite station and other radio station and checking that the influence of interference of the satellite station on other ground radio stations would cause no problem.

CITATION LIST

Non-Patent Literature

Non-Patent Literature 1: "Weblio dictionary>academic>space encyclopedia>meaning and explanation of typical artificial satellite orbit", [online], Weblio, Inc., [Aug. 2, 2018 search], the Internet <URL: https://www.weblio.jp/content/%E4%BA%BA%E5%B7%A5%E8%A19B%E6%98%9F%E3%81%AE%E4%BB%A3%E8%A1%%A8%E7%9A%84%E3%81%AA%E8%BB%8C%E9%81%93>

Non-Patent Literature 2: "International regulation of small-sized satellite frequencies", interference kind to interference with ground professional-use radio station, [online], Jul. 26, 2009, International Frequency Policy Office, Radio Department, Telecommunication Bureau, Ministry of Internal Affairs and Communications, [Aug. 2, 2018 search], the Internet <URL: http://www.unisec.jp/library/2009generalassenbly/2009_06. pdf>, p. 5

SUMMARY OF THE INVENTION

Technical Problem

Although a satellite can travel on various orbits as described above, it is requested to accurately estimate the interference power between the satellite and a ground radio station irrespective of satellite orbits to perform interference evaluation.

The present invention is intended to fulfill the above-described request and provide an interference power estimation method, an interference power estimation device, and a computer program that can accurately estimate the interference power between a satellite and a ground radio station irrespective of satellite orbits.

Means for Solving the Problem

An interference power estimation method according to an aspect of the present invention includes: a projection step of projecting an orbit of a satellite onto a map representing a ground surface; a range acquisition step of determining a plurality of ranges on the map so that the projected orbit is included in the ranges; an altitude calculation step of calculating an altitude of the orbit in each of the ranges; a range interference calculation step of calculating, for each of the ranges, interference power between the satellite at a position determined by a latitude and a longitude of the range and the altitude calculated for the range and a radio station installed on the ground surface; and a selection step of selecting, as an estimation result, a maximum value among the interference powers calculated for each of the ranges.

In the above-described interference power estimation method according to another aspect of the present invention, at the altitude calculation step, when the orbit is a circular orbit, the altitude in each of the ranges is a constant altitude set in advance, and when the orbit is an elliptical orbit, the altitude in the range onto which the orbit at a lowest altitude is projected is a perigee altitude of the elliptical orbit, and the altitude in each of other ranges is a lowest altitude on the orbit in an overhead space of the range.

The above-described interference power estimation method according to another aspect of the present invention further includes a range combination step of obtaining one or more combinations of the ranges, in overhead spaces of which a plurality of the satellites exist at the same timing, and the selection step calculates, for each combination, a sum of the interference powers calculated for the ranges included in the combination and selects, as the estimation result, a maximum value among the sums calculated for the respective combinations.

The above-described interference power estimation method according to another aspect of the present invention includes: a determination step of determining a kind of the orbit; a first estimation result calculation step of specifying, when the orbit is determined to be of a geostationary satellite at the determination step, a position of the satellite based on an arbitrarily set longitude and predetermined latitude and altitude of the geostationary satellite and calculating, as the estimation result, an interference power between the satellite at the specified position and the radio station; a second estimation result calculation step of acquiring, when the orbit is determined to be a polar orbit at the determination step, a plurality of positions at which the satellite can be located across whole sky based on an arbitrarily set altitude, calculating interference power between the satellite at each acquired position and the radio station, and setting, as the estimation result, a maximum value among the interference powers calculated for the respective positions; and a third estimation result calculation step of performing the projection step, the range acquisition step, the altitude calculation step, the range interference calculation step, and the selection step when the orbit is an orbit of a circulating satellite other than a polar orbital satellite.

In the above-described interference power estimation method according to another aspect of the present invention, each range determined at the range acquisition step is a rectangle smaller than a rectangle including the entire orbit projected onto the map and contacts other ranges.

An interference power estimation device according to another aspect of the present invention includes: a projection unit configured to project an orbit of a satellite onto a map representing a ground surface; a range acquisition unit configured to determine a plurality of ranges on the map so that the projected orbit is included in the ranges; an altitude calculation unit configured to calculate an altitude of the orbit in each of the ranges; a range interference calculation unit configured to calculate, for each of the ranges, interference power between the satellite at a position determined by a latitude and a longitude of the range and the altitude calculated for the range and a radio station installed on the ground surface; and a selection unit configured to select, as an estimation result, a maximum value among the interference powers calculated for each of the ranges.

A computer program according to another aspect of the present invention causes a computer to execute any of the above-described interference power estimation methods.

Effects of the Invention

According to the present invention, it is possible to accurately estimate interference power between a satellite and a ground radio station irrespective of satellite orbits.

BRIEF DESCRIPTION OF DRAWINGS

FIG. 23 is a diagram illustrating a radio station condition setting screen at an interference calculation tool according to the related technology.

DESCRIPTION OF EMBODIMENTS

Embodiments of the present invention will be described below in detail with reference to the accompanying drawings. Hereinafter, a string (for example, X) denoted by → above to represent a vector is written as "(X)→".

Evaluation of interference between a satellite and a ground station is performed by, for example, calculating interference power (interference amount) therebetween. The ground station is a radio station installed on the ground (ground surface). In a related technology of the present embodiment, the maximum amount of interference between a satellite station and a ground station in a range is calculated by a method illustrated in FIGS. 21 and 22. The satellite station is a radio station included in a satellite. Thus, the position of the satellite is the position of the satellite station, and interference from the satellite can be regarded as interference from the satellite station.

Figure 21:
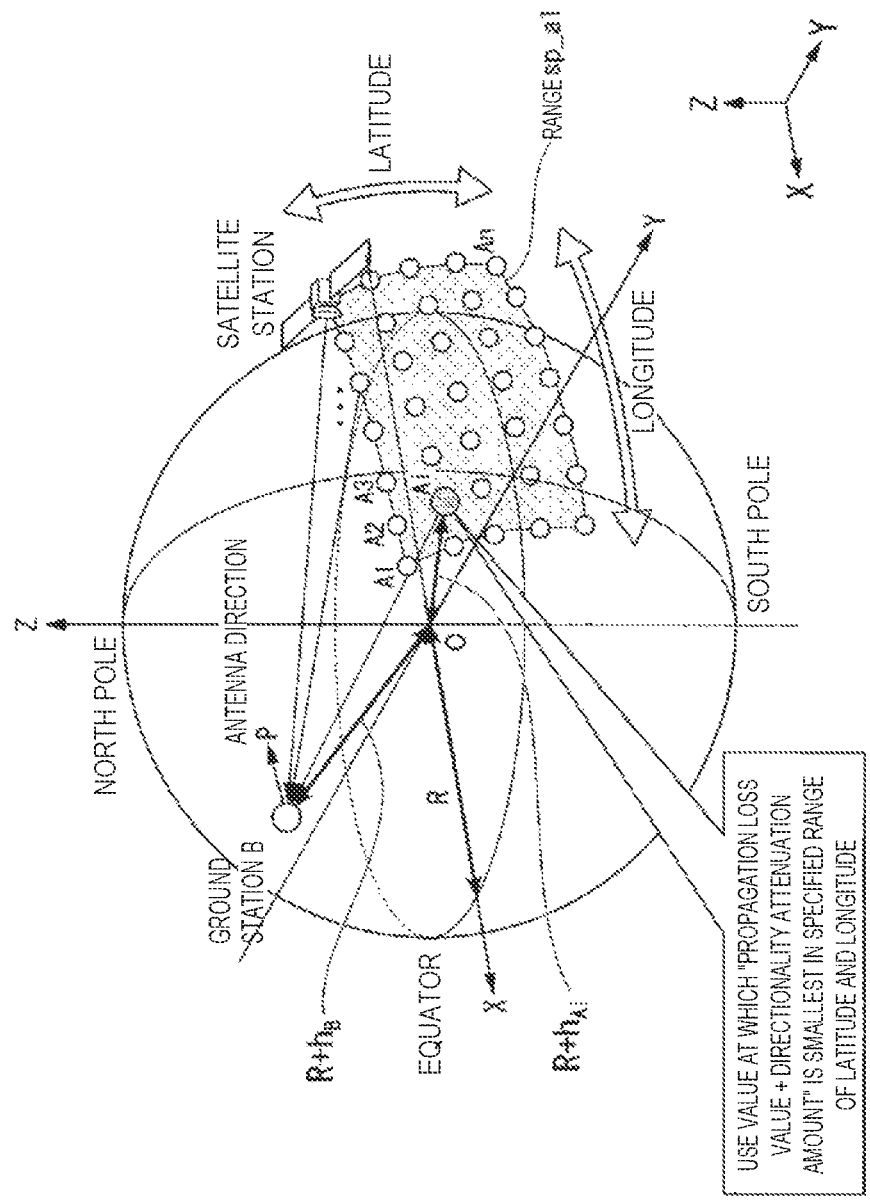
FIG. 21 is a diagram illustrating calculation of interference between a satellite station and a ground station according to the related technology.

FIG. 21 is a diagram illustrating calculation of interference between a satellite station and a ground station according to the related technology of the present embodiment. Assume that the satellite station is in a range sp_a1 specified by a latitude and a longitude specified at an altitude. A satellite station $A_i$ (i=1, 2, 3, . . . , n) is a satellite station at the i-th position i in the range sp_a1. An interference power estimation device calculates the distance and direction between the satellite station $A_i$ (i=1, 2, 3, . . . , n) in the assumed range sp_a1 and a ground station B, the position of which on the ground is specified. In this calculation, an antenna pattern (directionality) in an antenna direction (BP)→ of the ground station B is considered. The interference power estimation device calculates "propagation loss value+directionality attenuation amount" of each satellite station $A_i$ based on the distance and direction between the satellite station $A_i$ and the ground station B, which are obtained by the calculation. The interference power estimation device calculates a maximum interference amount (worst value) by using the value of the position of the satellite station $A_i$ when the "propagation loss value+directionality attenuation amount" is minimum.

Figure 22:
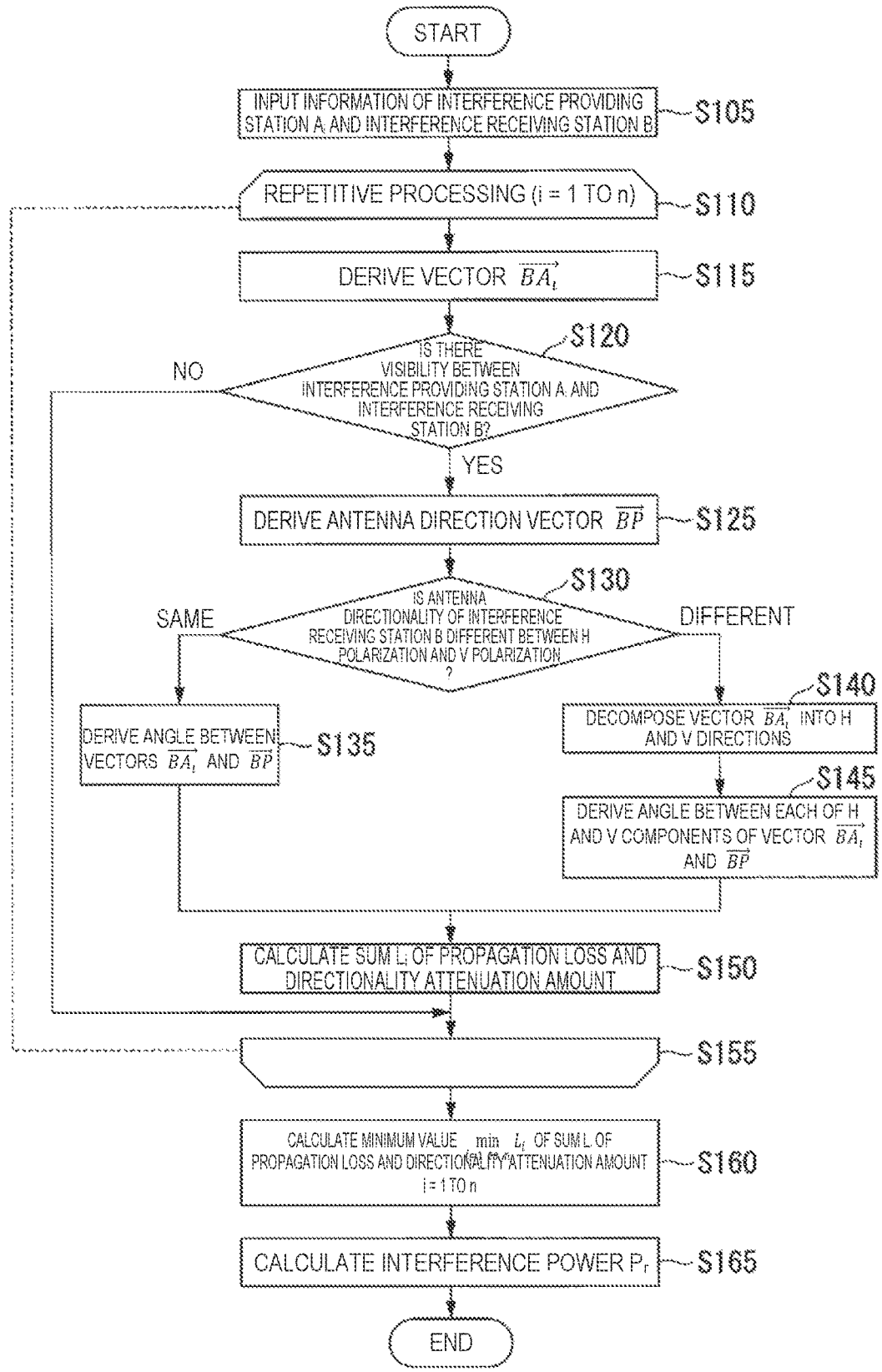
FIG. 22 is a flowchart illustrating the procedure of interference calculation executed by an interference power estimation device according to the related technology.

FIG. 22 is a flowchart illustrating the procedure of interference calculation executed by the interference power estimation device according to the related technology of the present embodiment. The related technology is, for example, a technology disclosed in Japanese Patent Application No. 2018-055340. In this schematic flow of interference power estimation processing, an interference providing station $A_i$ (i=1 to n) is a moving satellite station, and an interference receiving station B is a ground station. Calculation of the distance and direction (vector $(BA_i)$→) between the interference providing station $A_i$ and the interference receiving station B is repeated for each of a plurality of positions i (i=1 to n) in the range sp_a1 in which the interference providing station $A_i$ (satellite station) exists. Then, an interference power (interference amount) $P_r$ is calculated with taken into account the distances and directions obtained from the vectors $(BA_i)$→. In this calculation of the interference power $P_r$ (interference amount), a sum $L_i$ (i=1 to n) of "propagation loss value+directionality attenuation amount" is calculated for each interference providing station $A_i$ (steps S110 to S155), and the interference power $P_r$ (interference amount) is calculated based on a minimum value min$L_i$ (i=1 to n) among the sums (steps S160 to S165).

Additional description is given for the above-described sum $L_i$. In the procedure illustrated in FIG. 22, the interference power estimation device calculates the amount of interference between the satellite station $A_i$ and the ground station B for each of a plurality of positions i (i=1 to n) in the range in which the satellite station is assumed to exist. In this calculation, the propagation loss value in accordance with the distance between the satellite station $A_i$ and the ground station B and the amount of antenna directionality attenuation that occurs due to the difference between the antenna direction of the ground station B and the direction in which the satellite station $A_i$ exists are mainly used. Thus, the above-described sum $L_i$ is calculated by summing the propagation loss value and the directionality attenuation amount described above for the satellite station $A_i$ at each position. In the procedure illustrated in the drawing, calculation that obtains the interference amount in this manner is performed for the satellite station $A_i$ (i=1 to n) at all positions in the specified range sp_a1.

In the procedure illustrated in the drawing, visibility between the satellite station (interference providing station $A_i$) and the ground station (interference receiving station B) is checked, and when the satellite station is hidden by the horizon of the Earth, no interference calculation is executed to reduce the amount of calculation (step S120). In addition, in the procedure illustrated in the drawing, the antenna direction (vector (BP)→) of the ground station (interference receiving station B), the direction (vector $(BA_1)$→) of the satellite station with respect to the ground station, and H and V components of the antenna directionality of the ground station are considered (steps S125, S135, and S145).

FIG. 23 is a diagram illustrating a radio station condition setting screen at an interference calculation tool according to the related technology. The related technology is, for example, a technology disclosed in Japanese Patent Application No. 2018-055323. The condition setting screen is a screen on which information related to a radio station is edited. Station types are "ground station", "satellite", and "other than communication system", the condition setting screen allows inputting, setting, and registration of information related to stations of these types. Although the drawing illustrates an exemplary state in which "ground station" is selected, a user can select "satellite" to set information related to a radio station (satellite station) of the satellite. In addition, as illustrated in the drawing, for a selected radio station, a "station name", a position at which the radio station exists, and system data of the radio station can be set through the condition setting screen in a roughly divided manner. Wireless electric characteristics and antenna data can be set as the system data.

When conditions of the radio station (satellite station) of the satellite are set, the system data needs to be set, but the antenna direction is not necessarily fixed in the case of the satellite station, and thus an operator does not set the antenna data but only sets transmission electric power as an electric property. In the condition setting of the satellite station, it is important to set a position at which the station exists (the orbit of the satellite). Three parameters of the latitude, the longitude, and the altitude can be registered as the position of the station (satellite) through the condition setting screen. The latitude and the longitude can specify a range in which the satellite exists. A range having a latitude, a longitude, and an altitude specified in this manner corresponds to the range sp_a1 of the satellite station $A_i$ (i=1 to n) illustrated in FIG. 21.

Problems exist in part of the method of calculating the amount of interference between a satellite and a ground station as illustrated in FIGS. 21, 22, and 23. Specifically, problems as follows occur depending on the orbit of the satellite when one satellite range is specified to calculate interference between the satellite and the ground radio station.

(1) A significantly wide range is specified depending on the orbit of the satellite when one satellite range is specified to evaluate interference between the satellite and the ground radio station as in the above-described related technology. When the satellite is assumed to exist in the specified wide range, a position different from a position on the actual orbit can be included in the range, and the result of interference calculation can be worst (the amount of interference can be largest) at the position different from a position on the actual orbit.

(2) When one existence range of the satellite is specified so that the orbit of the satellite is included in the range, the altitude can be largely different between a satellite position (lowest altitude) assumed when interference is calculated by using the above-described related technology and the actual satellite position, particularly when the satellite has an elongated elliptical orbit. Thus, the interference amount as a result of calculation using the lowest altitude of the related technology potentially largely deviates from the actual interference amount as the worst value.

(3) A low-earth-orbit satellite or the like cannot fly as if stopping in the overhead space for a long time when viewed from a place on the ground. Thus, a plurality of satellites provide the same service in a temporally switching manner. When such a multi-satellite system interferes with a radio station on the ground, interference of a plurality of satellites at the same time needs to be calculated. However, the existence range of each satellite, which is assumed when interference is calculated, is wide in the related technology. Accordingly, the sum of interference amounts obtained through interference calculation of the satellites by the related technology is significantly larger than the interference amounts from an actual multi-satellite system.

To solve the above-described problems, the interference power estimation device of the present embodiment performs interference power estimation by solutions as follows.

[Solution 1] The interference power estimation device performs interference calculation through procedures as follows to evaluate interference between a satellite and a ground station as a radio station on the Earth.

(Procedure 1-1) First, the interference power estimation device projects the orbit of a satellite onto a map representing the ground surface of the Earth. The interference power estimation device divides a range including the entire projected orbit of the satellite into a plurality of ranges and acquires the latitude and longitude of each divided range. Each range is a range in which the satellite can exist in the overhead space, and the latitude and longitude of the range indicate a latitude and a longitude at which the satellite can exist. Hereinafter, the overhead space of a range on the map is an overhead space having a latitude and a longitude same as those of the range.

(Procedure 1-2) The interference power estimation device calculates the lowest altitude of the satellite in each divided range on the map obtained through Procedure 1-1.

(Procedure 1-3) Subsequently, the interference power estimation device calculates interference between the satellite and the ground station by using the latitude, longitude, and lowest altitude of each divided range. The interference power estimation device checks and determines whether the interference is calculated for all divided ranges. When the determination finds that there is any range yet to be calculated, the interference power estimation device calculates the interference by using the latitude, longitude, and lowest altitude of the range.

(Procedure 1-4) Lastly, when the interference calculation is performed for all divided ranges, the interference power estimation device selects a maximum value among the interference amounts calculated for all divided ranges. The selected maximum value is an estimation result of the amount of interference between the interference evaluation target satellite and the ground station.

[Solution 2] In the evaluation of interference between the satellite and the ground station in Solution 1, the interference power estimation device calculates the lowest altitude in each divided range, in the overhead space of which the satellite can exist, for the interference calculation as follows.

(Procedure 2-1) The interference power estimation device checks whether the orbit of the satellite is circular or elliptical.

(Procedure 2-2) When the orbit is circular, the altitude of the satellite is constant, and thus the interference power estimation device sets a constant value to the altitude of the satellite in all ranges.

(Procedure 2-3) When the orbit is elliptical, the interference power estimation device sets the lowest altitude (perigee altitude) of the satellite on the elliptical orbit to a range in which the altitude is lowest. Then, the interference power estimation device calculates, for any other range, the value of a lowest altitude at which the satellite exists in the overhead space of the range, and sets the calculated value to the altitude of the range as an interference calculation condition.

[Solution 3] The interference power estimation device calculates interference between a satellite system (multi-satellite system) constituted by a plurality of satellites and a ground station as follows.

(Procedure 3-1) The interference power estimation device divides a range in which each satellite exists into a plurality of ranges in accordance with its orbit projected on a map.

(Procedure 3-2) The interference power estimation device calculates interference between the satellite and the ground station for each divided range and obtains the amount of interference in the range.

(Procedure 3-3) The interference power estimation device selects a plurality of ranges in which the satellites of the multi-satellite system simultaneously exist at the same time.

(Procedure 3-4) The interference power estimation device calculates the sum of the interference amounts of the plurality of ranges selected through Procedure 3-3 with the ground station, which are obtained through Procedure 3-2, and sets the sum as the amount of interference between the multi-satellite system and the ground station.

(Procedure 3-5) The interference power estimation device checks whether a plurality of ranges in which the satellites simultaneously exist at a time different from the above-described time are same as the above-described selected ranges.

(Procedure 3-6) When the plurality of ranges in which the satellites simultaneously exist at the different time are different from the ranges selected through (Procedure 3-3), the interference power estimation device calculates the sum of the interference amounts of the plurality of ranges at the different time with the ground station, similarly to Procedure 3-4, and sets the sum as the amount of interference between the multi-satellite system and the ground station.

(Procedure 3-7) The interference power estimation device compares the interference amounts calculated at the different times through Procedures 3-4 and 3-6 and presents the largest value as a definitive estimation result of the interference amount.

[Solution 4] The interference power estimation device evaluates interference between a satellite and a ground station through procedures as follows.

(Procedure 4-1) The interference power estimation device sets a longitude when the satellite is geostationary.

The position of the satellite can be specified by the set latitude and the altitude of the orbit of the geostationary satellite, and thus the interference with the ground station can be checked based on the specified position of the geostationary satellite.

(Procedure 4-2) The interference power estimation device determines whether the satellite is a polar orbital satellite when the satellite is not geostationary but circulating.

(Procedure 4-3) When the satellite is a polar orbital satellite, the position of the satellite is assumed to be in the whole sky. Thus, the interference power estimation device calculates interference between the satellite at each position at a specified altitude in the whole sky and the ground station and sets the largest interference amount among the calculated amounts as the amount of interference between the polar orbital satellite and the ground station.

(Procedure 4-4) When the circulating satellite is not a polar orbital satellite, the interference power estimation device calculates a range in which the position of the satellite is assumed and the lowest altitude in the range and performs interference calculation by using these values, similarly to Solution 1.

With the above-described solutions, when calculating the amount of interference between a satellite and a ground station, the interference power estimation device of the present embodiment can provide a result at higher accuracy for the orbit of a circulating satellite. In particular, when difference in the altitude of the satellite is large between times and the distance between the satellite and the ground station significantly changes like a case in which the orbit of the circulating satellite is elliptical, difference in the distance is considered in interference calculation. Furthermore, since the range in which the satellite is assumed is limited in accordance with the orbit of the circulating satellite, calculation resources and time can be reduced. Moreover, the sum of the amounts of interference that a radio station on the ground receives from a multi-satellite system of low-earth-orbit satellites can be more accurately calculated by using an interference calculation device of the present embodiment.

Details of the present embodiment are described in first to fourth embodiments.

First Embodiment

The following first describes problems in calculation of interference between a satellite and a ground station in detail with reference to the related technology.

Figure 1:
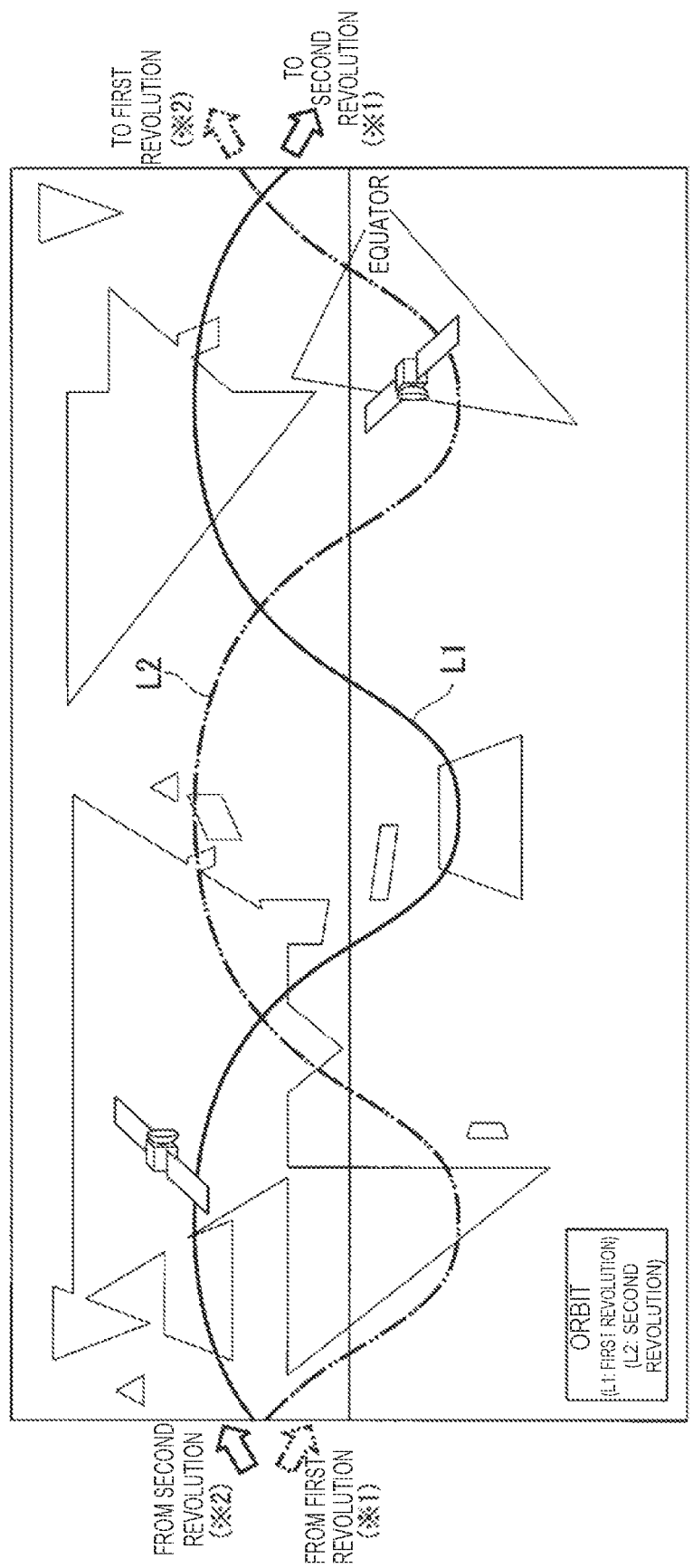
FIG. 1 is a diagram illustrating a map onto which the orbit of a circulating satellite is projected.

FIG. 1 is a diagram illustrating a map onto which the orbit of a circulating satellite is projected. In FIG. 1, such a circulating satellite is a recurrent satellite that completes revolution around the Earth twice and returns to the original position in one day. The recurrent satellite completes revolution around the Earth once in 12 hours and returns to the overhead space at the same place once in one day even in high-latitude areas such as the United Kingdom, Germany, and other European countries although the orbit projected onto the ground is different between the first revolution and the second revolution, and thus the recurrent satellite is suitable for communication and various kinds of observation in the areas. The range of latitude and longitude at which the satellite exists can be checked through interference calculation based on the circulating orbit projected onto the map.

The first revolution of the satellite orbit projected onto the map illustrated in the drawing is denoted by Reference Sign L1, and the second revolution thereof is denoted by Reference Sign L2. The orbit is different between the first revolution and the second revolution, but in each revolution, the length of the orbit projected onto the map is shorter on the south side (south latitude) of the equator, and the projected orbit is longer on the north side (north latitude) thereof. This is because the orbital plane on which the satellite is positioned is tilted relative to the equatorial plane. Furthermore, the orbit is elliptical, and the satellite moves at high speed through the perigee on the south hemisphere side and moves at low speed through the apogee on the north hemisphere side. Thus, the orbit of the satellite on the map is orbits L1 and L2 illustrated in the drawing.

Figure 2:
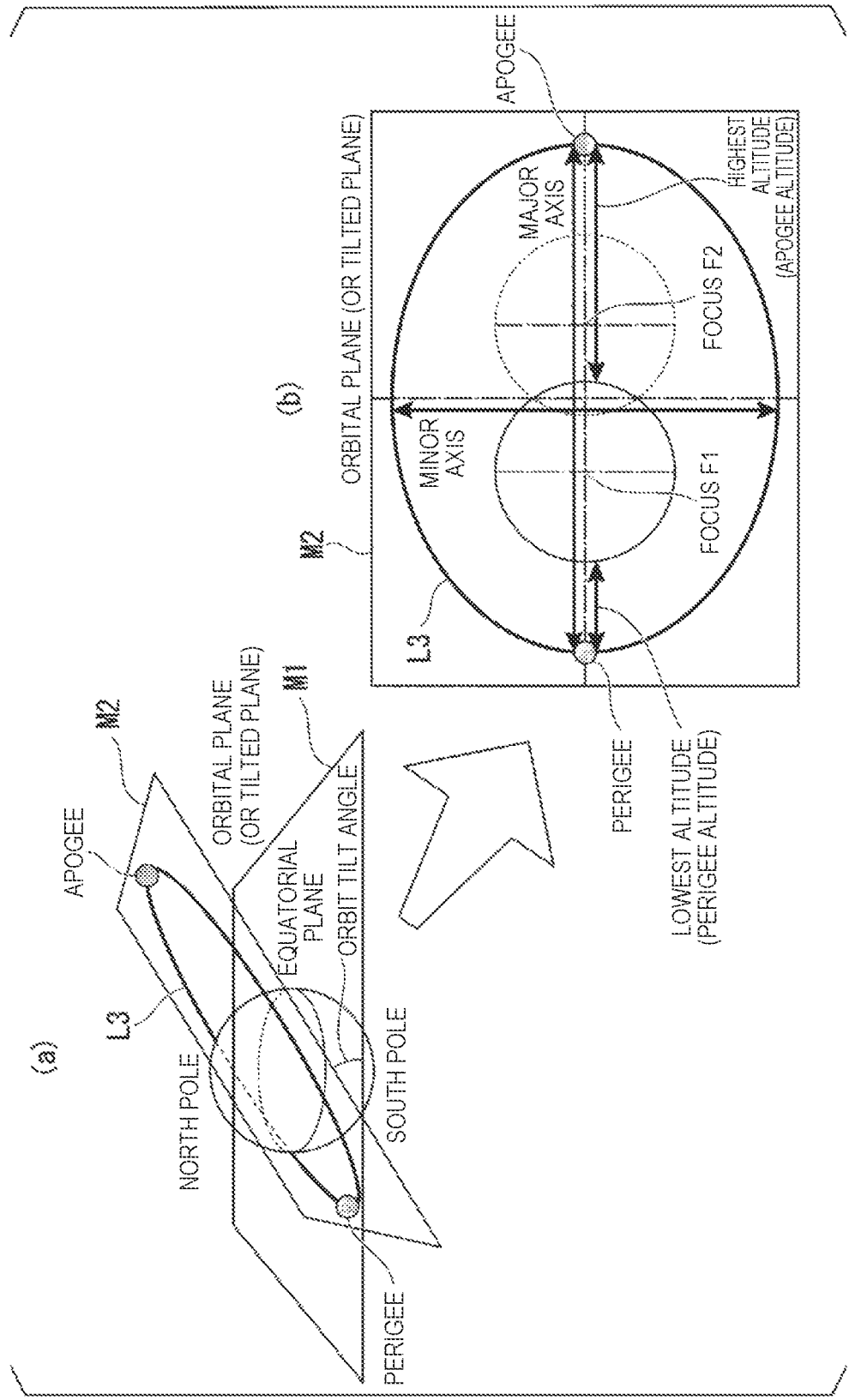
FIG. 2 is a diagram illustrating lengths related to the elliptical orbit of an artificial satellite.

The following briefly describes a satellite on an elliptical orbit. FIG. 2 is a diagram illustrating lengths related to the elliptical orbit of an artificial satellite. FIG. 2(a) illustrates an orbital plane (or tilted plane) M2 oblique to an equatorial plane M1 of the Earth and including an elliptical orbit L3 of the satellite. The angle of the orbital plane M2 with respect to the equatorial plane M1 is an orbit tilt angle. In FIG. 2(a), which illustrates the example in which the orbit L3 of the satellite on the orbital plane M2 is elliptical, the perigee is a point nearest to the Earth, and the apogee is a point farthest from the Earth.

FIG. 2(b) illustrates the orbit L3 of the satellite when the orbital plane (or tilted plane) M2 is squarely viewed. The orbit L3 of the satellite is elliptical in this example as described above, and one of two foci F1 and F2 of the ellipse (in the drawing, the focus F1) corresponds to the center of the Earth. As a result, the lowest altitude (perigee altitude) of the satellite having the elliptical orbit is a height obtained by subtracting the radius of the Earth from the shortest distance between the arc of the ellipse and the focus F1 on the major axis of the ellipse. The highest altitude (apogee altitude) is a height obtained by subtracting the radius of the Earth from the longest distance between the arc of the ellipse and the focus F1 on the major axis of the ellipse.

The following describes interference amount calculation of the related technology and the present embodiment by comparison with reference to the exemplary circulating-satellite orbit illustrated in FIG. 1.

Figure 3:
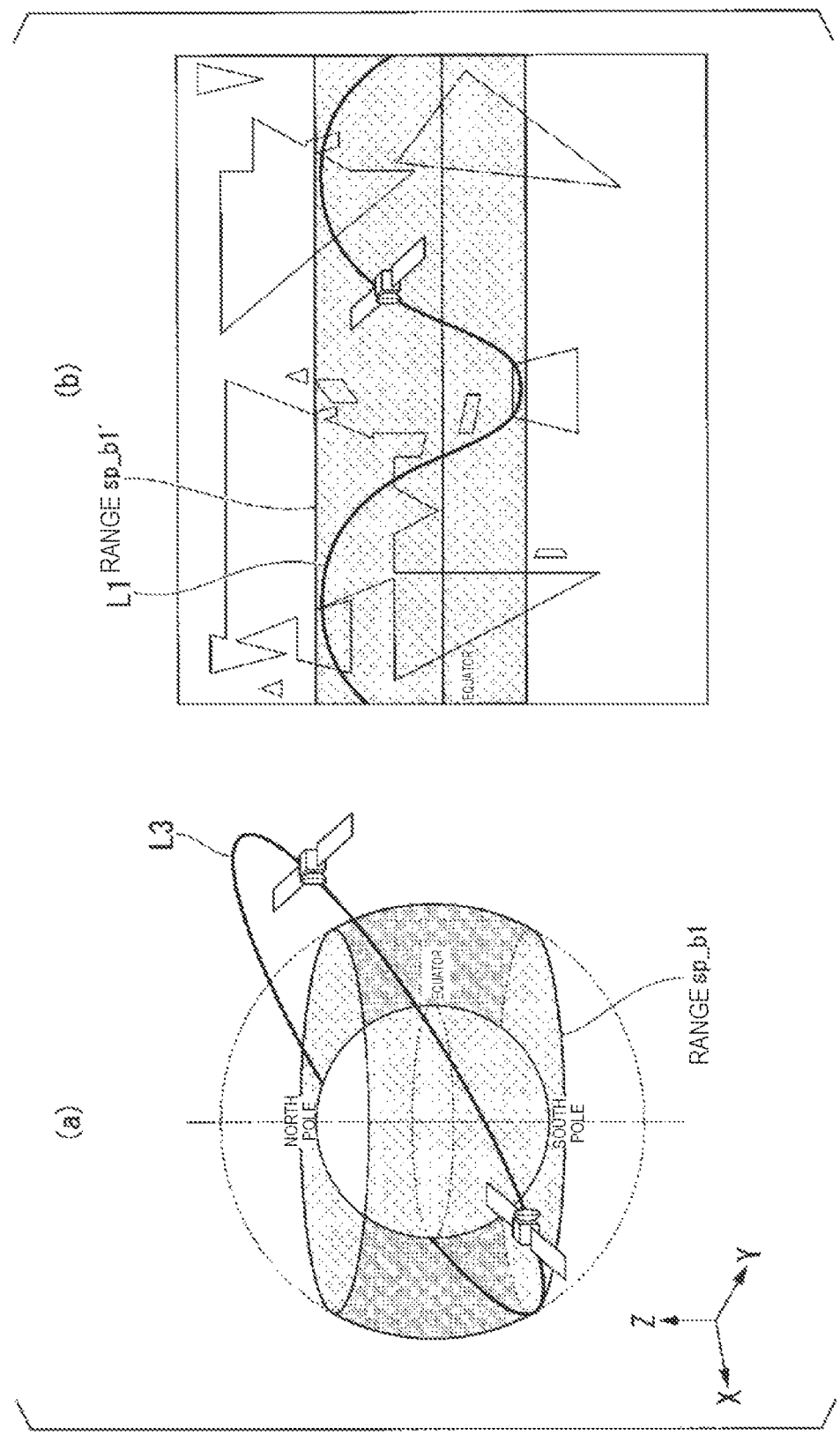
FIG. 3 is a diagram illustrating the positional relation between an interference evaluation target satellite and the ground according to a related technology.

FIG. 3 is a diagram illustrating the positional relation between an interference evaluation target satellite and the ground according to the related technology. FIG. 3(a) is a panoramic view of the Earth and the circulating satellite and illustrates a range sp_b1 in which the satellite is assumed when interference calculation according to the related technology is performed. The assumed range sp_b1 has a strip shape including the equator and extending around the Earth at a constant latitude width on the south and north sides. The altitude (distance from the Earth) in the strip-shaped range sp_b1 is set to be the lowest altitude (perigee altitude) of the satellite.

FIG. 3(b) illustrates an orbit obtained by projecting the orbit L3 of the circulating satellite onto the map as illustrated in FIG. 1 above. For simplicity of description, FIG. 3(b) illustrates only the orbit L1 of the first revolution and omits the orbit of the second revolution. In addition to the satellite orbit L1 projected onto the map, FIG. 3(b) illustrates a range sp_b1', in the overhead space of which the satellite is assumed to be positioned when interference between the satellite and the ground station is calculated by the related technology. The range sp_b1' has a strip shape having constant ranges on the south and north sides with the equator interposed therebetween. The strip-shaped range sp_b1' includes the entire orbit of the satellite (in this example, both orbits of the first revolution and the second revolution). Although the orbit of the second revolution is omitted, the range in which the position of the satellite is assumed is same as that of the first revolution, namely the range sp_b1', in the related technology, and thus no problem occurs. In the related technology, the amount of interference between a satellite positioned in the overhead space of the strip-shaped range sp_b1' in which the existence of the satellite is assumed and a specified ground station on the ground is calculated. However, in the calculation, the altitude of the satellite is thought to be constant at the lowest altitude described above. The interference power estimation device outputs and presents, to the user, the largest one of interference amounts calculated for all satellites assumed to be positioned in the overhead space of the range sp_b1'.

Figure 4:
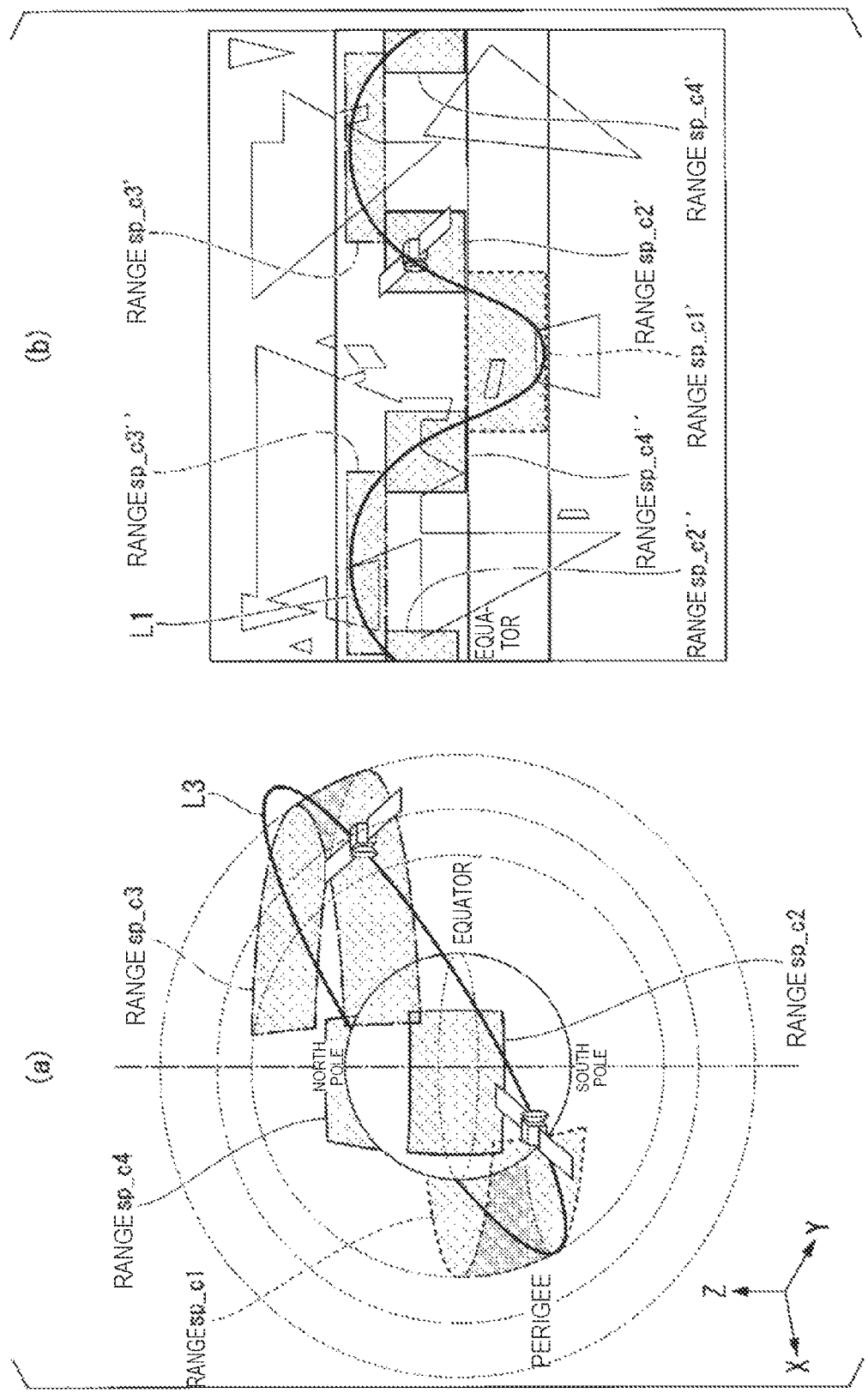
FIG. 4 is a diagram illustrating the positional relation between an interference evaluation target satellite and the ground according to a first embodiment.

FIG. 4 is a diagram illustrating the positional relation between an interference evaluation target satellite and the ground according to the present embodiment. Similarly to FIG. 3(a), FIG. 4(a) is a panoramic view of the Earth and a circulating satellite. FIG. 4(a) illustrates a plurality of ranges sp_c1 to sp_c4 in which the satellite is assumed to be exist when interference calculation is performed according to the present embodiment. The assumed ranges sp_c1 to sp_c4 are each a part of a spherical surface and partitioned into rectangular blocks. All ranges sp_c1 to sp_c4 are sequentially connected to wrap around the Earth. The distance of each range from the Earth (the altitude for each block) is the lowest altitude (perigee altitude) of the satellite for the nearest range sp_c1. For each of the other ranges sp_c2 to sp_c4, the distance is set to be the lowest one of altitudes where the satellite is assumed to be exist in the range. Thus, in FIG. 4(a), there are three kinds of different altitudes. These altitudes are the range sp_c1, which is illustrated in a lower part, the ranges sp_c2 and sp_c4, which are illustrated in middle parts, and the range sp_c3, which is illustrated in a higher part, sequentially from the lowest altitude.

Similarly to FIG. 3(b), FIG. 4(b) illustrates an orbit obtained by projecting the orbit L3 of a circulating satellite onto a map. For simplicity of description, the drawing illustrates only an orbit L1 of the first revolution. The orbit L1 of the first revolution is different from an orbit L2 of the second revolution, and calculation resources and time same as those for the first revolution are thought to be needed for the second week, which is omitted. Thus, resources and time twice as large as those for the first revolution are anticipated for a case including both the first revolution and the second revolution.

FIG. 4(b) illustrates a plurality of ranges sp_c1' to sp_c4' and sp_c2" to sp_c4", in the overhead space of each of which the satellite is assumed to be positioned when interference between the satellite and a ground station is calculated the orbit L1 of the first revolution of the satellite, which is projected onto the map, according to the present embodiment. The orbit L1 on which the satellite moves can be traced sequentially through rectangular ranges (1) sp_c2", (2) sp_c3", (3) sp_c4", (4) sp_c1', (5) sp_c2', (6) sp_c3', (7) sp_c4', . . . having areas different from each other. In this manner, the plurality of rectangular ranges sp_c2", sp_c3", sp_c4", sp_c1', sp_c2', sp_c3', and sp_c4' include different parts of the orbit L1 of the first revolution of the circulating satellite, and the combination of the plurality of ranges includes the entire orbit L1. Accordingly, each divided range is a rectangle that is smaller than a rectangle including the entire orbit L1 projected onto the map and includes part of the orbit L1.

Each divided range is contacted with other divided ranges, and the orbit L1 passes through this contact part.

The interference power estimation device of the present embodiment calculates the amount of interference between the satellite at each assumed position in the overhead space in the plurality of ranges (blocks) sp_c2" to sp_c4" and sp_c1' to sp_c4 and a specified ground station on the ground. Then, the interference power estimation device calculates the largest one of the amounts of interference from the satellite at all assumed positions in the overhead space in each range (blocks) sp_c2" to sp_c4" and sp_c1' to sp_c4'. Subsequently, the interference power estimation device compares the largest interference amounts calculated for the plurality of ranges (blocks) sp_c2" to sp_c4" and sp_c1' to sp_c4'. Finally, the interference power estimation device of the present embodiment outputs and presents the largest interference amount obtained through the comparison of the interference amounts to the user as an estimation result of the amount of interference between the satellite and the ground station.

The description returns to the range sp_b1' (strip-shaped area across the south and north sides of the equator), in the overhead space of which the satellite exists and that is illustrated in FIG. 3(b) and used in the interference calculation according to the related technology. As illustrated in FIG. 4(b), the plurality of ranges sp_c2" to sp_c4" and sp_c1' to sp_c4', which are used in the interference amount calculation according to the present embodiment correspond to the four rectangular divided ranges (blocks) sp_c1, sp_c2, sp_c3, and sp_c4, which are illustrated in FIG. 4(a). As understood from comparison of FIG. 3(b) and FIG. 4(b), the total area of the ranges sp_c2" to sp_c4" and sp_c1' to sp_c4' projected onto the map is smaller than about one third of the area of the range sp_b1', which is used in the interference amount calculation according to the related technology. Thus, when the calculation of the orbit L1 of the first revolution is applied to the orbit L2 of the second revolution, the area of a range for which the interference amount is calculated becomes twice as large (in reality, smaller than twice because of overlapping between the interference calculation ranges of the orbits of the first revolution and the second revolution), and thus the range of the calculation is reduced to be less than 60%.

In the related technology, the altitude of the orbit of the satellite in interference calculation is set to be constant at the lowest altitude in the range sp_b1 illustrated in FIG. 3(a). However, in the present embodiment, as understood from FIG. 4(a), the altitude is set to be an appropriate altitude in accordance with each position on the orbit L3 of the satellite for each of the ranges (blocks) sp_c1, sp_c2, sp_c3, and sp_c4. Thus, in the present embodiment, a required accuracy of the interference amount can be higher than in the related technology.

The ranges (blocks) in which the satellite exists are the four ranges sp_c1, sp_c2, sp_c3, and sp_c4 in the panoramic view illustrated in FIG. 4(a). On the map illustrated in FIG. 4(b), the ranges (blocks) in which the satellite exists are the seven ranges sp_c2", sp_c3", sp_c4", sp_c1', sp_c2', sp_c3', and sp_c4' for the orbit L1 of the first revolution. The resources and time necessary for interference calculation can be further reduced by increasing the number of divisions to have more minute ranges.

In addition, when the number of divisions of ranges is increased, the calculation accuracy of the interference amount improves in accordance with the increase.

Figure 5:
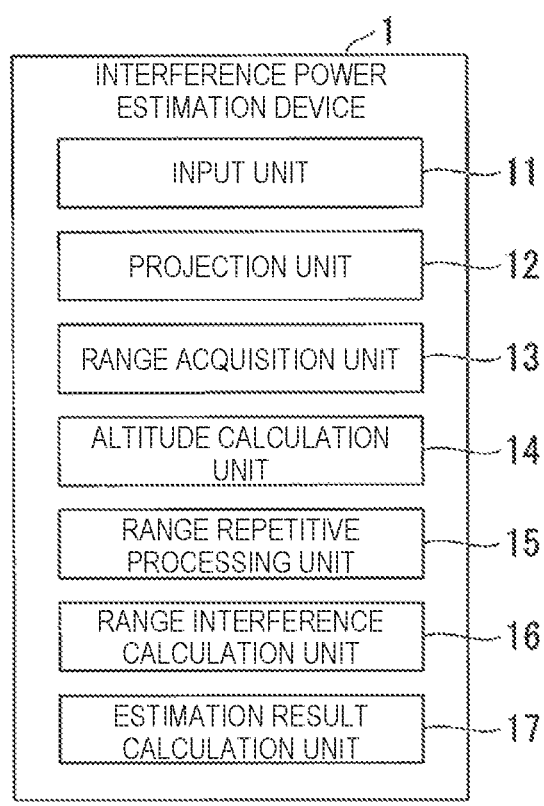
FIG. 5 is a functional block diagram illustrating the configuration of an interference power estimation device according to the first embodiment.

FIG. 5 is a functional block diagram illustrating the configuration of an interference power estimation device 1 according to the present embodiment. As illustrated in the drawing, the interference power estimation device 1 includes an input unit 11, a projection unit 12, a range acquisition unit 13, an altitude calculation unit 14, a range repetitive processing unit 15, a range interference calculation unit 16, and an estimation result calculation unit 17.

The input unit 11 receives information of a radio station through a user operation. Specifically, the user inputs, through the input unit 11, information of a satellite as an interference providing station and a ground station as an interference receiving station. The input information is the orbit of the satellite, the position of the ground station, and system data of a satellite station and the ground station. The system data includes losses of the antenna gain, power supply, and the like of each of the satellite station and the ground station, transmission power (or transmission power density) of the satellite station, the antenna direction and antenna directional pattern of the ground station and the like.

The projection unit 12 projects the orbit of the satellite onto a map representing the ground surface based on the information of the orbit. The range acquisition unit 13 determines a plurality of rectangular block ranges on the map by sequentially tracing adjacent blocks so that the entire orbit projected onto the map is included in the ranges, and acquires the latitude and longitude of each range. The altitude calculation unit 14 calculates the lowest altitude in each range acquired by the range acquisition unit 13 based on the information of the orbit of the satellite. The range repetitive processing unit 15 controls the range interference calculation unit 16 to repeat interference calculation for each range. The range interference calculation unit 16 performs the interference calculation of each range according to the related technology. The estimation result calculation unit 17 selects the maximum interference amount among interference amounts calculated for each of the ranges by the range interference calculation unit 16 and provides the maximum interference amount as an estimation result of the amount of interference between a satellite system and the ground station.

Figure 6:
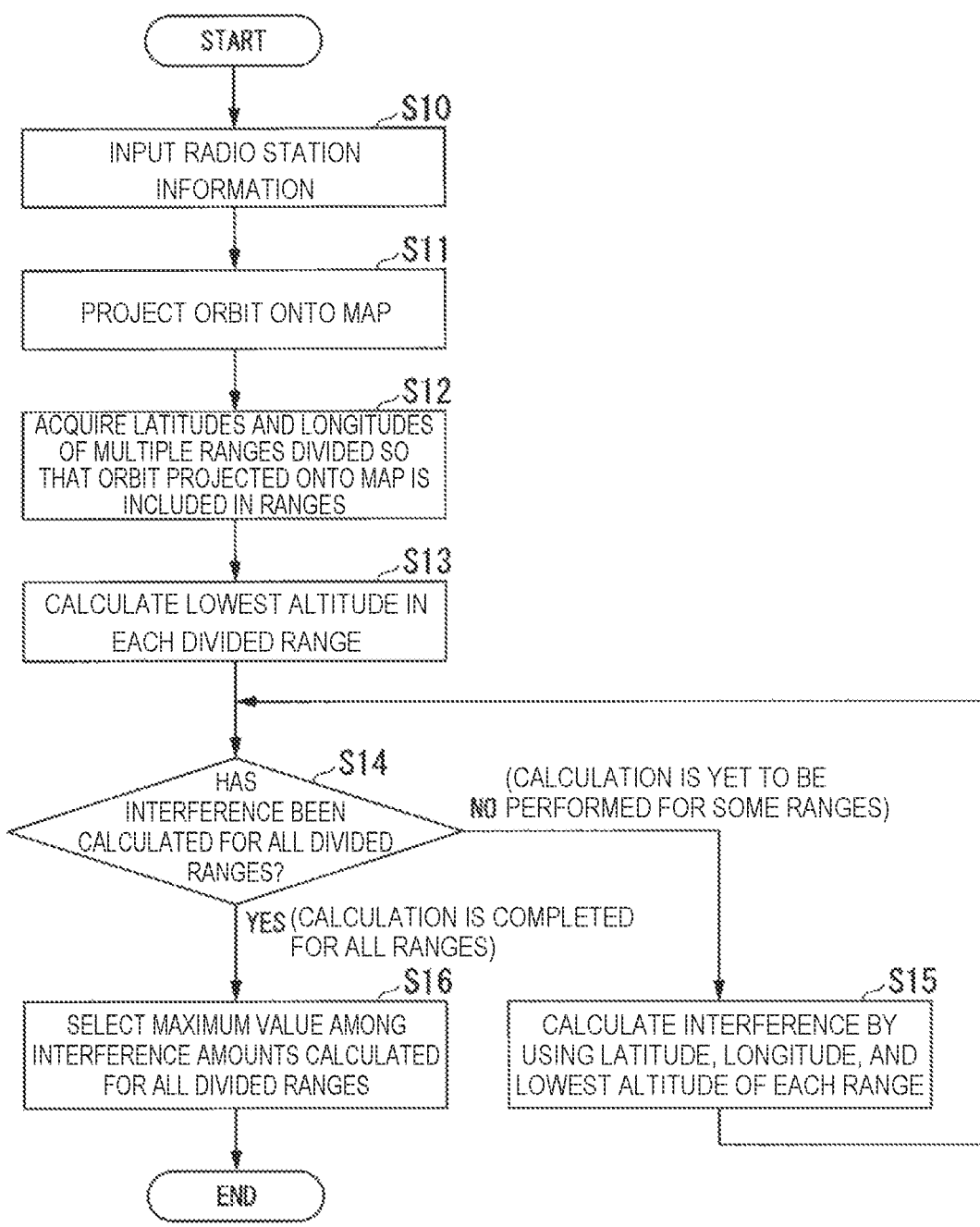
FIG. 6 is a flowchart illustrating interference calculation processing executed by the interference power estimation device according to the first embodiment.

FIG. 6 is a flowchart illustrating interference calculation processing executed by the interference power estimation device 1 of the present embodiment. The following also describes that the satellite orbit calculation ranges illustrated in FIG. 4 is applied in the interference calculation processing illustrated in FIG. 6.

First, the user inputs information of a radio station through the input unit 11 (step S10). The projection unit 12 projects the orbit of a circulating satellite (in this example, recurrent satellite) input at step S10 onto the map (step S11). This operation corresponds to processing of converting the orbit L3 of recurrent satellite illustrated in FIG. 4(a) into the orbit L1 projected onto the map illustrated in FIG. 4(b).

Subsequently, the range acquisition unit 13 acquires the latitude and longitude of each of a plurality of divided ranges on the map so that the orbit projected at step S11 is included in the ranges (step S12). The plurality of ranges are the ranges sp_c1', sp_c2', sp_c3', sp_c4' and the ranges sp_c2", sp_c3", and sp_c4" illustrated in FIG. 4(b). The plurality of ranges are partitioned into rectangles, and the range acquisition unit 13 obtains latitudes (of border lines in the north-south direction) and longitudes (of border lines in the east-west direction) of each range.

Subsequently, the altitude calculation unit 14 calculates the lowest altitude of the satellite in each range obtained at step S12 (step S13). As understood from FIG. 4(a), the lowest altitude of the satellite on the recurrent orbit is the perigee altitude in the range sp_c1. For each of the other ranges sp_c2, sp_c3, and sp_c4, the lowest altitude of the orbit L3 of the satellite in the range is calculated.

The range repetitive processing unit 15 determines whether interference has been calculated for all divided ranges (step S14). For example, in the case of FIG. 4(b), there are the seven divided ranges sp_c1', sp_c2', sp_c3', sp_c4', sp_c2", sp_c3", and sp_c4", and the latitude, longitude, and altitude of each range are calculated through the above-described processing. Step S14 is processing of checking whether interference calculation is completed for each of these ranges.

When having determined that there is any range for which interference calculation is not completed (NO at step S14), the range repetitive processing unit 15 instructs the range interference calculation unit 16 to perform interference calculation. The range interference calculation unit 16 performs interference calculation by using the latitude, altitude, and lowest altitude of each range for which interference calculation is yet to be performed (step S15). The interference calculation by the range interference calculation unit 16 is a calculation method same as that of the related technology. However, differences are such that a range (setting of latitude and longitude) and an altitude as conditions are different and the interference calculation is performed for each range a plurality of times with different conditions. Details of the interference calculation by the range interference calculation unit 16 will be described later.

After step S15, the range repetitive processing unit 15 performs the determination processing at step S14 again. When having determined that the interference calculation is completed for all divided ranges (YES at step S14), the range repetitive processing unit 15 notifies the estimation result calculation unit 17 of the completion. The estimation result calculation unit 17 selects the maximum interference amount among the interference amounts calculated for the respective divided ranges (step 316). This selected maximum interference amount is an estimation result of the calculated amount of interference between the satellite and the ground station.

The above-described calculation process indicates that, in the example of FIG. 4(b), the range interference calculation unit 16 performs the interference calculation according to the related technology for each of the seven ranges sp_c1', sp_c2', sp_c3', sp_c4', sp_c2", sp_c3", and sp_c4". Through the interference calculation, the maximum interference amount is calculated for each range, and thus the seven interference amounts are obtained in the case of FIG. 4(b). The estimation result calculation unit 17 compares the seven interference amounts to selects the maximum interference amount among as a verification amount result calculated through evaluation of interference between the recurrent satellite and the ground station illustrated in FIG. 4.

Details of the range interference calculation unit 16 will be described below.

Figure 7:
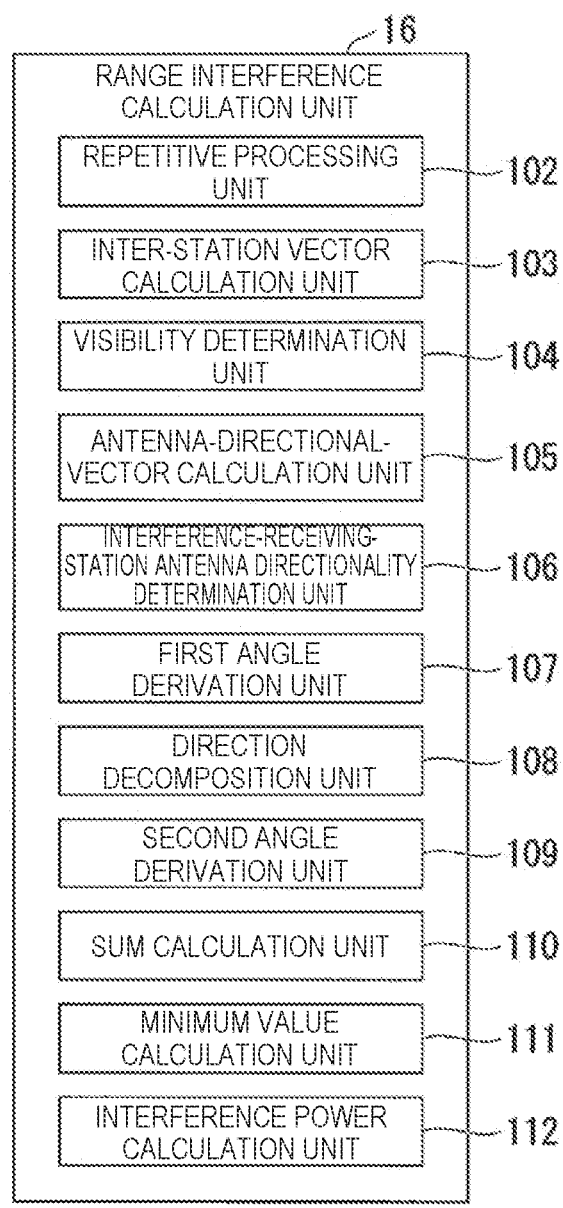
FIG. 7 is a functional block diagram illustrating a detailed configuration of a range interference calculation unit according to an embodiment.

FIG. 7 is a functional block diagram illustrating a detailed configuration of the range interference calculation unit 16. The range interference calculation unit 16 includes a repetitive processing unit 102, an inter-station vector calculation unit 103, a visibility determination unit 104, an antenna-directional-vector calculation unit 105, an interference-receiving-station antenna directionality determination unit 106, a first angle derivation unit 107, a direction decomposition unit 108, a second angle derivation unit 109, a sum calculation unit 110, a minimum value calculation unit 111, and an interference power calculation unit 112.

The repetitive processing unit 102 acquires information of n positions at which a satellite can exist in a range in which the satellite is assumed to be exist. The range is defined by the latitude and longitude of a divided range acquired by the range acquisition unit 13 and the altitude calculated by the altitude calculation unit 14. The position of the satellite is expressed by a combination of the latitude, longitude, and altitude. The repetitive processing unit 102 controls other functional components to perform attenuation amount calculation processing for the satellite at each position. The attenuation amount calculation processing is processing of calculating a total attenuation amount as the sum of the propagation loss and the directionality attenuation amount. When having completed calculation of the total attenuation amount for the satellite at all positions by repeating the attenuation amount calculation processing, the repetitive processing unit 102 notifies the minimum value calculation unit 111 of the completion of the repetition.

The inter-station vector calculation unit 103 derives an inter-station vector. The inter-station vector is a vector from the ground station (interference receiving station) to the satellite (interference providing station). The visibility determination unit 104 determines whether a line segment connecting the ground station and the satellite has an intersection point with the earth surface. The visibility determination unit 104 determines that there is visibility when there is no intersection point or that there is no visibility when there is an intersection point. When the visibility determination unit 104 has determined that there is visibility, the antenna-directional-vector calculation unit 105 derives an antenna directional vector. The antenna directional vector is a vector indicating the antenna direction of the ground station in a coordinate system same as that of the positional vectors of the satellite and the ground station.

The interference-receiving-station antenna directionality determination unit 106 refers to the antenna directional pattern of the ground station and determines whether the antenna directionality of the ground station is different between H (horizontal) polarization and V (vertical) polarization. When the antenna directionality of the ground station is same between H polarization and V polarization, the first angle derivation unit 107 calculates the angle between an inter-station vector from the ground station to the satellite and the antenna directional vector of the ground station. The first angle derivation unit 107 calculates the directionality attenuation amount based on the calculated angle and the antenna directional pattern of the ground station. When the antenna directionality of the ground station is different between H polarization and V polarization, the direction decomposition unit 108 decomposes the inter-station vector from the ground station to the satellite into the H component and the V component. The second angle derivation unit 109 derives the angle between each of the H and V components of the inter-station vector and the antenna directional vector of the ground station. The second angle derivation unit 109 calculates the directionality attenuation amount based on each calculated angle and the antenna directional pattern of the ground station.

The sum calculation unit 110 calculates the distance between the ground station and the satellite and calculates a propagation loss based on the distance. The sum calculation unit 110 calculates the total attenuation amount by adding the directionality attenuation amount calculated by the interference-receiving-station antenna directionality determination unit 106 or the second angle derivation unit 109 to the propagation loss. The minimum value calculation unit 111 calculates the minimum value among the total attenuation amounts calculated for positions at which the satellite can exist. The interference power calculation unit 112 calculates a maximum arrival interference power from the satellite to the ground station by using the minimum total attenuation amount calculated by the minimum value calculation unit 111.

Detailed processing of the range interference calculation unit 16 will be described with reference to the flowchart of FIG. 22.

In the processing at step S10 in FIG. 6, since information of the satellite and information of a station on the Earth are input, the range interference calculation unit 16 does not perform the processing at step 3105. In the processing at step S15 in FIG. 6, the range interference calculation unit 16 performs the processing at step 3110 and later in FIG. 22 for each divided range.

The repetitive processing unit 102 sets the Earth as a sphere having a center O=(0, 0, 0) and a radius R. In addition, the repetitive processing unit 102 obtains all positions i (i=1 to n) at which the satellite can exist in an altitude range (hereinafter referred to as a processing target range) in a range acquired by the range acquisition unit 13, which is calculated by the altitude calculation unit 14 in the overhead space at the latitude and longitude of the range. For example, the processing target range may be divided by predetermined latitude and longitude widths, and the position i may be the central point of each divided region or a point at which the latitude and longitude widths used for the division intersect. The repetitive processing unit 102 sets the satellite station at the position i to be the interference providing station $A_i$ (i is an integer equal to one or larger), and the station on the Earth to be the interference receiving station B. Each position at which the interference providing station $A_i$ can exist is indicated by a latitude $\theta_{Ai}$, a longitude $\phi_{Ai}$, and an altitude $h_{Ai}$, and the position of the interference receiving station B is indicated by a latitude $\theta_B$, a longitude $\phi_B$, and an altitude $h_B$. An antenna azimuth angle and an antenna elevation angle indicated by input information of the antenna direction of the ground station are set as an antenna azimuth angle $\theta$ (increases clockwise from 0° at the north direction) and an antenna elevation angle $\phi$ (increases upward from 0° at the horizontal direction) of the interference receiving station B, respectively.

FIG. 21 illustrates the positional relation between the interference providing station $A_i$ and the interference receiving station B. The distance from the center O of the Earth to the interference providing station $A_i$ is equal to the radius R of the Earth+the altitude $h_{Ai}$ of the interference providing station $A_i$, and the distance from the center O of the Earth to the interference receiving station B is equal to the radius R of the Earth+the altitude $h_B$ of the interference receiving station B. The antenna directional vector $\overrightarrow{(BP)}$ is a unit vector indicating the antenna direction of the interference receiving station B.

In FIG. 22, the repetitive processing unit 102 increases the variable i (i=1 to n) one by one from 1 to n and repeats the attenuation amount calculation processing at steps S115 to S150 in FIG. 22 to calculate the attenuation amount sum $L_i$ for all n sets of the latitude $\theta_{Ai}$, the longitude $\phi_{Ai}$, and the altitude $h_{Ai}$, which indicate the position i of the interference providing station $A_i$ (step S110).

The inter-station vector calculation unit 103 assumes the Earth as a sphere having the center O=(0, 0, 0) and the radius R and calculates a vector $\overrightarrow{(OA_i)}$ indicating the position of the interference providing station $A_i$ and a vector $\overrightarrow{(OB)}$ indicating the position of the interference receiving station B in the XYZ space by Formulae (1) and (2), respectively.

[Formula 1]

$$\overrightarrow{OA_i} = \begin{pmatrix} (R+h_{Ai})\cos\theta_{Ai}\cos\varphi_{Ai} \\ (R+h_{Ai})\cos\theta_{Ai}\sin\varphi_{Ai} \\ (R+h_{Ai})\sin\theta_{Ai} \end{pmatrix} \quad (1)$$

[Formula 2]

$$\overrightarrow{OB} = \begin{pmatrix} (R+h_B)\cos\theta_B\cos\varphi_B \\ (R+h_B)\cos\theta_B\sin\varphi_B \\ (R+h_B)\sin\theta_B \end{pmatrix} \quad (2)$$

The inter-station vector calculation unit 103 calculates the inter-station vector $\overrightarrow{(BA_1)}$ from the interference receiving station B to the interference providing station $A_i$ by Formula (3) by using the vector $\overrightarrow{(OA_1)}$ and the vector $\overrightarrow{(OB)}$ thus calculated (step S115).

[Formula 3]

$$\overrightarrow{BA_i} = \overrightarrow{OA_i} - \overrightarrow{OB} \quad (3)$$

Subsequently, the visibility determination unit 104 determines whether the Earth exists between the interference providing station $A_i$ and the interference receiving station B, in other words, whether there is visibility between the interference receiving station B and the interference providing station $A_i$ (step S120). Specifically, the visibility determination unit 104 determines whether a line segment $A_iB$ and the earth surface have an intersection point therebetween by using a discriminant. When a point on the line segment $A_iB$ is denoted by $Q_i$, a vector $\overrightarrow{(OQ_i)}$ from the center O of the Earth to the point $Q_i$ is expressed by Formula (4) below.

[Formula 4]

$$\overrightarrow{OQ_i} = t\overrightarrow{OA_i} + (1-t)\overrightarrow{OB} \text{ (where } 0 \le t \le 1\text{)} \quad (4)$$

Formula (4) can be rewritten for t to obtain Formula (5) below.

[Formula 5]

$$|\overrightarrow{BA_i}|^2 t^2 + 2\overrightarrow{BA_i} \cdot \overrightarrow{OB} t + |\overrightarrow{OB}|^2 - |\overrightarrow{OQ_i}|^2 = 0 \quad (5)$$

When the point $Q_i$ exists on the earth surface, in other words, the distance from the center O of the Earth to the point $Q_i$ is equal to the radius R of the Earth, $|\overrightarrow{(OQ_i)}| = R$, the Earth exists between $A_i$ and B and visibility is potentially lost. Thus, the discriminant D/4 of Formula (7) for a quadratic equation of Formula (6) below is used.

[Formula 6]

$$|\overrightarrow{BA_i}|^2 t^2 + 2\overrightarrow{BA_i} \cdot \overrightarrow{OB} t + |\overrightarrow{OB}|^2 - R^2 = 0 \quad (6)$$

[Formula 7]

$$D/4 = (\overrightarrow{BA_i} \cdot \overrightarrow{OB})^2 - |\overrightarrow{BA_i}|^2(|\overrightarrow{OB}|^2 - R^2) \quad (7)$$

Figure 24:
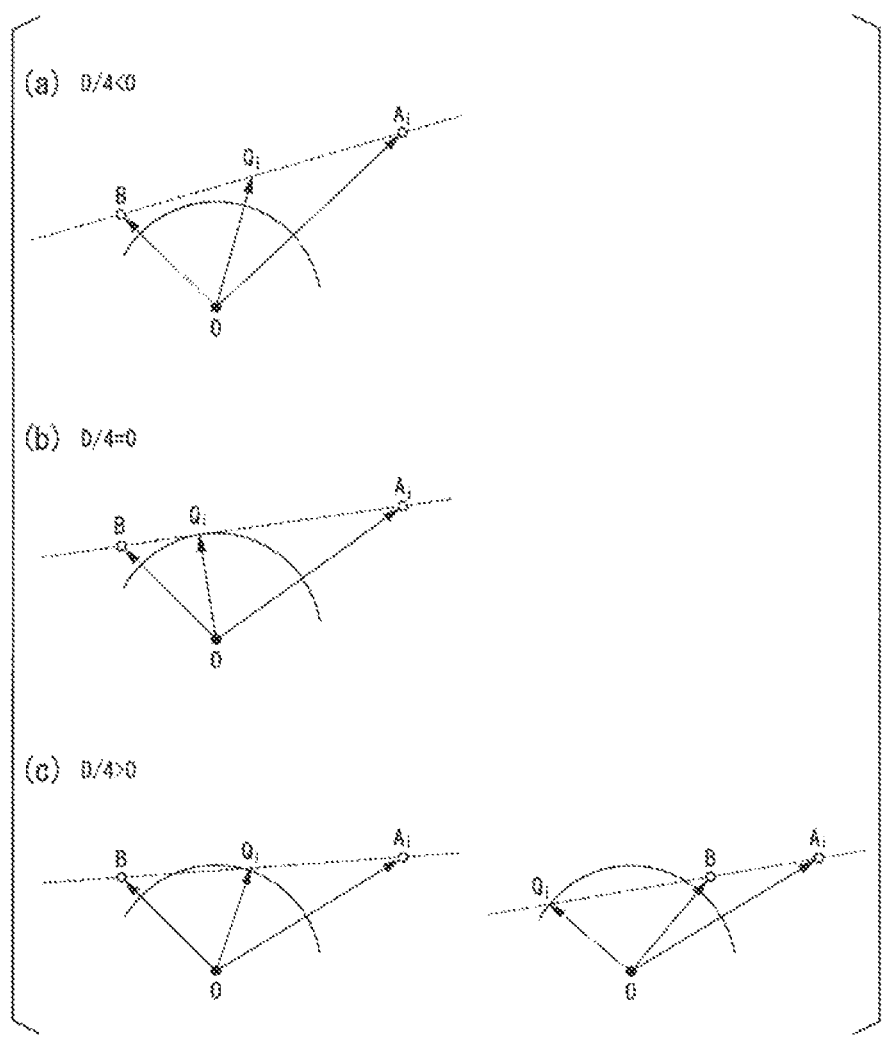
FIG. 24 is a diagram illustrating the positional relation among the value of a discriminant D/4, an interference providing station $A_i$, an interference receiving station B, and the earth surface according to the related technology.

FIG. 24 is a diagram illustrating the positional relation among the value of the discriminant D/4 and the interference providing station $A_i$, the interference receiving station B, and the earth surface. As illustrated in FIG. 24(a), in the case of the discriminant D/4<0, the straight line $A_iB$ passing through the interference providing station $A_i$ and the interference receiving station B has no intersection point with the earth surface. As illustrated in FIG. 24(b), in the case of the discriminant D/4=0, the straight line $A_iB$ passing through the interference providing station $A_i$ and the interference receiving station B contacts the earth surface. As illustrated in FIG. 24(c), in the case of the discriminant D/4>0, the straight line $A_iB$ passing through the interference providing station $A_i$ and the interference receiving station B has an intersection point with the earth surface.

Thus, in FIG. 22, the visibility determination unit 104 determines the value of the discriminant D/4 calculated by Formula (7). In the case of D/4≤0, the straight line $A_iB$ and the earth surface have not intersection point or contact each other as illustrated in FIGS. 24(a) and (b). Thus, in the case of D/4≤0, the visibility determination unit 104 determines that there is visibility between $A_i$ and B (YES at step S120), the antenna-directional-vector calculation unit 105 performs processing at step S125.

In the case of D/4>0, the straight line $A_iB$ and the earth surface have an intersection point as illustrated in FIG. 24(c), it is unable to determine whether the line segment $A_iB$ and the earth surface have an intersection point. Thus, in the case of D/4>0, the visibility determination unit 104 solves the quadratic equation of Formula (6) to calculate a solution $t_1$ and a solution $t_2$. The solution $t_1$ and the solution $t_2$ are calculated by Formula (8) below.

[Formula 8]

$$t_1 = \frac{-\overrightarrow{BA_i} \cdot \overrightarrow{OB} + \sqrt{(\overrightarrow{BA_i} \cdot \overrightarrow{OB})^2 - |\overrightarrow{BA_i}|^2 (|\overrightarrow{OB}|^2 - R^2)}}{|\overrightarrow{BA_i}|^2}, \quad (8)$$

$$t_2 = \frac{-\overrightarrow{BA_i} \cdot \overrightarrow{OB} - \sqrt{(\overrightarrow{BA_i} \cdot \overrightarrow{OB})^2 - |\overrightarrow{BA_i}|^2 (|\overrightarrow{OB}|^2 - R^2)}}{|\overrightarrow{BA_i}|^2}$$

In the case of $0 \leq t_1 \leq 1$ and $0 \leq t_2 \leq 1$, the line segment $A_iB$ has an intersection point with the earth surface as illustrated in the drawing on the left side in FIG. 24(c). In the case of $t_1 < 0$ and $1 \leq t_1$ or the case of $t_2 < 0$ and $1 < t_2$, the line segment $A_iB$ has no intersection point with the earth surface as illustrated in the drawing on the right side in FIG. 24(c).

Thus, when the solution $t_1$ and the solution $t_2$ satisfy $0 \leq t_1 \leq 1$ and $0 \leq t_2 \leq 1$, the visibility determination unit 104 determines that there is no visibility between $A_i$ and B (No at step S120). The range interference calculation unit 16 does not perform interference calculation, and the repetitive processing unit 102 performs the processing at step S155.

In the case of $t_1 < 0$ and $1 < t_1$ or the case of $t_2 < 0$ and $1 < t_2$, the visibility determination unit 104 determines that there is visibility between $A_i$ and B since the line segment $A_iB$ and the earth surface have no intersection point (YES at step S120). The antenna-directional-vector calculation unit 105 performs the processing at step S125.

The antenna-directional-vector calculation unit 105 calculates the antenna directional vector (BP)→, which is the unit vector indicating the antenna direction of the interference receiving station B, in a coordinate system same as that of the positional vectors of the interference providing station $A_i$ and the interference receiving station B (step S125). Specifically, first consider a vector (OP)→ when the position of the interference receiving station B is at a virtual position of the latitude $\theta_B = 0$ and the longitude $\phi_B = 0$.

Figure 25:
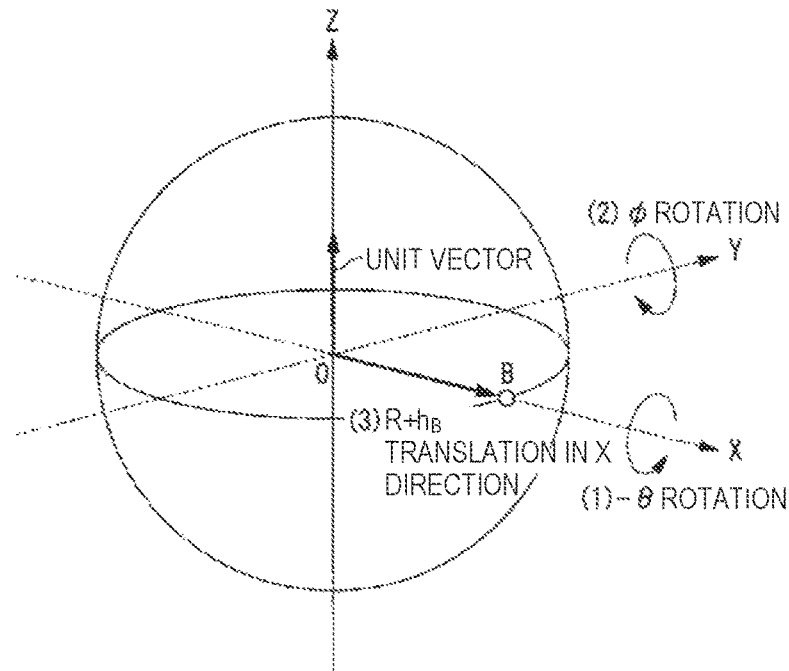
FIG. 25 is a diagram illustrating a method of deriving an antenna directional vector when the interference receiving station B is positioned at a latitude of 0° and a longitude of 0° according to the related technology.

FIG. 25 is a diagram illustrating a method of deriving the vector (OP)→ when the interference receiving station B is at the virtual position of the latitude $\theta_B = 0$ and the longitude $\phi_B = 0$. A unit vector from the center O of the Earth to the positive Z-axis direction is expressed by Formula (9) below.

[Formula 9]

$$\text{Unit vector} = \begin{pmatrix} 0 \\ 0 \\ 1 \end{pmatrix} \quad (9)$$

When the unit vector indicated by Formula (9) is rotated about the X axis by $-\theta$, rotated about the Y axis by $\phi$, and translated in the positive X-axis direction by $R+h_B$ where $\theta$ and $\phi$ represent the antenna azimuth angle and antenna elevation angle of the interference receiving station B, the vector (OP)→ when the interference receiving station B is at the virtual position of the latitude $\theta_B = 0$ and the longitude $\phi_B = 0$ is calculated by Formula (10) below.

[Formula 10]

$$\overrightarrow{OP} = \begin{bmatrix} \cos\varphi & 0 & \sin\varphi \\ 0 & 1 & 0 \\ -\sin\varphi & 0 & \cos\varphi \end{bmatrix} \begin{bmatrix} 1 & 0 & 0 \\ 0 & \cos(-\theta) & -\sin(-\theta) \\ 0 & \sin(-\theta) & \cos(-\theta) \end{bmatrix} \begin{pmatrix} 0 \\ 0 \\ 1 \end{pmatrix} + \begin{pmatrix} R+h_H \\ 0 \\ 0 \end{pmatrix} = \quad (10)$$

$$\begin{pmatrix} \sin\varphi\cos\theta + R + h_B \\ \sin\theta \\ \cos\varphi\cos\theta \end{pmatrix}$$

Subsequently, consider the vector (OP)→ when the latitude $\theta_B$ and the longitude $\phi_B$ of the interference receiving station B are not fixed.

Figure 26:
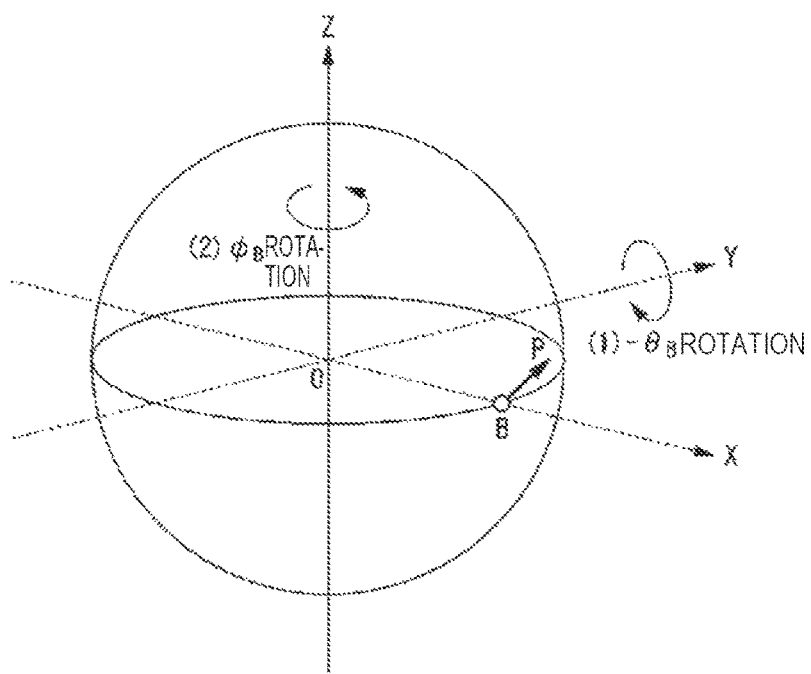
FIG. 26 is a diagram illustrating a method of deriving the antenna directional vector when the interference receiving station B is positioned at a latitude $\theta_B$ and a longitude $\phi_B$ according to the related technology.

FIG. 26 is a diagram illustrating a method of deriving the vector (OP)→ when the latitude $\theta_B$ and the longitude $\phi_B$ are not fixed. When the vector (OP)→ calculated by Formula (10) is rotated about the Y axis by $-\theta_B$ and rotated about the Z axis by $\phi_B$, Formula (11) below is obtained for the interference receiving station B at the latitude $\theta_3$ and the longitude $\phi_B$.

[Formula 11]

$$\overrightarrow{OP} = \begin{bmatrix} \cos\varphi_B & -\sin\varphi_B & 0 \\ \sin\varphi_B & \cos\varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix} \quad (11)$$

$$\begin{pmatrix} \sin\varphi\cos\theta + R + h_B \\ \sin\theta \\ \cos\varphi\cos\theta \end{pmatrix}$$

The antenna-directional-vector calculation unit 105 obtains the antenna directional vector (BP)→ by Formula (12) below by using the vector (OP)→ calculated by Formula (11).

[Formula 12]

$$\overrightarrow{BP} = \overrightarrow{OP} - \overrightarrow{OB} \quad (12)$$

Subsequently, as illustrated in FIG. 22, the interference-receiving-station antenna directionality determination unit 106 refers to the antenna directional pattern of the interference receiving station B and determines whether the antenna directionality of the interference receiving station B is different between H polarization and V polarization (step S130). When having determined that the antenna directionality of the interference receiving station B is same between H polarization and V polarization (SAME at step S130), the interference-receiving-station antenna directionality determination unit 106 passes processing to the first angle derivation unit 107.

The first angle derivation unit 107 first derives an angle η between the inter-station vector (BA$_i$)→ and the antenna directional vector (BP)→ and calculates an antenna directionality attenuation amount corresponding to the angle η from the antenna pattern of the interference receiving station B.

Formula (13) below is obtained based on the definition of inner product.

[Formula 13]

$$\overrightarrow{BA_i} \cdot \overrightarrow{BP} = |\overrightarrow{BA_i}||\overrightarrow{BP}|\cos \eta \quad (13)$$

Since the antenna directional vector (BP)→ is a unit vector, |(BP)→|=1 holds. Thus, Formula (14) below is obtained.

[Formula 14]

$$\cos\eta = \frac{\overrightarrow{BA_i} \cdot \overrightarrow{BP}}{|\overrightarrow{BA_i}|} \quad (14)$$

With Formula (14), the angle q can be calculated by Formula (15) below.

[Formula 15]

$$\eta = \arccos\frac{\overrightarrow{BA_i} \cdot \overrightarrow{BP}}{|\overrightarrow{BA_i}|} \quad (15)$$

Having calculated the angle η by Formula (15), the first angle derivation unit 107 calculates the antenna directionality attenuation amount corresponding to the angle η with reference to the antenna directional pattern of the interference receiving station B, which is input in advance through the input unit 11 (step S135). The range interference calculation unit 16 performs the processing at step S150.

When having determined that the antenna directionality of the interference receiving station B is different between H polarization and V polarization (DIFFERENT at step S130), the interference-receiving-station antenna directionality determination unit 106 passes processing to the direction decomposition unit 108.

The direction decomposition unit 108 decomposes the inter-station vector (BA$_i$)→ from the interference receiving station B to the interference providing station A$_i$ into the H component and the V component.

Figure 27:
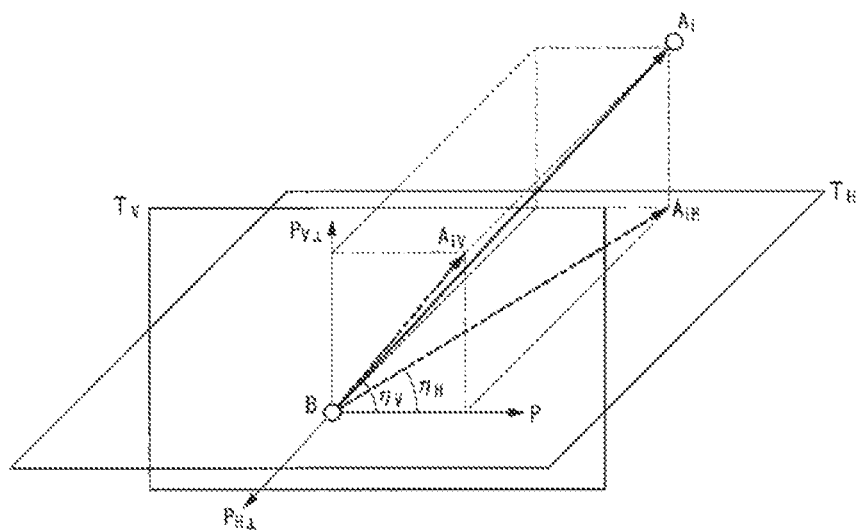
FIG. 27 is a diagram illustrating necessary data when an inter-station vector is disassembled into H and V directional components according to the related technology.

Specifically, the direction decomposition unit 108 derives an inter-station vector H directional component (BA$_{iH}$)→ that is the H directional component of the inter-station vector (BA$_i$)→, and an inter-station vector V directional component (BA$_{iV}$)→ that is the V directional component of the inter-station vector (BA$_i$)→. FIG. 27 is a diagram illustrating necessary data when the inter-station vector (BA$_i$)→ is decomposed into the inter-station vector H directional component (BA$_{iH}$)→ and inter-station vector V directional component (BA$_{iV}$)→.

In FIG. 22, the direction decomposition unit 108 first determines a vector (BP$_{H\perp}$)→ obtained by rotating the antenna directional vector (BP)→ by π/2 in the horizontal direction and a vector (BP$_{V\perp}$)→ obtained by rotating the antenna directional vector (BP)→ by π/2 in the vertical direction. A positional vector (OP$_{H\perp}$)→ of a point P$_{H\perp}$ determined by the vector (BP$_{H\perp}$)→ and a positional vector (OP$_{V\perp}$)→ of a point P$_{V\perp}$ determined by the vector (BP$_{V\perp}$)→ are given by Formulae (16) and (17) below based on Formula (11) of the vector (OP)→.

[Formula 16]

$$\overrightarrow{OP_{H\perp}} = \begin{bmatrix} \cos\varphi_B & -\sin\varphi_B & 0 \\ \sin\varphi_B & \cos\varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix}$$

$$\begin{pmatrix} \sin\varphi\cos(\theta + \frac{\pi}{2}) + R + h_B \\ \sin(\theta + \frac{\pi}{2}) \\ \cos\varphi\cos(\theta + \frac{\pi}{2}) \end{pmatrix} \quad (16)$$

[Formula 17]

$$\overrightarrow{OP_{V\perp}} = \begin{bmatrix} \cos\varphi_B & -\sin\varphi_B & 0 \\ \sin\varphi_B & \cos\varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix}$$

$$\begin{pmatrix} \sin(\varphi + \frac{\pi}{2})\cos\theta + R + h_B \\ \sin\theta \\ \cos(\varphi + \frac{\pi}{2})\cos\theta \end{pmatrix} \quad (17)$$

Based on the above-described Formulae (16) and (17), the direction decomposition unit 108 calculates the horizontal antenna directional vector (BP$_{H\perp}$)→ and the vertical antenna directional vector (BP$_{V\perp}$)→ by using Formulae (18) and (19) below.

[Formula 18]

$$\overrightarrow{BP_{H\perp}} = \overrightarrow{OP_{H\perp}} - \overrightarrow{OB} \quad (18)$$

[Formula 19]

$$\overrightarrow{BP_{V\perp}} = \overrightarrow{OP_{V\perp}} - \overrightarrow{OB} \quad (19)$$

Subsequently, the direction decomposition unit 108 sets a plane T$_H$ to be a plane including the antenna directional vector (BP)→ and the horizontal antenna directional vector (BP$_{H\perp}$)→, and sets a plane T$_V$ to be a plane including the antenna directional vector (BP)→ and the vertical antenna directional vector (BP$_{V\perp}$)→. In addition, a point A$_{iH}$ is set to be an intersection point of a perpendicular from the point A$_i$ to the plane T$_H$, and a point A$_{iV}$ is set to be an intersection point of a perpendicular from the point A$_i$ to the plane T$_V$. In this case, the inter-station vector H directional component (BA$_{iH}$)→ is given by Formula (20) below.

[Formula 20]

$$\overrightarrow{BA_{iH}} = \overrightarrow{BA_i} - A_{iH}A_i \quad (20)$$

Since the vector (A$_{iH}$A$_i$)→ is the orthographically projected vector of the inter-station vector (BA$_i$)→ onto the vertical antenna directional vector (BP$_{V\perp}$)→ Formula (21) below is obtained.

[Formula 21]

$$\overrightarrow{A_{iH}A_i} = \left(\overrightarrow{BA_i} \cdot \frac{\overrightarrow{BP_{V\perp}}}{|\overrightarrow{BP_{V\perp}}|}\right)\frac{\overrightarrow{BP_{V\perp}}}{|\overrightarrow{BP_{V\perp}}|} = (\overrightarrow{BA_i} \cdot BP_{V\perp})BP_{V\perp} \quad (21)$$

Based on Formula (21) above, the inter-station vector H directional component (BA$_{iH}$)→ is given by Formula (22) below.

[Formula 22]

$$\overrightarrow{BA_{IH}} = \overrightarrow{BA_I} - (\overrightarrow{BA_I} \cdot BP_{V\perp})BP_{V\perp} \tag{22}$$

Similarly to Formula (20) above, the inter-station vector V directional component $(BA_{iV}) \rightarrow$ is given by Formula (23) below.

[Formula 23]

$$\overrightarrow{BA_{IV}} = \overrightarrow{BA_I} - \overrightarrow{A_{IV}A_t} \tag{23}$$

Since the vector $(A_{iV}A_t) \rightarrow$ is the orthographically projected vector of the inter-station vector $(BA_i) \rightarrow$ onto the horizontal antenna directional vector $(BP_{H\perp}) \rightarrow$, Formula (24) below is obtained.

[Formula 24]

$$\overrightarrow{A_{iV}A_i} = \left(\overrightarrow{BA_i} \cdot \frac{\overrightarrow{BP_{H\perp}}}{|\overrightarrow{BP_{H\perp}}|}\right)\frac{\overrightarrow{BP_{H\perp}}}{|\overrightarrow{BP_{H\perp}}|} = (\overrightarrow{BA_i} \cdot BP_{H\perp})BP_{H\perp} \tag{24}$$

Based on Formula (24) above, the inter-station vector V directional component $(BA_{iV}) \rightarrow$ is given by Formula (25) below.

[Formula 25]

$$\overrightarrow{BA_{IV}} = \overrightarrow{BA_I} - (\overrightarrow{BA_I} \cdot BP_{H\perp})BP_{H\perp} \tag{25}$$

The direction decomposition unit 108 calculates the inter-station vector H directional component $(BA_{iH}) \rightarrow$ by Formula (22) and calculates the inter-station vector V directional component $(BA_{iV}) \rightarrow$ by Formula (25) (step S140).

Subsequently, in FIG. 22, the second angle derivation unit 109 derives the angle $\eta_H$ between the inter-station vector H directional component $(BA_{iH}) \rightarrow$ and the antenna directional vector $(BP) \rightarrow$ and the angle $\eta_V$ between the inter-station vector V directional component $(BA_{iV}) \rightarrow$ and the antenna directional vector $(BP) \rightarrow$. Formula (26) below is obtained for the H directional component based on the definition of inner product.

[Formula 26]

$$\overrightarrow{BA_{IH}} \cdot \overrightarrow{BP} = |\overrightarrow{BA_{IH}}||\overrightarrow{BP}|\cos\eta_H \tag{26}$$

Formula (27) below is obtained since the antenna directional vector $(BP) \rightarrow$ is a unit vector, namely $|(BP) \rightarrow|=1$.

[Formula 27]

$$\cos\eta_H = \frac{\overrightarrow{BA_{iH}} \cdot \overrightarrow{BP}}{|\overrightarrow{BA_{iH}}|} \tag{27}$$

Accordingly, the angle $\eta_H$ is given by Formula (28) below.

[Formula 28]

$$\eta_H = \arccos\frac{\overrightarrow{BA_{iH}} \cdot \overrightarrow{BP}}{|\overrightarrow{BA_{iH}}|} \tag{28}$$

Formula (29) below is obtained for the V directional component based on the definition of inner product.

[Formula 29]

$$\overrightarrow{BA_{IV}} \cdot \overrightarrow{BP} = |\overrightarrow{BA_{IV}}|\cos\eta_V \tag{29}$$

Formula (30) below is obtained since the antenna directional vector $(BP) \rightarrow$ is a unit vector, namely $|(BP) \rightarrow|=1$.

[Formula 30]

$$\cos\eta_V = \frac{\overrightarrow{BA_{iV}} \cdot \overrightarrow{BP}}{|\overrightarrow{BA_{iV}}|} \tag{30}$$

Accordingly, the angle $\eta_V$ is given by Formula (31) below.

[Formula 31]

$$\eta_V = \arccos\frac{\overrightarrow{BA_{iV}} \cdot \overrightarrow{BP}}{|\overrightarrow{BA_{iV}}|} \tag{31}$$

The second angle derivation unit 109 calculates the angle $\eta_H$ by Formula (28) and calculates the angle $\eta_V$ by Formula (31) (step S145).

Subsequently, the second angle derivation unit 109 calculates a H polarization antenna directionality attenuation amount corresponding to the angle $\eta_H$ and a V polarization antenna directionality attenuation amount corresponding to the angle $\eta_V$ with reference to the antenna directional pattern of the interference receiving station B input at step S105 for each of H polarization and V polarization.

The second angle derivation unit 109 calculates a total antenna directionality attenuation amount by adding together the calculated H polarization antenna directionality attenuation amount and the calculated V polarization antenna directionality attenuation amount.

After the processing at step S135 or S145, the sum calculation unit 110 calculates the propagation loss based on the distance $|(BA_i) \rightarrow|$ between the interference providing station $A_1$ and the interference receiving station B. The propagation loss is calculated by Formula (32) below in a case of, for example, the free space propagation loss. In the formula, f represents the frequency of radio wave radiated from the interference providing station $A_i$.

[Formula 32]

$$\text{Propagation loss} = 32.4 + 20\log f + 20\log|\overrightarrow{BA_i}| \tag{32}$$

The sum calculation unit 110 adds the calculated propagation loss to the antenna directionality attenuation amount calculated by the first angle derivation unit 107 at step S135 or the total antenna directionality attenuation amount calculated by the second angle derivation unit 109 at step S145, thereby calculating the sum $L_i$ of the propagation loss and the directionality attenuation amount (step S150).

When having determined that the current value of i has not reached n, the repetitive processing unit 102 adds one to the current value of i and performs control to repeat the attenuation amount calculation processing at steps S115 to S150. When i has reached the repetition number n, the repetitive processing unit 102 notifies the minimum value calculation unit 111 of the end of the repetition of the attenuation amount calculation processing (step S155).

By Formula (33) below, the minimum value calculation unit 111 searches for a minimum value $L_{min}$, among the sums $L_i$ (i=1 to n) calculated for all interference providing stations $A_i$ in the attenuation amount calculation processing (step S160).

[Formula 33]
$$L_{min} = \min_{i=1 \sim n} L_i \quad (33)$$

The interference power calculation unit 112 calculates the interference power $P_r$ received by the interference receiving station B by using the information input through the input unit 11 and the sum $L_i$ of the propagation loss and the directionality attenuation amount, which is calculated by the minimum value calculation unit 111 at step S160 (step S165). For example, the interference power $P_r$ is obtained by adding the transmission power (or transmission power density), antenna gain $G_t$, and a loss $L_t$ of a power supply line and the like of the interference providing station $A_i$, an antenna gain $G_r$, and a loss $L_r$ of a power supply line and the like of the interference receiving station B, and the minimum value $L_{min}$ of the propagation loss and the directionality total attenuation amount, when these numerical values are in the unit of "dB".

According to the interference power estimation device 1 of the present embodiment, the amount of interference between a satellite and a ground station can be calculated with a reduced load. In addition, according to the interference power estimation device 1 of the present embodiment, an interference amount estimation result at higher accuracy can be obtained for the orbit of a circulating satellite, in particular.

Second Embodiment

In the present embodiment, the amount of interference from a satellite having an orbit that does not completely extend around the Earth when projected onto a map is calculated. The following mainly describes difference from the first embodiment. The configuration of an interference power estimation device according to the present embodiment is same as that of the first embodiment.

First, difference between the related technology and the present embodiment is described with an example of a quasi-zenith orbit. The quasi-zenith orbit is one of synchronous orbits and recurrent orbits.

Figure 8:
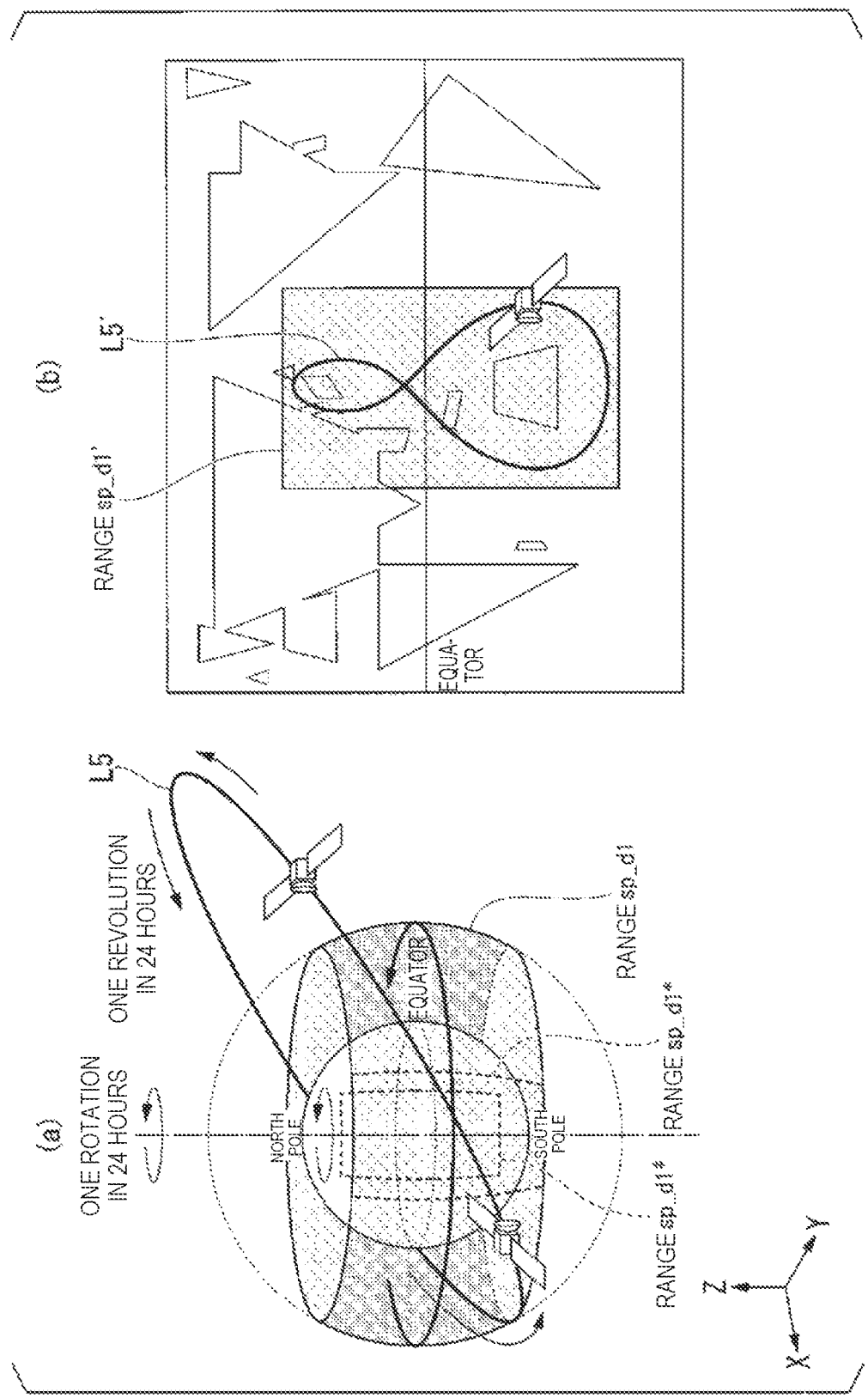
FIG. 8 is a diagram illustrating the orbit of a quasi-zenith satellite and the range of calculation according to the related technology.

FIG. 8 is a diagram illustrating the range of calculation of the quasi-zenith satellite according to the related technology. FIG. 8(a) is a panoramic view illustrating an orbit L5 of the quasi-zenith satellite. In Japan, the quasi-zenith satellite is utilized as Japanese domestic global positioning system (GPS) satellite "Michibiki" (Reference Literature 2), which can highly accurately determine an outdoor position. The orbit L5 of the quasi-zenith satellite is elliptical and tilted at an orbit tilt angle of 40° approximately with respect to the equatorial plane. The quasi-zenith satellite completes one revolution around the Earth in 24 hours while the Earth completes one rotation in 24 hours.

(Reference Literature 2): "JAXA TOP>Michibiki special site>Outline of first quasi-zenith satellite "Michibiki"", [online], [Sep. 13, 2018 search], the Internet <URL: http://www.jaxa.jp/countdown/f18/overview/michibiki_j.html>

FIG. 8(a) illustrates a range sp_d1 used in interference calculation according to the related technology. The range sp_d1 is a range in which the quasi-zenith satellite is assumed to exist in the related technology, and has a strip shape having an orbit tilt angle of −40° to 40° approximately on the north and south sides of the equator. The range sp_d1 corresponds to a range in which the quasi-zenith satellite completes revolution around the Earth at the lowest altitude (perigee altitude illustrated in FIG. 9 to be described later). When viewed from a point (for example, Tokyo in Japan) on the ground, the quasi-zenith satellite constantly stays in a certain range sp_d1* in the east-west direction. In FIG. 8(a), since the Earth rotates, the quasi-zenith satellite exists somewhere in the strip-shaped range sp_d1 around the Earth in a panoramic view. When the rotation of the Earth and the revolution of the satellite around the Earth are canceled from each other, the quasi-zenith satellite exists in the rectangular range sp_d1*. The range sp_d1*, in the overhead space of which the satellite exists becomes a rectangular range sp_d1‡ on the ground surface when projected onto the ground.

FIG. 8(b) illustrates a situation in which the orbit L5 of the quasi-zenith satellite is projected onto a map. The orbit L5 of the quasi-zenith satellite is set so that the satellite exists directly above the overhead space of the Japanese archipelago for a long time as possible, and an orbit L5' projected onto the map traces out a figure of eight as illustrated in FIG. 8(b). One side of the figure-of-eight orbit L5' of the quasi-zenith satellite corresponds to the Japanese archipelago. Since the Japanese archipelago is located on the north side of the equator, the other side of the figure-of-eight orbit L5' extends to the Australian continent on the south side. When evaluation of interference between such a quasi-zenith satellite and a radio station on the ground is calculated by the related technology, a range sp_d1', in the overhead space of which the satellite can exist is one rectangle entirely covering the figure-of-eight orbit L5' and extending to the north and south sides of the equator and to east and west from India to the west side in the Pacific Ocean to include the Japanese archipelago.

Figure 9:
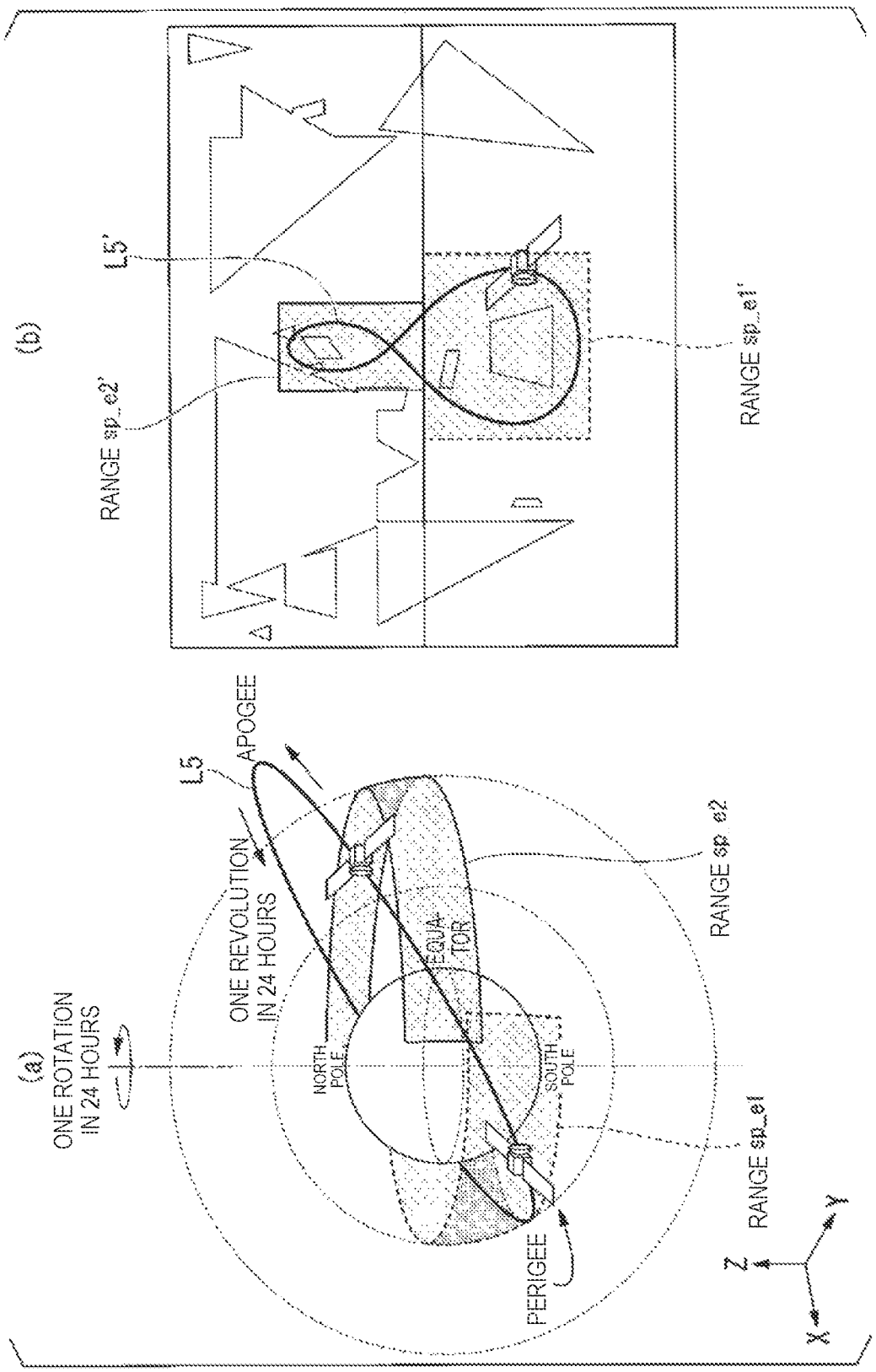
FIG. 9 is a diagram illustrating the range of calculation for a quasi-zenith satellite according to a second embodiment.

FIG. 9 is a diagram illustrating the range of calculation of the quasi-zenith satellite according to the present embodiment. FIG. 9(a) is a panoramic view of the orbit L5 of the quasi-zenith satellite and ranges sp_e1 and sp_e2 in which the satellite is assumed to exist in the present embodiment. As described above with reference to FIG. 8, the quasi-zenith satellite has an elliptical orbit tilted at an orbit tilt angle of 40° approximately with respect to the equatorial plane.

The quasi-zenith orbit has a perigee on the south hemisphere side and has a perigee altitude of a length obtained by subtracting the radius of the Earth from the shortest distance between a focus of the ellipse of the orbit L5 and the arc of the ellipse. The quasi-zenith orbit has an apogee on the north hemisphere side (the overhead space of the Japanese archipelago) and has an apogee altitude of a length obtained by subtracting the radius of the Earth from the longest distance between a focus of the ellipse of the orbit L5 and the arc of the ellipse.

Although described above in the first embodiment, a satellite having an elliptical orbit is also described below. FIG. 2(b) illustrates lengths related to the elliptical orbit of an artificial satellite. Since the focus F1 as one of the two foci F1 and F2 of the ellipse corresponds to the center of the Earth, the apogee altitude is the highest altitude of the elliptical-orbit satellite. The apogee altitude is a length obtained by subtracting the radius of the Earth from the longest distance from the arc of the ellipse to the focus F1.

Although the existence range of the quasi-zenith satellite is the one large range sp_d1 in the related technology as illustrated in FIG. 8(a) described above, the range in which the quasi-zenith satellite can exist is roughly divided into the two ranges sp_e1 and sp_e2 in the present embodiment as illustrated in FIG. 9(a). A range sp_e2 of the north hemisphere (including the overhead space of the Japanese archipelago) corresponds to approximately half of the orbit L5 including the apogee, and the range sp_e1 on the south hemisphere (Australian continent) side includes approximately half of the orbit L5 including the perigee. The ranges sp_e1 and sp_e2 are parts of the curved surface of a spherical surface shape and are strip-shaped rectangles. The altitude in the range sp_e1 on the south hemisphere side is the altitude of the satellite at the perigee. The altitude in the range sp_e2 on the north hemisphere side is the lowest altitude on the orbit L5 of the satellite in the range sp_e2. Accordingly, the altitude of the satellite is different between the ranges sp_e1 and sp_e2.

FIG. 9(b) illustrates a map obtained by projecting the orbit L5 of the quasi-zenith satellite onto the ground surface. As illustrated in FIG. 8(b) as well, an orbit L8' thus projected has a figure-of-eight shape including the Australian continent in the south hemisphere and including the Japanese archipelago in the north hemisphere. In the interference evaluation method of the present embodiment, ranges sp_e1' and sp_e2' as targets of calculation of positions at which the satellite can exist are two rectangles in the north and south hemispheres as illustrated in FIG. 9(b). The ranges sp_e1' and sp_e2' are included in the one range sp_d1' in FIG. 8(b) described above. The range sp_e1' on the south hemisphere (Australian continent) side is set to be larger than the range sp_e2' on the north hemisphere (Japanese archipelago) side, and the total range of the ranges sp_e1' and sp_e2' is smaller than the range sp_d1' illustrated in FIG. 8.

Figure 10:
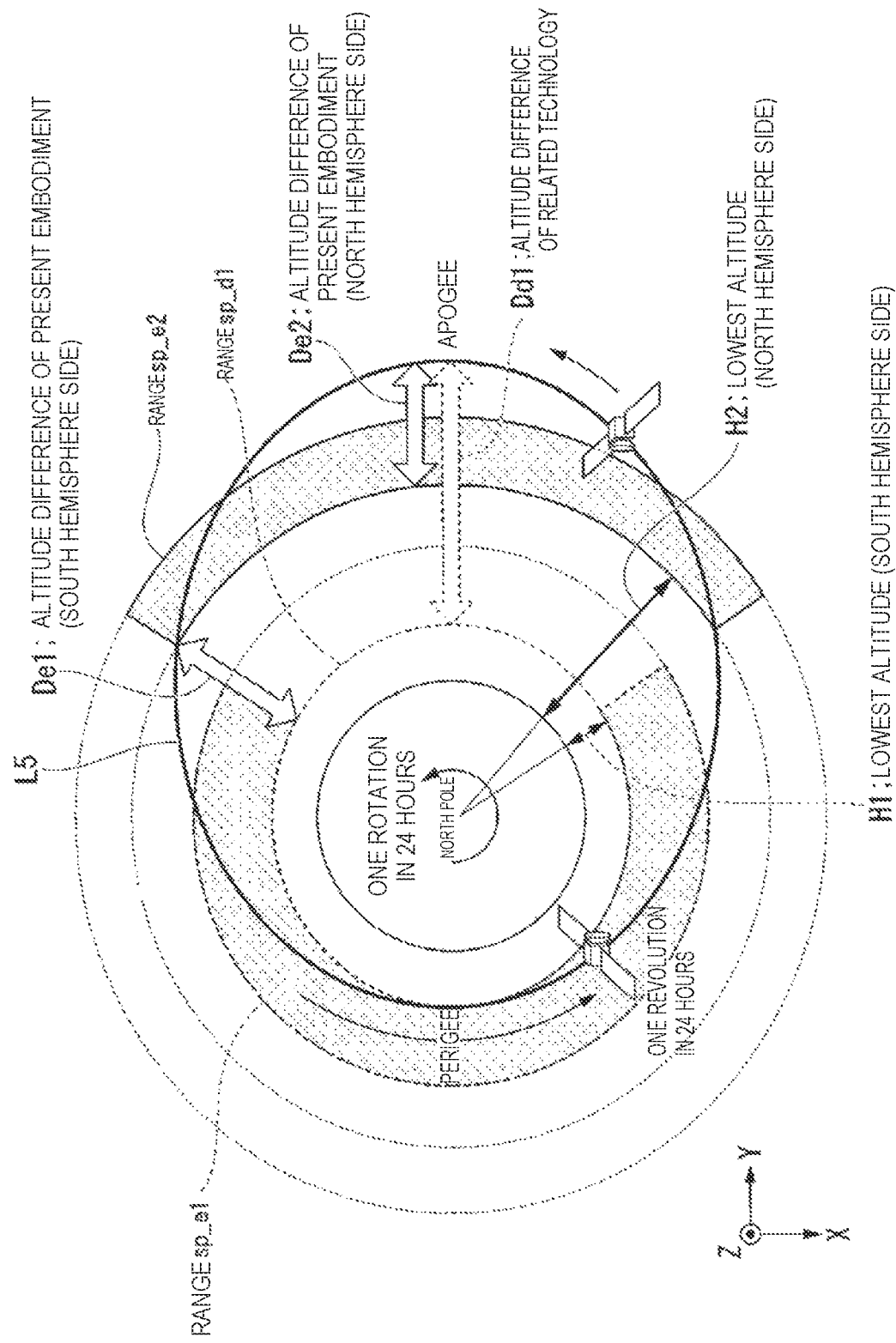
FIG. 10 is a diagram illustrating altitude differences of an elliptical-orbit satellite used for calculation of interference evaluation in the related technology and the second embodiment.
Figure 11:
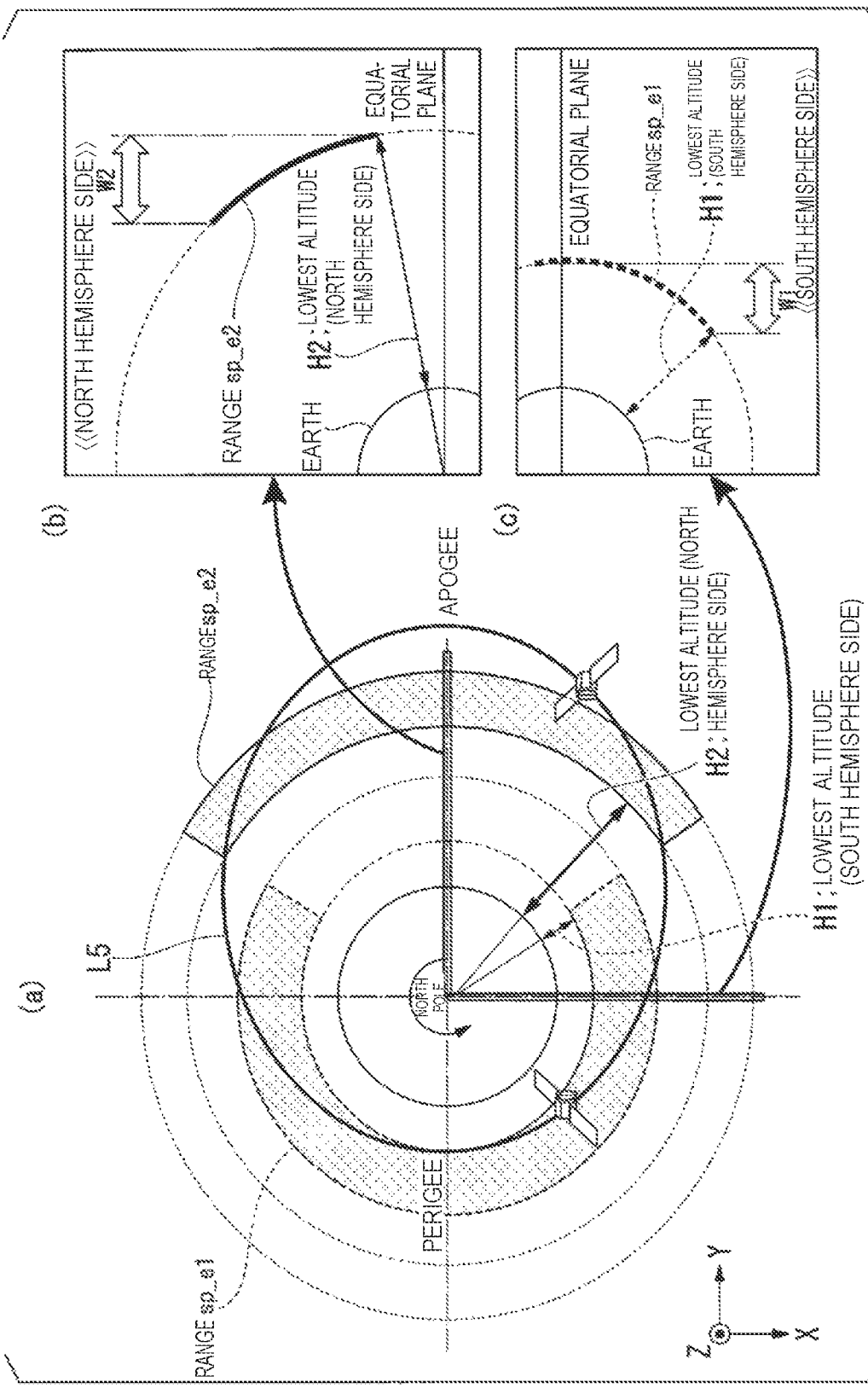
FIG. 11 is a diagram illustrating the range of an interference calculation target artificial satellite according to the second embodiment.

FIG. 10 is a diagram illustrating altitude differences of an elliptical-orbit satellite, which are used in interference calculation of the related technology and the present embodiment. FIG. 11 is a diagram illustrating ranges of an interference calculation target artificial satellite. FIG. 11 is a reference for FIG. 10, and FIGS. 10 and 11 are used together for understanding of the following description.

FIG. 10 illustrates a situation in which a quasi-zenith satellite orbits around the Earth when viewed from a viewpoint in a cosmic space directly above the North Pole and far from the Earth. As understood from the drawing, the quasi-zenith satellite has the elliptical orbit L5 having a focus at Earth. The satellite of the elliptical orbit L5 flies at high speed on a side corresponding to the perigee and moves at low speed on a side corresponding to the apogee. In the present embodiment, the range of calculation is divided into the two ranges sp_e1 and sp_e2 roughly on the perigee and apogee sides. The altitude of the range sp_e1 closer to the Earth is the altitude (lowest altitude H1) of the perigee, and the altitude of the range sp_e2 farther from the Earth is the altitude (lowest altitude H2) of the orbit of the satellite when being closest to the Earth in the range sp_e2.

In the related technology, the altitude of the range sp_d1 (same as the range sp_d1 illustrated in FIG. 8(a)) of calculation, which is considered in interference evaluation, is the altitude (lowest altitude H1) of the perigee. Comparison between the related technology and the present embodiment indicates that, as for altitude differences from the actual orbit L5 of the quasi-zenith satellite, altitude differences De1 and De2 (the ranges sp_e1 and sp_e2 in FIGS. 9 and 10) set in the present embodiment are significantly reduced from an altitude difference Dd1 of the related technology (the range sp_d1 in FIGS. 8 and 10). In this manner, the difference between the actual satellite orbit and the apogee altitude can be reduced with the two divided ranges of the present embodiment as compared to the related technology.

FIG. 11(a) illustrates FIG. 10. FIGS. 11(b) and 11(c) illustrate the YZ plane and the XZ plane, respectively, in FIG. 11(a) in more detail.

FIG. 11(b) is a diagram of the YZ plane when viewed from a viewpoint in the direction of the equator. It can be understood that the range sp_e2 in which the satellite is assumed to exist in the interference calculation of the present embodiment is part of an arc. The range sp_e2 indicated as part of the arc has a width W2 illustrated with a double-headed arrow in the Y-axis direction. The lowest altitude H2 of the range sp_e2 is indicated with an arrow from the ground surface of the north hemisphere.

FIG. 11(c) is a diagram of the XZ plane when viewed from a viewpoint in the direction of the equator. It can be understood that the range sp_e1 in which the satellite is assumed to exist in the interference calculation of the present embodiment is part of an arc. The range sp_e1 indicated as part of the arc has a width W1 illustrated with a double-headed arrow in the X-axis direction. The lowest altitude H1 of the range sp_e1 is indicated with an arrow from the ground surface of the south hemisphere.

The two ranges sp_e1 and sp_e2 in which the satellite is assumed to exist in the interference calculation are rectangles partially having spherical surfaces as the sections thereof are illustrated in FIGS. 11(b) and 11(c). Thus, each range is an arc-shaped range having a width in the direction of distance to the Earth when viewed from a far place in the overhead space of the North Pole illustrated in FIG. 11(a) (same as FIG. 10).

The present embodiment is different from the first embodiment in that the range acquisition unit 13 of the interference power estimation device 1 acquires the ranges sp_e1' and sp_e2' illustrated in FIG. 9(b) and the altitude calculation unit 14 calculates the lowest altitudes H1 and H2 of the ranges sp_e1' and sp_e2'. Accordingly, at step S110 in FIG. 22, the repetitive processing unit 102 of the range interference calculation unit 16 can set the processing target range to be the ranges sp_e1 and sp_e2 illustrated in FIG. 9(a).

Third Embodiment

A low-earth-orbit satellite completes revolution around the Earth faster than a geostationary satellite of an orbit that completes revolution around the Earth in 24 hours and appears at a stationary position in the overhead space when viewed from the ground. Unlike such a satellite having a low orbit, another satellite employs an irregular orbit to cover areas at high latitude. When sufficient performance cannot be obtained only with one satellite employing such an orbit, a plurality of satellites are often operated in a manner complementing each other to configure a satellite system.

A multi-satellite system is a satellite system that is operated in a configuration including a plurality of satellites as described above. In the multi-satellite system, two or more target satellites are simultaneously seen from a ground station in some cases. For example, in an open place in the Japanese archipelago, one of the satellites is observed at a high position in the overhead space, and simultaneously, another one of the satellites is seen at another position. In other words, interference radio waves from a plurality of satellites simultaneously arrive at the ground station. In this manner, the interference radio waves from a plurality of simultaneously arriving satellites need to be taken into consideration and reflected on interference calculation.

In a third embodiment, the interference power estimation device calculates the amount of interference a radio station on the ground receives from a plurality of satellites.

In addition, in the present embodiment, the quasi-zenith satellite "Michibiki", which has a relatively small number of satellites, is described as a specific example of a satellite system configured and operated by a plurality of satellites. "Michibiki" is utilized for a Japanese GPS and operated with four satellites.

Figure 12:
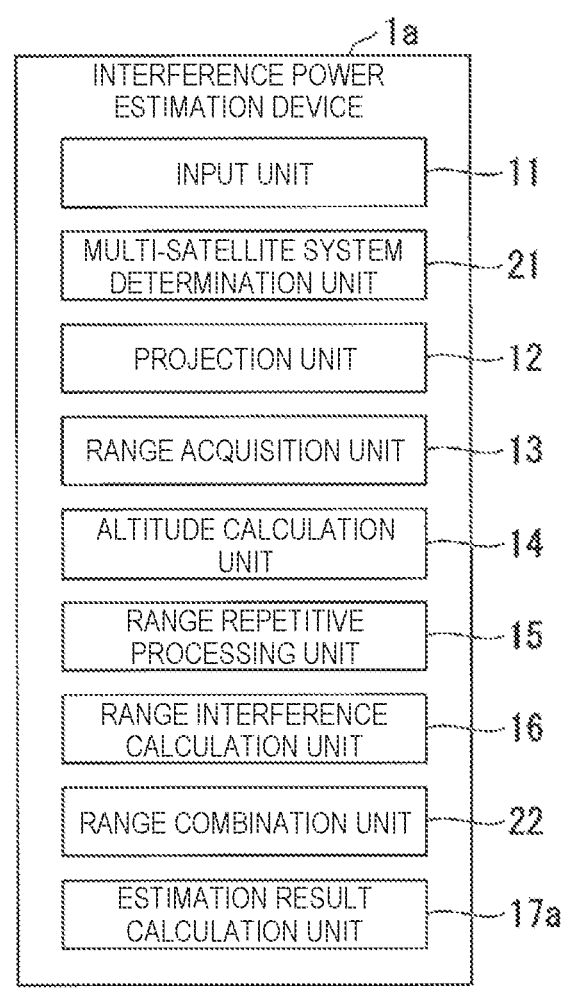
FIG. 12 is a functional block diagram illustrating the configuration of an interference power estimation device according to a third embodiment.

FIG. 12 is a functional block diagram illustrating the configuration of an interference power estimation device 1a according to the present embodiment. In the drawing, any part identical to that of the interference power estimation device 1 according to the first embodiment illustrated in FIG. 5 is denoted by an identical reference sign, and description thereof is omitted. The interference power estimation device 1a illustrated in the drawing is different from the interference power estimation device 1 illustrated in FIG. 5 in that a multi-satellite system determination unit 21 and a range combination unit 22 are additionally included and an estimation result calculation unit 17a is included in place of the estimation result calculation unit 17. The multi-satellite system determination unit 21 determines whether a satellite system that interferes with a ground station is a multi-satellite system. The range combination unit 22 acquires a combination of ranges, in the overhead spaces of which a plurality of satellites of the multi-satellite system exist at the same timing among a plurality of divided ranges. The estimation result calculation unit 17a calculates the total amount of interference of the multi-satellite system with the ground station by summing interference amounts calculated by the range interference calculation unit 16 for the ranges, in the overhead spaces of which the plurality of satellites of the multi-satellite system exist. When the combination of ranges, in the overhead space of which the plurality of satellites exist is different depending on time, the estimation result calculation unit 17a calculates the total amount of interference with the ground station for each of the different combinations of ranges and sets the maximum total amount of interference among the calculated total amounts of interference to be an estimation result of the amount of interference of the multi-satellite system with the ground station.

Figure 13:
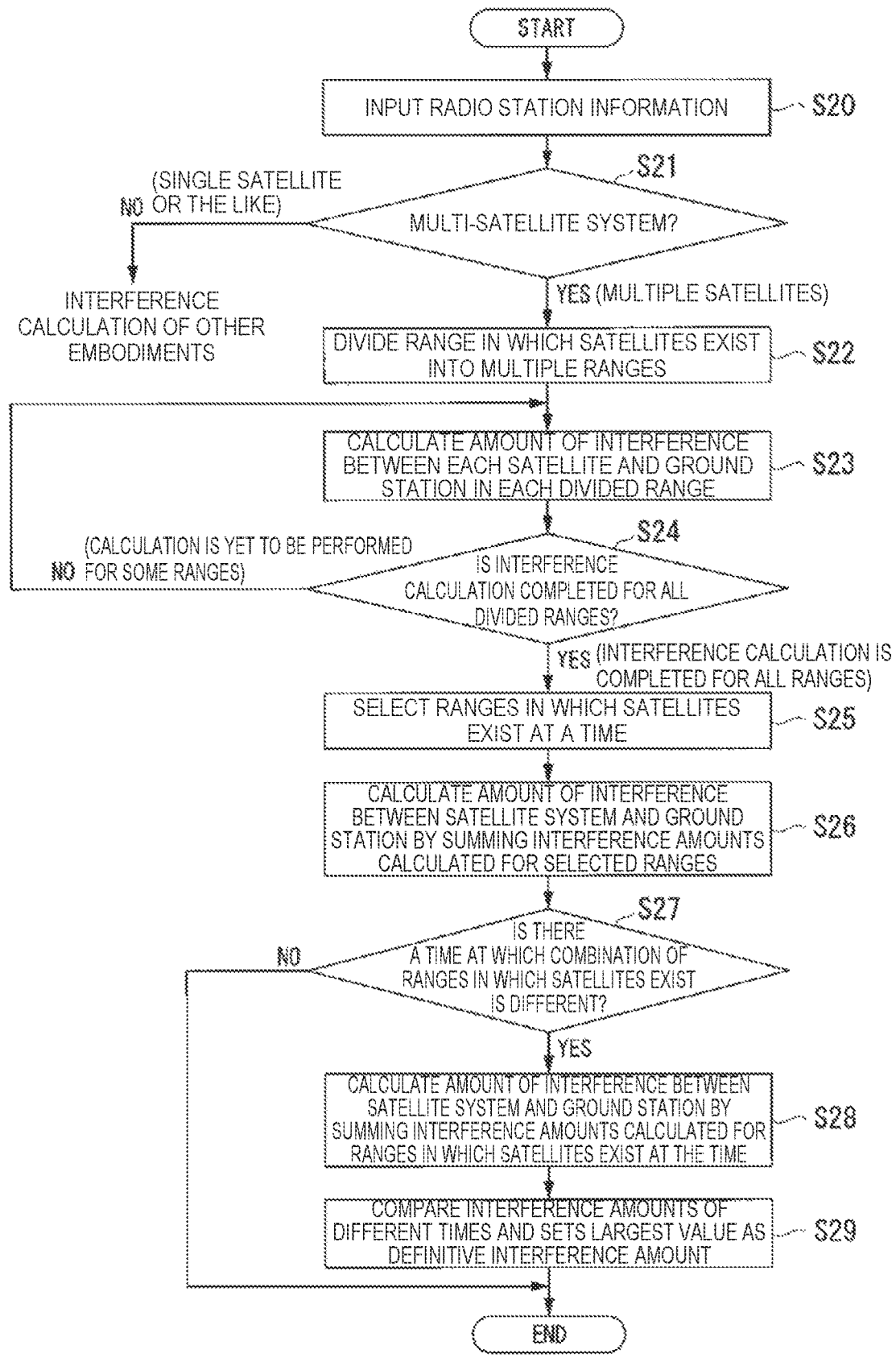
FIG. 13 is a flowchart illustrating interference calculation processing executed by the interference power estimation device according to the third embodiment.

FIG. 13 is a flowchart illustrating interference calculation processing executed by the interference power estimation device 1a of the present embodiment. The interference calculation processing illustrated in the drawing calculates the amount of interference that a radio station (ground station) on the ground receives from all of a plurality of satellites of a satellite system (multi-satellite system). The input unit 11 receives information of the satellites and the ground station, which is same as that in the first embodiment, and information that the satellite system is a multi-satellite system (step S20).

When calculating interference between the multi-satellite system and the ground station, the interference power estimation device 1a performs division into a plurality of ranges, in the overhead spaces of which the satellites exist on a map in accordance with the orbit thereof at the first stage. Thus, at this first stage, the multi-satellite system determination unit 21 first determines whether the satellite system that provides interference waves to the ground station is a multi-satellite system (step S21). When the multi-satellite system determination unit 21 determines that the satellite system is not a multi-satellite system (NO at step S21), the interference power estimation device 1a performs interference calculation according to other embodiments. When the multi-satellite system determination unit 21 determines that the satellite system is a multi-satellite system (YES at step S21), the projection unit 12 projects the orbit of each satellite onto the map. Similarly to the first embodiment or the second embodiment, the range acquisition unit 13 determines a plurality of divided ranges so that all orbits projected onto the map are included in the ranges (step S22). The range acquisition unit 13 calculates the latitude and longitude of each divided range, and the altitude calculation unit 14 calculates the lowest altitude of the satellite in each divided range.

At the second stage, the interference power estimation device 1a calculates interference between the satellite and the ground station for each divided range and calculates the interference amount for the range. At this second stage, the range repetitive processing unit 15 instructs the range interference calculation unit 16 to calculate the interference amount of each divided range. The range interference calculation unit 16 calculates the amount of interference between the satellite and the ground station for each divided range in a manner same as in the first embodiment or the second embodiment (step S23).

Thereafter, the range repetitive processing unit 15 determines whether the interference calculation is ended for all divided ranges (step S24). When having determined through this check that there is a range for which the calculation is yet to be performed (NO at step S24), the range repetitive processing unit 15 returns to the previous processing at step S23. When having determined that the interference calculation is completed for all divided ranges (YES at step S24), the range repetitive processing unit 15 proceeds to the next processing at step S25.

Subsequently at the third stage, the interference power estimation device 1a selects a plurality of ranges in which the satellites of the multi-satellite system exist at a time and calculates the amount of interference between the multi-satellite system and the ground station by summing the calculated amounts of interference of the plurality of selected ranges with the ground station.

First at this third stage, the range combination unit 22 selects a plurality of ranges, in the overhead space of which the satellites of the multi-satellite system exist at a time among the plurality of divided ranges (step S25). After description of the interference calculation processing in FIG. 13, a specific case will be described in detail with an example of a multi-satellite system illustrated in FIG. 14 and orbit transition of the multi-satellite system illustrated in FIG. 15. The estimation result calculation unit 17a calculates the amount of interference between the multi-satellite system and the ground station by summing the calculated amounts of interference of the plurality of selected ranges with the ground station (step S26).

Subsequently at the fourth stage, when the combination of ranges, in the overhead spaces of which the satellites exist is different at another time, the interference power estimation device 1a calculates the amount of interference between the multi-satellite system and the ground station by summing the amounts of interference of the plurality of ranges at another time with the ground station, similarly to the third stage. After the description of the interference calculation processing in FIG. 13, a specific example in which the combination of ranges, in the overhead spaces of which the satellites exist is different at another time will be described in detail with an example of the multi-satellite system illustrated in FIG. 14 and orbit transition of the multi-satellite system illustrated in FIG. 15.

At the fourth stage, following the above-described processing at steps S25 and S26, the range combination unit 22 checks whether the combination of a plurality of ranges in which the satellites exist is same at a time different from a time as a target in the two pieces of processing (step S27). When the range combination unit 22 determines through this check that the combination of a plurality of ranges in which the satellites exist is same at another time (NO at step S27), there is no change from the interference amount calculated at step S26. Thus, the estimation result calculation unit 17a outputs the interference amount calculated at step S26 and ends the interference calculation processing in FIG. 13.

When having determined that the combination of a plurality of ranges, in the overhead spaces of which the satellites exist is different at another time (YES at step S27), the range combination unit 22 outputs the different combination to the estimation result calculation unit 17a. Similarly to step S26, the estimation result calculation unit 17a calculates the amount of interference between the multi-satellite system and the ground station by summing the amounts of interference of the plurality of ranges in the different combination notified by the range combination unit 22 with the ground station (step S28).

Lastly, the estimation result calculation unit 17a compares the interference amounts calculated for the different times and presents the largest value among the compared values as a definitive estimation result. In the interference calculation processing illustrated in FIG. 13, before this last stage, the range combination unit 22 checks that the combination of a plurality of ranges is different between different times (YES at step S27). The estimation result calculation unit 17a compares the interference amounts for the times used at steps S25 and S28 and presents the largest value as a definitive interference amount estimation result (step S29).

In this manner, in the present embodiment, the interference power estimation device calculates the amount of interference that the ground station simultaneously receives from all satellites of the same satellite system based on the interference amounts calculated for the ranges in which the plurality of satellites exist.

Figure 14:
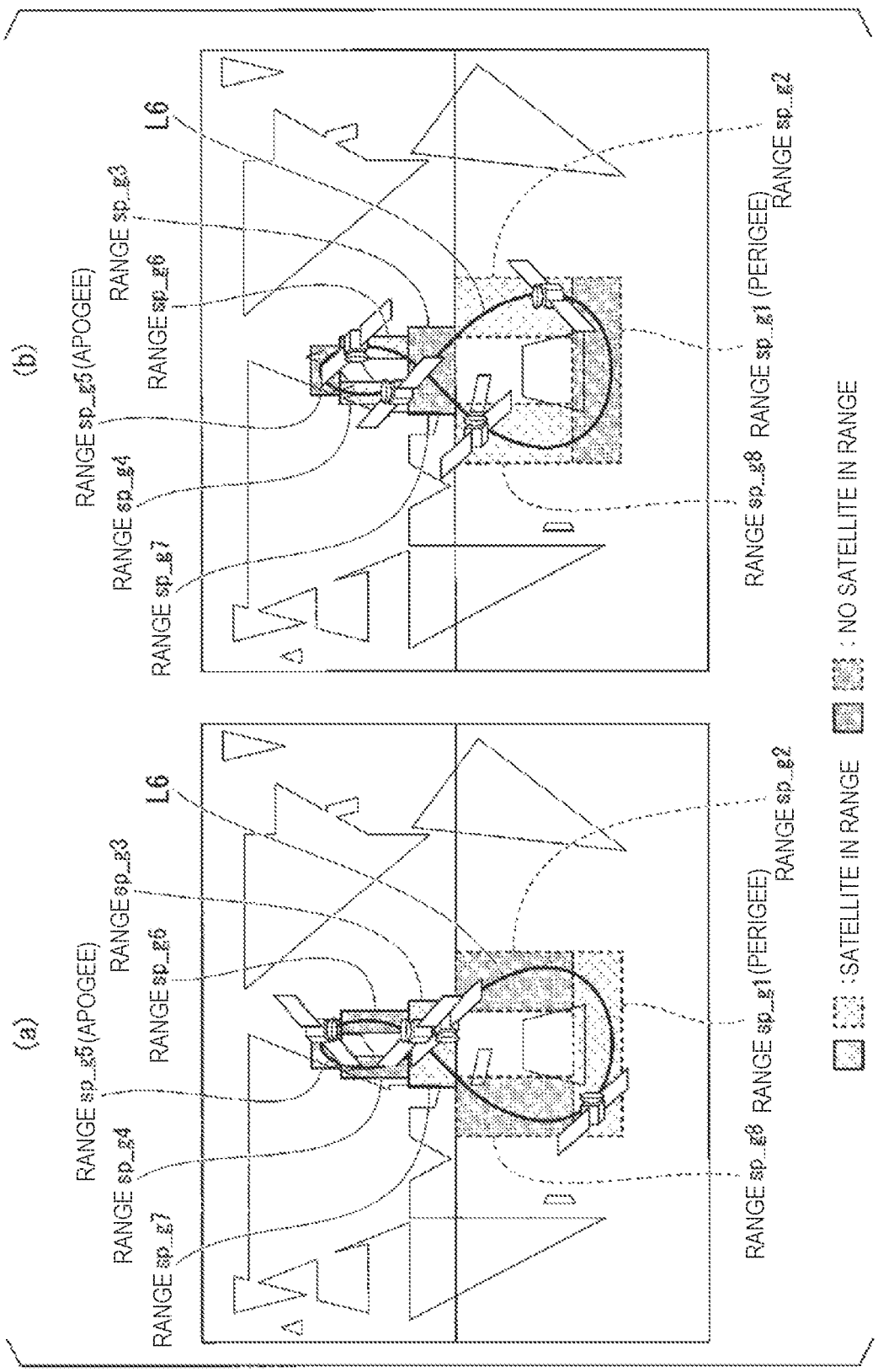
FIG. 14 is a diagram for description of interference calculation of a multi-satellite system according to the third embodiment.

FIG. 14 is a diagram for description of calculation of interference of a multi-satellite system according to the present embodiment.

A specific example of the multi-satellite system is the quasi-zenith satellite "Michibiki". The quasi-zenith satellite "Michibiki" has four satellites (the first satellite, the second satellite, the third satellite, and the fourth satellite), and these satellites have quasi-zenith orbits similar to each other. FIG. 14(a) illustrates the positions of the four satellites on the quasi-zenith orbits at a time. FIG. 14(b) illustrates the positions of the four satellites on the quasi-zenith orbits at a time different from that of FIG. 14(a).

FIGS. 14(a) and (b) illustrate a situation in which division into eight ranges on a map, in the overhead spaces of which the satellites exist is performed based on information of projection of the orbits of the quasi-zenith satellites onto the map. An orbit L6 obtained by projecting the orbit of each quasi-zenith satellite onto the map is a figure-of-eight route. Since the satellite completes revolution through the orbit L6 in one day (24 hours), the range acquisition unit 13 cuts out, as a rectangle, a range in which the satellite exists on the map in each three hours approximately. In the south hemisphere, the orbit of the satellite is at the perigee, and thus the satellite moves relatively fast. The Japanese archipelago and its periphery in the north hemisphere correspond to the apogee, and thus the moving speed of the satellite decreases. The range acquisition unit 13 considers such difference in the moving speed when performing division into ranges in which the satellite exists. Specifically, the ranges are smaller as the moving speed is lower, and the ranges are larger as the moving speed is higher.

With the number of divided ranges and the number of satellites, it is thought that ranges, in the overhead space of which satellites exist and ranges, in the overhead space of which no satellites exist alternately appear along the orbit L6 at a time. Thus, as in the situation illustrated in FIGS. 14(a) and 14(b), there are two situations of the combination of ranges, in the overhead spaces of which the satellites exist and ranges, in the overhead space of which no satellites exist. In the situation illustrated in FIG. 14(a), the ranges, in the overhead spaces of which the satellites exist are ranges sp_g1 and sp_g3 including the perigee and ranges sp_g5 and sp_g7 including the apogee, and the four satellites each exist in the corresponding one of the overhead spaces of the ranges sp_g1, sp_g3, sp_g5, and sp_g7. However, among these ranges, the ranges sp_g3 and sp_g7 overlap each other at the same place, and two satellites exist in this range. Thus, one or two satellites exist in the overhead spaces of some of seven divided ranges of the quasi-zenith orbit L6 projected onto the map. However, when it is regarded as in the original setting that the ranges sp_g3 and sp_g7 can be distinguished from each other along the orbit, it is thought that one satellite exists in the overhead space of each of the four ranges sp_g1, sp_g3, sp_g5, and sp_g7. In the other situation illustrated in FIG. 14(b), the ranges in the overhead spaces of which the satellites exist are ranges sp_g2, sp_g4, sp_g6, and sp_g8. One satellite exists in the overhead space of each of these ranges among the eight divided ranges of the quasi-zenith orbit L6 projected onto the map. Under this condition, the interference power estimation device 1a calculates the amount of interference of the entire multi-satellite system (four satellites) with the ground station.

At step S23 in FIG. 13, the range interference calculation unit 16 calculates the interference amount by performing calculation of interference between a satellite in the overhead space of each of these divided ranges sp_g1, sp_g2, sp_g3, sp_g4, sp_g5, sp_g6, sp_g7, and sp_g8 and a radio station on the ground. The ranges sp_g3 and sp_g7 may be regarded as an identical range, and interference calculation of one of the ranges may be omitted.

Then, at step S26 in FIG. 13, the estimation result calculation unit 17a calculates the sum of the interference amounts calculated for the four ranges sp_g1, sp_g3, sp_g5, and sp_g7, in the overhead spaces of which the satellites exist in FIG. 14(a). Similarly, at step S28 in FIG. 13, the estimation result calculation unit 17a calculates the sum of the interference amounts calculated for the ranges sp_g2, sp_g4, sp_g6, and sp_g8, in the overhead spaces of which the satellites exist in FIG. 14(b). At step S29 in FIG. 13, the estimation result calculation unit 17a compares the interference amount sums calculated for the two patterns of the combination of ranges in which the four satellites exist, and selects the larger sum as a definitive estimation result of the amount of interference of the multi-satellite system with the ground station.

Figure 15:
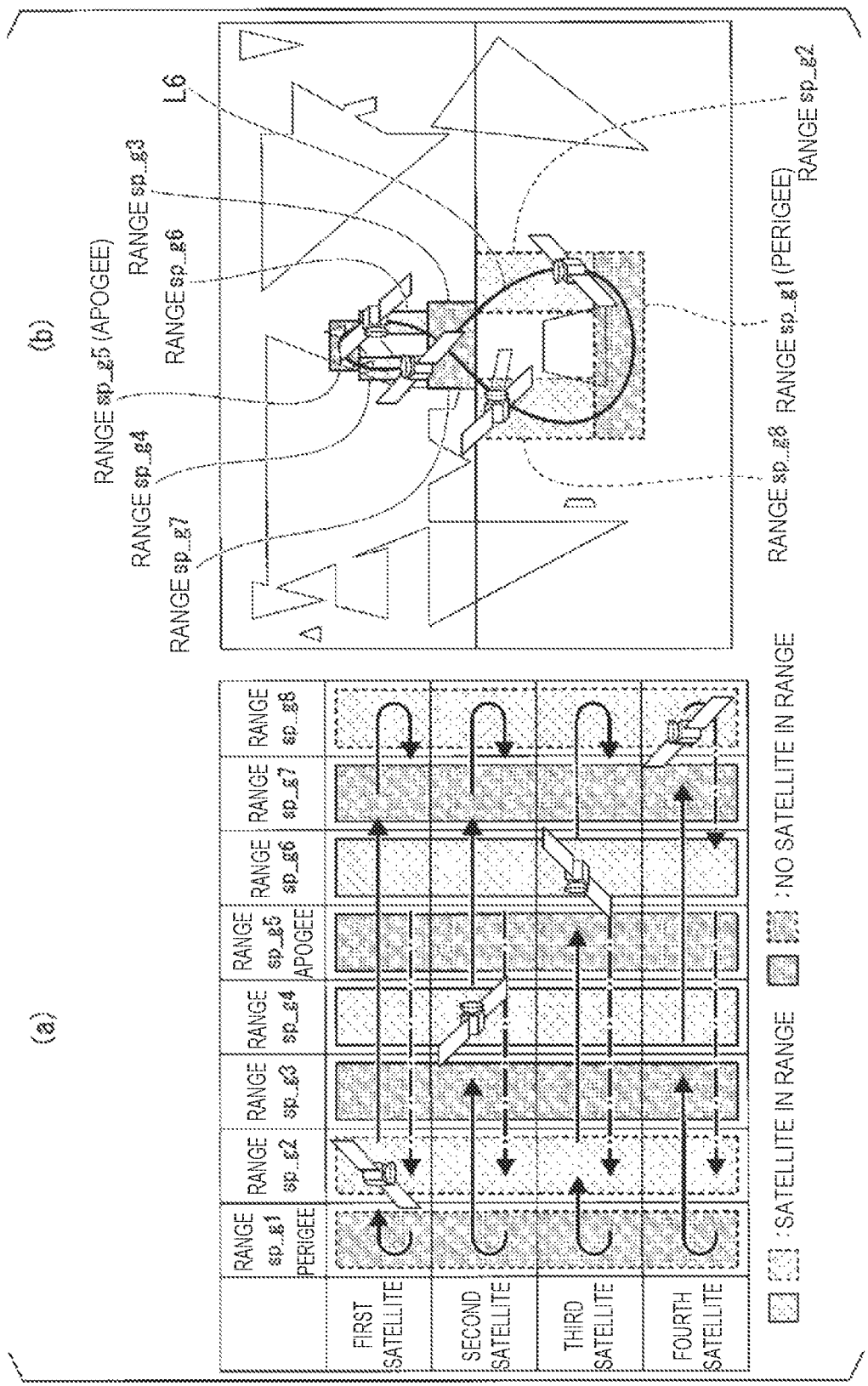
FIG. 15 is a diagram illustrating orbit transition of the multi-satellite system through a plurality of divided ranges according to the third embodiment.

FIG. 15 is a diagram illustrating orbit transition of the multi-satellite system in a plurality of divided ranges.

The following discusses, with reference to FIG. 15, whether to evaluate interference for the two combination patterns illustrated in FIG. 14 described above. These combination patterns are related to the selection of combination of a plurality of ranges, in other words, steps S25, S27, and S28 in the interference calculation processing illustrated in FIG. 13 described above.

The ranges sp_g1, sp_g2, sp_g3, sp_g4, sp_g5, sp_g6, sp_g7, and sp_g8 are blocks of eight divided ranges, in the overhead spaces of which the quasi-zenith orbit satellites potentially exist. A table illustrated in FIG. 15(a) indicates a situation in which the four satellites (the first satellite, the second satellite, the third satellite, and the fourth satellite) of the quasi-zenith satellite system move in the overhead spaces of the ranges sp_g1, sp_g2, sp_g3, sp_g4, sp_g5, sp_g6, sp_g7, and sp_g8. The eight ranges are distinguished in accordance with whether the satellites exist in the overhead spaces of the ranges at a time. According to the table illustrated in FIG. 15(a), the ranges, in the overhead spaces of which the four satellites of the multi-satellite system exist sequentially change, and the four satellites alternately occupy the ranges.

FIG. 15(b) illustrates the positions of the eight divided ranges in the table illustrated in FIG. 15(a) on the map. The quasi-zenith orbit L6 projected onto the map has a figure of eight across the equator. The orbit L6 is sequentially divided into the eight ranges sp_g1, sp_g2, sp_g3, sp_g4, sp_g5, sp_g6, sp_g7, and sp_g8. Among these ranges, the range sp_g1 is located most on the south side and includes the perigee, and the range sp_g5 is located most on the north side and includes the apogee. The ranges sp_g1, sp_g2, and sp_g8 on the south side of the equator are larger than the ranges sp_g4, sp_g5, and sp_g6 on the north side of the equator. This is because the speed at which the satellites move at the perigee (included in the range sp_g1) is faster than that at the apogee (included in the range sp_g5). Thus, the satellites move a longer distance on the orbit L6 on the south side of the equator for the same duration. Since the quasi-zenith orbit completes a figure of eight in 24 hours, each of the eight divided ranges corresponds to travel distance in three hours approximately. The table of FIG. 15(a) indicates four ranges sp_g2, sp_g4, sp_g6, and sp_g8, in the overhead spaces of which the satellites exist at a time. "A time" corresponds to "a time" at step S25 of the interference calculation processing in FIG. 13 described above.

In the table of FIG. 15(a), the four satellites transition to the overhead spaces of the ranges sp_g1, sp_g3, sp_g5, and sp_g7 at the next time. The range combination unit 22 checks and determines whether the combination (sp_g1, sp_g3, sp_g5, and sp_g7) of a plurality of ranges, in the overhead spaces of which the satellites exist at a time different from "a time" is same as the previously selected combination (sp_g2, sp_g4, sp_g6, and sp_g8) of a plurality of ranges at "a time" (step S27 in FIG. 13). In this example, the combinations are different from each other, and thus, following this determination result, the estimation result calculation unit 17a calculates the amount of interference between the satellite system and the ground station by summing the interference amounts calculated for the ranges in which the satellites exist at the time (step S28 in FIG. 13).

Subsequently, the four satellites are again in the overhead spaces of the ranges sp_g2, sp_g4, sp_g6, and sp_g8. This combination of ranges is same as the combination of a plurality of ranges at a time before the previous one. Thus, in this case, interference calculation obtains the same result, and thus the interference amount does not need to be newly calculated. Thus, the interference amount sum needs to be compared only between the above-described two patterns of combination of four ranges.

According to the present embodiment, it is possible to calculate interference between a multi-satellite system including a plurality of satellites and a ground station.

Fourth Embodiment

In a fourth embodiment, an interference calculation method is selected and switched depending on whether a satellite is geostationary or circulating (the range of calculation is partially the whole sky or a polar orbit). The following mainly describes difference from the first embodiment, and the difference may be combined with the second embodiment.

Figure 16:
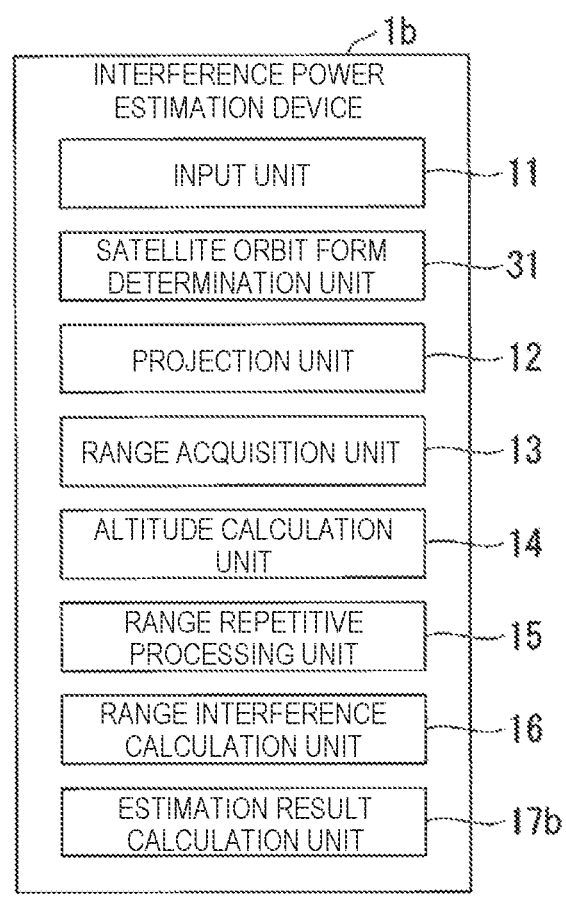
FIG. 16 is a functional block diagram illustrating the configuration of an interference power estimation device according to a fourth embodiment.

FIG. 16 is a functional block diagram illustrating the configuration of an interference power estimation device 1b according to the present embodiment. In the drawing, any part identical to that of the interference power estimation device 1 according to the first embodiment illustrated in FIG. 5 is denoted by an identical reference sign, and description thereof is omitted. The interference power estimation device 1b illustrated in the drawing is different from the interference power estimation device 1 illustrated in FIG. 5 in that a satellite orbit form determination unit 31 is additionally included and an estimation result calculation unit 17b is included in place of the estimation result calculation unit 17. The satellite orbit form determination unit 31 determines the form of the orbit of a satellite. The estimation result calculation unit 17b calculates the amount of interference of a satellite system with a ground station in accordance with the form of the orbit of the satellite.

Figure 17:
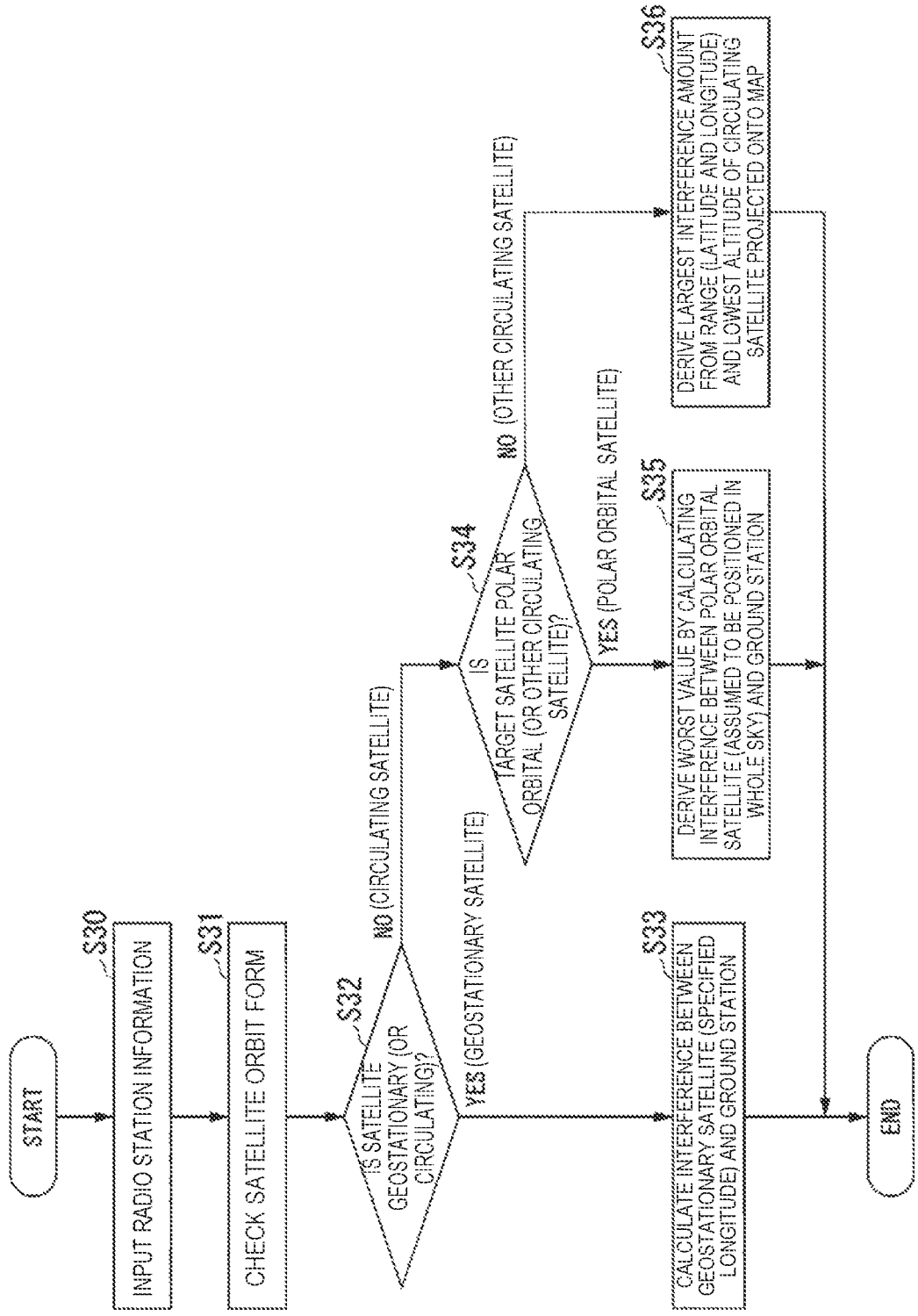
FIG. 17 is a flowchart illustrating interference calculation processing executed by the interference power estimation device according to the fourth embodiment.
Figure 20:
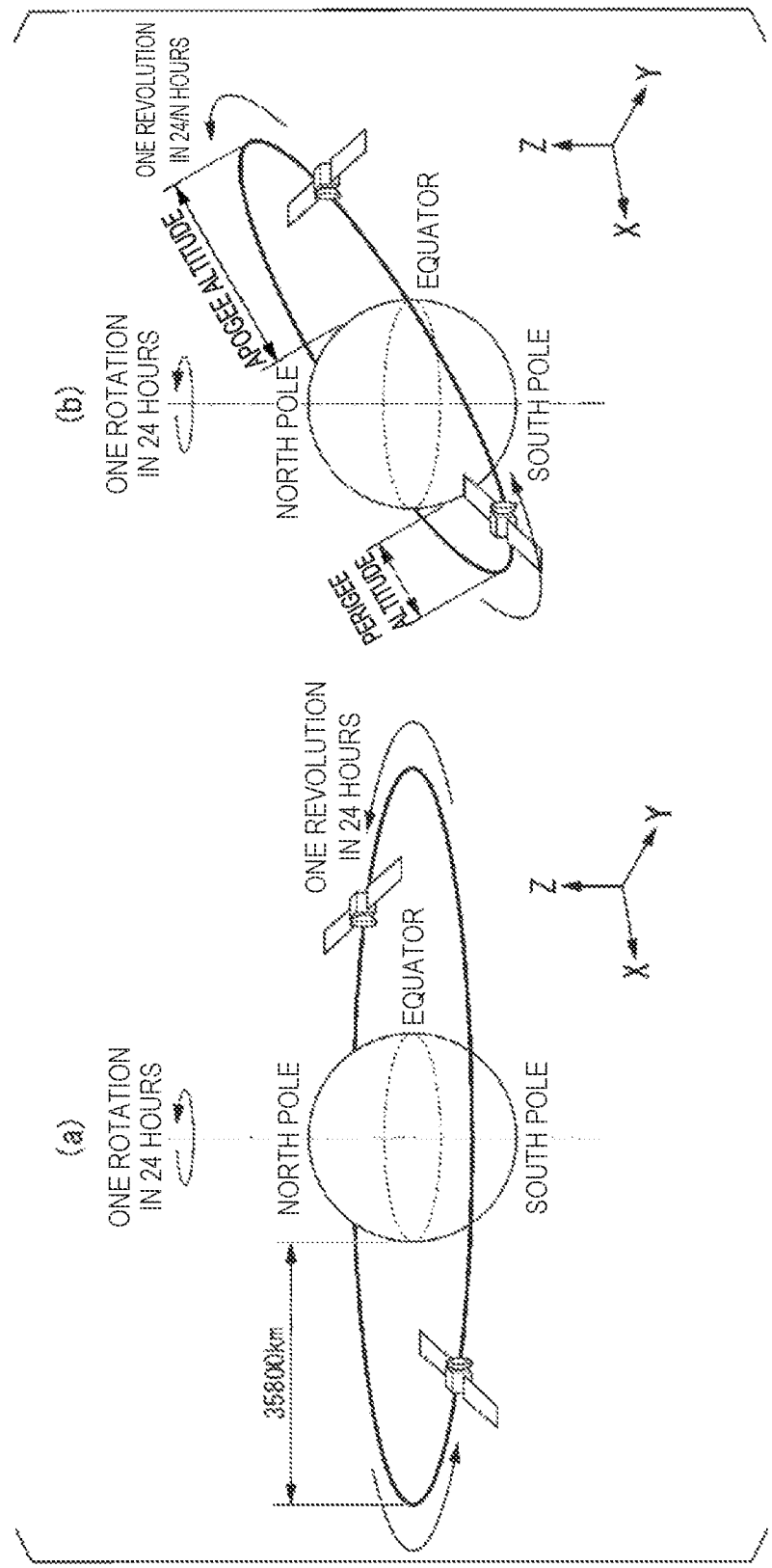
FIG. 20 is a diagram illustrating exemplary satellite orbits.

FIG. 17 is a flowchart illustrating interference calculation processing executed by the interference power estimation device 1b according to the present embodiment. The interference calculation processing illustrated in the drawing calculates the interference power by a calculation method in accordance with the kind of the orbit of a satellite. The description with reference to the flow illustrated in the drawing is also made on application of the orbit of a satellite (a geostationary satellite and a circulating satellite illustrated in FIG. 20, the recurrent satellite illustrated in FIG. 4, the quasi-zenith satellite illustrated in FIG. 9, or a polar orbital satellite illustrated in FIG. 18 to be described later) to the range of calculation.

First, information of a radio station is input through the input unit 11. The information includes the form (kind) of satellite orbit (step S30). The satellite orbit form determination unit 31 checks the form of satellite orbit before calculation of interference between a satellite and a ground station (step S31). After having checked the form of orbit, the satellite orbit form determination unit 31 performs first determination processing (step S32). In the first determination processing, whether the target satellite is a geostationary satellite (or a circulating satellite) is determined. The geostationary satellite has a circular orbit on the equatorial plane as illustrated in FIG. 20(a), has an altitude of 35,800 km, and completes revolution around the Earth in 24 hours like the rotation of the Earth.

When having determined that the satellite is a geostationary satellite in the first determination processing (YES at step S32), the satellite orbit form determination unit 31 proceeds to the next step S33. The range interference calculation unit 16 calculates interference between the geostationary satellite and the ground station (step S33). Specifically, the range interference calculation unit 16 sets the number n of interference providing station positions to be one and performs the processing at step S110 and later in FIG. 22. In the case of the geostationary satellite, the longitude of the satellite is input at step S30. Accordingly, the latitude $\theta_{Ai}$, longitude $\phi_{Ai}$, and altitude $h_{Ai}$ of an interference providing station $A_i$ are 0°, the input latitude, and 35,800 km, respectively. The estimation result calculation unit 17b presents and outputs an interference amount calculated by the range interference calculation unit 16.

When having determined that the satellite is a circulating satellite in the first determination processing (NO at step S32), the satellite orbit form determination unit 31 performs second determination processing (step S34). In the second determination processing, the satellite orbit form determination unit 31 determines whether the target satellite is a polar orbital satellite (not a polar orbital satellite or another circulating satellite) (step S34). When having determined that the satellite is a polar orbital satellite in the second determination processing (YES at step S34), the satellite orbit form determination unit 31 proceeds to the next processing at step S35. The polar orbit will be described later with reference to FIG. 18, and the satellite orbit passes through the North and South Poles of the Earth or has an orbital plane close to the north-south axis of the Earth. Thus, in the case of a polar orbital satellite, the range in which the satellite exists cannot be limited, and the satellite is assumed to be positioned in the whole sky.

Thus, in calculation of interference between the polar orbital satellite and the ground station, the interference power estimation device 1b sets the whole sky at a set altitude as a range in which the satellite is positioned, and derives a worst value of the interference amount for each position in the range (step S35). In other words, the range interference calculation unit 16 sets the whole sky at an altitude input by the user as a predetermined target range and performs the processing at step S110 and later in FIG. 22, and the estimation result calculation unit 17b presents and outputs, as an estimation result, an interference amount calculated by the range interference calculation unit 16.

When having determined that the satellite is another circulating satellite in the second determination processing (NO at step S34), the satellite orbit form determination unit 31 proceeds to the processing at step S36. Examples of another circulating satellite include the circulating satellite in FIG. 20(b) described above, the recurrent satellite illustrated in FIG. 4 in the first embodiment, and the quasi-zenith satellite illustrated in FIG. 9 in the second embodiment. The interference power estimation device 1b derives the largest interference amount based on each divided range (latitude and longitude) on a map onto which the orbit of the circulating satellite is projected and the lowest altitude of the satellite in the range (step S36). The processing at step S36 uses the method of evaluating interference between a satellite and a ground station, which is described above in each of the first and second embodiments.

Figure 18:
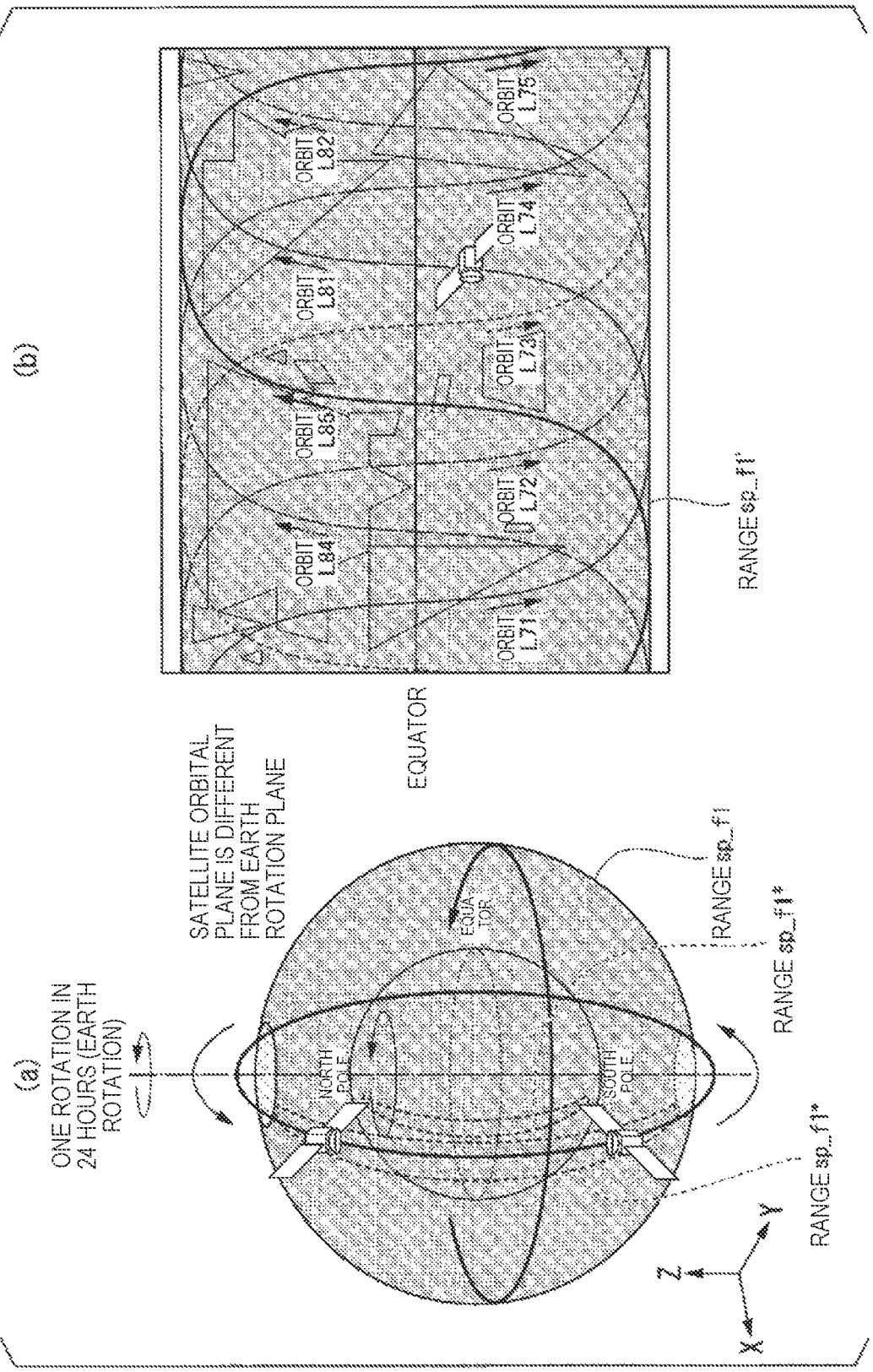
FIG. 18 is a diagram illustrating a range in which a polar orbital satellite exists.

The following describes a polar orbital satellite. FIG. 18 is a diagram illustrating a range in which the polar orbital satellite exists. FIG. 18(a) is a panoramic view of the polar orbital satellite. A polar orbit is an orbit through which the satellite moves near the North and South Poles of the Earth. As the Earth rotates in 24 hours, the satellite passes through different places on the Earth each time the satellite moves in the north-south direction since the orbital plane of the polar orbital satellite is different from the rotation of the Earth. When the polar orbital satellite completes half revolution of the Earth, a range sp_f1* in which the satellite exists is a rectangle elongated in the north-south direction. When projected onto the ground surface, the range sp_f1* is a range sp_f1‡ shaped in a rectangle elongated in the north-south direction. The range sp_f1* in which the satellite exists or the range sp_f1‡ as projection onto the ground surface passes through a different place on the ground surface each time the polar orbital satellite orbits around the Earth. As a result, after the polar orbital satellite has orbited around the Earth a number of times for several days, a range sp_f1 through which the satellite has passed entirely covers the Earth.

FIG. 18(b) illustrates a status in which the range sp_f1 in which the polar orbital satellite exists is projected onto the map. As described above, when projected onto the map, the range sp_f1 of the polar orbital satellite, which covers the Earth, becomes a substantially entire range sp_f1' on the ground surface. When the polar orbital satellite completes five revolutions approximately in one day, orbits through which the satellite passes on the map illustrated in FIG. 18(b) are orbits L71 to L75 (orbits through which the satellite completes half revolution from the North Pole to the South Pole) and orbits L81 to L85 (orbits of half revolution returning from the South Pole to the North Pole). When the polar orbital satellite moves on north-south orbits of the Earth for several days in this manner, the same orbit covers different positions in the east-west direction on the ground surface. As a result, when interference between such a polar orbital satellite and a radio station on the ground is calculated, it is regarded that the satellite exists across the whole sky covering the Earth (the range sp_f1' has a latitude of −90° to 90° and a longitude of −180° to 180°).

The polar orbital satellite can cover the entire Earth in several days (or in dozen days, depending on polar orbit difference), and thus is suitable for observation of the entire Earth. The weather satellite "NOAA" (Reference Literatures 3 and 4) configured to observe a high-latitude region at high accuracy has such a polar orbit, and the same place can be observed twice per day by using the satellite, and thus information observed by the satellite is utilized by Antarctica Showa Station and the like.

(Reference Literature 3): "Weather satellite center TOP>task outline>weather satellite center task>polar orbit weather satellite data reception", [online], [Sep. 13, 2018 search], the Internet <URL: https://www.data.jma.go.jp/mscweb/ja/general/polar.html>(Reference Literature 4): "NOAA satellite Antarctica Showa Station received data", [online], [Sep. 13, 2018 search], the Internet <URL: http://www.nipr.ac.jp/center/SATELLITE/noaa_data_j.html>

Figure 19:
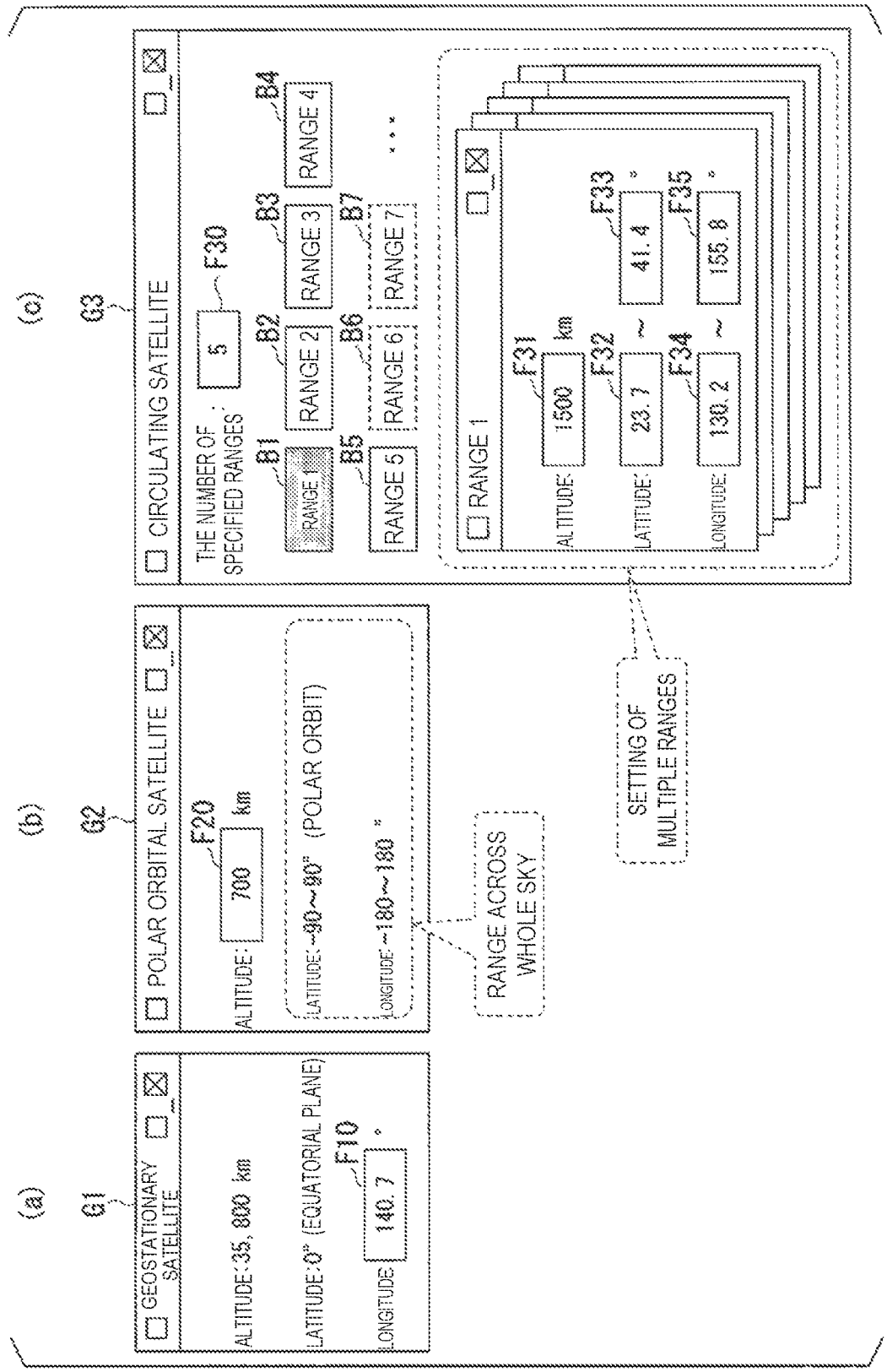
FIG. 19 is a diagram illustrating exemplary display of an input set screen according to the fourth embodiment.

FIG. 19 is a diagram illustrating exemplary display of an input set screen for setting calculation conditions for each satellite orbit. In the interference calculation processing illustrated in FIG. 17 described above, the orbit of a target satellite is divided into three kinds, and the interference amount is calculated by an interference calculation method in accordance with each kind. Input conditions needed for the interference calculation methods are different among the satellite orbits. Thus, a screen for inputting and setting the range of the satellite is prepared in accordance with each kind of satellite orbit. The drawing illustrates setting screens in accordance with the satellite orbits.

FIG. 19(a) illustrates an exemplary input setting screen for inputting settings of a geostationary satellite. The geostationary satellite can exist only at a fixed altitude (35,800 km) from the Earth on the equatorial plane (at the latitude of 0°). Thus, on an input setting screen G1 for the geostationary satellite, only a longitude is specified as information that specifies a satellite orbit by using Input Field F10.

FIG. 19(b) illustrates an exemplary input setting screen for inputting settings of a polar orbital satellite. In most cases of the polar orbital satellite (including the exemplary polar orbital satellite illustrated in FIG. 18(a) described above), the latitude at a position where the satellite exists changes in the range of −90° to 90° approximately, and the longitude is not fixed as well. Thus, on an input setting screen G2 for the polar orbital satellite, only the altitude is specified by using Input Field F20. After the specification, when the interference power estimation device 1b performs interference calculation, the longitude is set to be −180° to 180° like the latitude is set to be −90° to 90° to complete revolution around the Earth. Thus, interference of the polar orbital satellite with a radio station on the ground is calculated based on an assumption that "the position of the satellite is not limited to a range but the satellite can exist in the entire overhead space (the whole sky)".

FIG. 19(c) illustrates an exemplary input setting screen for inputting calculation conditions for a circulating satellite. Through this input setting screen G3 illustrated in the drawing, a plurality of ranges described in the first and second embodiments can be set. The plurality of ranges include the orbit of the circulating satellite. On the input setting screen G3 for the circulating satellite, first, the number of specified ranges is set and input through Input Field F30. "Range 1", "Range 2", "Range 3", . . . and their Selection Buttons B1, B2, B3, . . . become functional in accordance with the number n of specified ranges. In the example illustrated in FIG. 19(c), "5" is set and input as the number n of specified ranges, and thus Selection Buttons B1, B2, . . . , B5 of "Range 1", "Range 2", . . . , "Range 5" are selectable, and Selection Buttons B6 and B7 of "Range 6" and "Range 7" are not functional. Then, when selected on the input setting screen G3, Selection Button B1 of "Range 1" is highlighted unlike Selection Buttons B2, B3, . . . , B5 of "Range 2", "Range 3", . . . , "Range 5", and a setting screen G31 for setting Range 1 is displayed in front. On the setting screen G31 for "Range 1" displayed in front, the value of the altitude can be input and set through Input Field F31, a value indicating that the latitude ranges from "where" to "where" can be input and set through Input Fields F32 and F33, and a value indicating that the longitude ranges from "where" to "where" can be input and set through Input Fields F34 and F35. In the example of "Range 1" in FIG. 19(c), the altitude of 1500 km, the latitude of 23.7° to 41.4°, and the longitude of 130.2° to 155.8° are set. Similarly, for "Range 2" and the following, the altitude, the range of the latitude, and the range of the longitude can be input and set.

As described above, in the present embodiment, as illustrated in FIG. 17 described above, the interference power estimation device 1b switches and selects an interference calculation method for each satellite orbit. Thereafter, the interference power estimation device 1b displays a screen illustrated in FIG. 19 to allow the user to perform necessary inputting and setting in accordance with each satellite orbit. It is possible to efficiently perform highly accurate interference amount calculation and reduce the duration of the calculation by performing the processing flow illustrated in FIG. 17 and the interference calculation condition setting illustrated in FIG. 19.

Functions of the interference power estimation devices 1, 1a, and 1b in the above-described embodiments may be achieved by a computer. In this case, a computer program for achieving the functions may be recorded in a computer-readable recording medium, and the computer program recorded in the recording medium may be achieved through loading and execution on a computer system. The "computer system" includes an OS and hardware such as a peripheral instrument. The "computer-readable recording medium" is a portable medium such as a flexible disk, a magneto optical disc, a ROM, or a CD-ROM, or a storage device such as a hard disk built in the computer system. The "computer-readable recording medium" may include a medium that dynamically holds the computer program for a short time, such as a communication wire through which the computer program is transmitted through a network such as the Internet or a communication line such as a phone line, and a medium that holds the computer program for a certain time, such as a transitory memory inside the computer system as a server or a client in the transmission. The above-described computer program may achieve some of the above-described functions and may achieve the above-described functions in combination with a computer program already recorded in the computer system.

According to an above-described embodiment, an interference power estimation device includes a projection unit, a range acquisition unit, a range interference calculation unit, and a selection unit. The selection unit is, for example, the estimation result calculation unit 17, 17a, or 17b. The projection unit projects the orbit of a satellite onto a map representing the ground surface. The range acquisition unit determines a plurality of ranges on the map so that the projected orbit is included in the ranges. For example, each determined range is a rectangle smaller than a rectangle including the entire orbit projected onto the map and contacts other ranges. The altitude calculation unit calculates the altitude of the orbit of the satellite in each range. The range interference calculation unit calculates, for each of the ranges, the interference power between the satellite at a position determined by the latitude and longitude of the range and the altitude calculated for the range and a radio station installed on the ground surface. The selection unit selects, as an estimation result, the maximum value among the interference powers calculated for each of the ranges.

When the orbit is a circular orbit, the altitude in each range may be a constant altitude set in advance. When the orbit is an elliptical orbit, the altitude in the range onto which the orbit at the lowest altitude is projected may be the perigee altitude of the elliptical orbit, and the altitude in each of other ranges may be the lowest altitude on the orbit in the overhead space of the range.

The interference power estimation device may further include, for a multi-satellite system, a range combination unit configured to obtain one or more combinations of the ranges, in the overhead spaces of which a plurality of satellites exist at the same timing. The selection unit calculates, for each combination, the sum of the interference powers calculated by the range interference calculation unit for the ranges included in the combination and selects, as the estimation result, the maximum value among the interference power sums calculated for the respective combinations.

The interference power estimation device may further include a determination unit configured to determine the kind of the orbit. The determination unit is, for example, the satellite orbit form determination unit 31. When the orbit is determined to be of a geostationary satellite by the determination unit, the range interference calculation unit specifies the position of the satellite based on an arbitrarily set longitude and predetermined latitude and altitude of the geostationary satellite. The range interference calculation unit calculates the interference power between the satellite at the specified position and the radio station. The selection unit sets the calculated interference power as the estimation result. When the orbit is determined to be a polar orbit by the determination unit, the range interference calculation unit acquires a plurality of positions at which the satellite can be located across the whole sky based on an arbitrarily set altitude. The range interference calculation unit calculates the interference power between the satellite at each acquired position and the radio station, and selects the maximum value among the interference powers calculated for the respective positions. The selection unit sets the selected maximum value as the estimation result. When the orbit is determined to be the orbit of a circulating satellite other than the polar orbit by the determination unit, the above-described processing starting at the projection unit is performed.

The following describes terms related to the orbit of a satellite.

(1) "Geostationary Satellite (Orbit)"

The orbit of revolution at the speed of 3 km per second on a circular orbit at the altitude of 35,800 km approximately at the orbit tilt angle of 0°, in other words, in the overhead space of the equator. The satellite has a period of 24 hours approximately, which is same as the rotation period of the Earth, and thus appears constantly at rest when viewed from the ground. For this reason, the satellite is called "geostationary satellite". The geostationary satellite is widely used as a weather satellite and a broadcast satellite.

[Described in: Background Art, FIG. 20(*a*), the fourth embodiment, FIGS. 17 and 19]

(2) "Circulating Satellite (Orbit)"

Typically, a circulating satellite is a satellite that performs revolution around the Earth at low orbit not in accordance with the rotation period of the Earth. The circulating satellite typically has a revolution period of 1 to 10 hours approximately, an altitude of several hundreds km to 10,000 km, and a short satellite lifetime of three to five years approximately. The circulating satellite typically performs revolution at a distance closer than a geostationary orbit and thus has a transmission delay shorter than that of a geostationary satellite, and the distance to the satellite is close and thus the output of a terminal only needs to be small, which allows downsizing, portability, and use for mobile communication mainly. Since a satellite moves across the overhead space in a short time, a large number of satellites need to be simultaneously operated to ensure a communication possible time and cover a wide area. The large number of satellites have a low altitude orbit, an intermediate altitude orbit, and a long elliptical orbit. (Reference Literature 5)

[Described in: Background Art, FIG. 20(*b*), FIGS. 1 to 4 in the first embodiment (FIGS. 17 and 19 in the fourth embodiment)]

(Reference Literature 5): "Communication system useful knowledge manual TOP>geostationary satellite and circulating satellite", [online], [Sep. 13, 2018 search], the Internet <URL: http://www.frostburgfirst.org/cs/alien.html>

(3) "Synchronous Orbit"

A "synchronous orbit" is an orbit on which a satellite completes one revolution around the Earth in one day and returns to the overhead space of the original ground surface. The revolution period of the satellite is equal to the rotation period of the Earth. The geostationary orbit is a kind of the synchronous orbit, but the synchronous orbit is different from the geostationary orbit because the synchronous orbit is sometimes an elliptical orbit having an orbit tilt angle not limited to 0°. The synchronous orbit is suitable for observation and communication at high latitude regions on the Earth, which are difficult to cover with the geostationary orbit.

[Described in: Background Art, FIGS. 20(*a*) and (*b*), FIGS. 8 to 11 in the second embodiment]

(4) "Recurrent Orbit (Recurrent Satellite)"

A "recurrent orbit" is an orbit on which a satellite completes several revolutions around the overhead space of the Earth in 24 hours and returns to the overhead space of the original ground surface. The revolution period of the satellite is equal to integer division of the rotation period of the Earth, and the satellite of a long elliptical orbit having a perigee of 600 km approximately and an apogee of 40,000 km approximately has a period of 12 hours approximately and returns to the overhead space of an identical place twice in one day. A satellite on this orbit is suitable for communication and observation at high latitude regions.

[Described in: FIGS. 1 to 4 in the first embodiment, FIGS. 8 to 11 in the second embodiment]

(5) "Sub-Recurrent Orbit"

A "sub-recurrent orbit" is an orbit on which a satellite returns to the overhead space of the same place in several days, in other words, the satellite performs several revolutions around the Earth in one day and periodically returns to the overhead space directly above the original ground surface position in several days (or dozen days). The Earth observation satellite "Landsat" has a perigee of 680 km approximately, an apogee of 700 km approximately, and a period of 98.5 minutes, completes 15 revolutions around the Earth in one day, and returns to the overhead space of the original ground surface in 16 days.

In this case, the orbit is called a "sub-recurrent orbit of 16 recurrent days". The orbit is suitable for periodical observation of the Earth for a long duration.

[Described in: Background Art, FIG. 20(*b*)]

(6) "Polar Orbit (Polar Orbital Satellite)"

A "polar orbit" is an orbit on which a satellite performs revolution through the proximity of the overhead spaces at the North and South Poles and that has an orbit tilt angle equal or close to 90°. Since the Earth rotates while the satellite is performing revolution on the orbit, it is possible to cover the entire Earth including the North and South Poles in several days. Thus, the orbit is suitable for observation of the entire Earth, and a large number of Earth observation satellites are positioned on polar orbits or orbits close to polar orbits.

[Described in: FIG. 18 (FIGS. 17 and 19) in the fourth embodiment]

(7) "Sun Synchronous Orbit"

A sun synchronous orbit is an orbit on which the rotational direction of the orbital plane of a satellite and the period (rotation angle per day) thereof are equal to the revolution period (rotation angle per day) of the Earth. In other words, the sun synchronous orbit is an orbit on which the entire orbital plane of the satellite around the Earth completes one rotation per year and the orbital plane of the satellite and the direction to the Sun are constant. Such an orbit is possible only as the polar orbit, but the rotation of the satellite orbital plane does not occur to a complete polar orbit having an orbit tilt angle of 90°, and the rotation occurs in a direction same as that of the Earth in a case of the tilt angle larger than 90°. The orbit tilt angle changes with the orbit altitude of the satellite. For example, in a case of a circular orbit at the altitude of 800 km, a sun synchronous orbit is obtained by setting the tilt angle to be 98.4°. When the Earth is viewed from the satellite on the orbit, a sun light beam incident on the ground surface constantly has a fixed angle, and thus the orbit is suitable for the Earth observation under identical conditions.

[Described in: Background Art]

(8) "Elliptical Orbit"

When an artificial satellite flies on an orbit, a place at which the satellite is closest to the ground surface is called "perigee", and a place at which the satellite is farthest from the ground surface is called "apogee". Examples of orbits include a circular orbit, an elliptical orbit, and a polar orbit. The circular orbit is an orbit having no difference between the perigee and the apogee, and the orbit is longer elliptical as the difference is larger.

[Described in: FIGS. 8 to 11 in the second embodiment]
(9) "Circular Orbit"

A circular orbit is a satellite orbit having no difference between the perigee and the apogee. In a case of a geostationary satellite, the circular orbit is on the equatorial plane, has an altitude of 35,800 km, and completes revolution around the Earth in 24 hours like rotation of the Earth.

[Described in: Background Art, FIG. 20(a), FIG. 17 in the fourth embodiment]
(10) "Low-Earth-Orbit Satellite"

Typically, a low-earth-orbit satellite has an altitude of 600 km to 800 km approximately and completes revolution around the Earth in 90 to 100 minutes approximately. As an advantage in communication between the ground and the satellite, delay (20 msec to 30 msec; Reference Literature 6) lower than delay (150 msec) of an intermediate-earth-orbit satellite is possible. In addition, the super-low-earth-orbit satellite "Tsubame" has an altitude of 180 km to 300 km approximately, which is lower than that of the low-earth-orbit satellite, and can potentially increase observation accuracy while maintaining cost of observation instruments mounted thereon (Reference Literature 7).

[Described in: Background Art, FIG. 20(b)]

(Reference Literature 6): "Latest trend of satellite communication systems: Document of research and discussion taskforce related to satellite problems", [online], Jan. 31, 2017, Ministry of Internal Affairs and Communications, [Aug. 13, 2018 search], the Internet <URL: http://www.soumu.go.jp/main_content/000463131.pdf>(Reference Literature 7): "Super low altitude test satellite "Tsubame (SLATS)": Problem and expectation of super low altitude orbit", [online], Sorabatake, [Sep. 13, 2018 search], the Internet <URL: http://sorabatake.jp/gn_20171123>

(11) "Orbit Tilt Angle"

Flying of an artificial satellite has factors as follows, and the factors are referred to as "orbit factors" of the artificial satellite.

The four orbit factors are "perigee altitude" and "apogee altitude" indicating the distance to the ground surface, "orbit tilt angle" that is the angle between the orbital plane and the equatorial plane of the Earth, and "period" indicating the time of one revolution on an orbit. The satellite constantly flies in the overhead space above the equator when the orbit tilt angle is 0°, and performs revolution around the Earth further in the north-south direction as the angle is larger. When the angle is 90°, the orbit is a "polar orbit" that passes through the overhead spaces of the North and South Poles of the Earth.

[Described in: The second embodiment]
(12) "Orbital Plane"

An artificial satellite moves in one fixed plane. This plane is called an "orbital plane", and the orbital plane of a satellite orbit around the Earth always includes the center of the Earth irrespective of altitude and circle/ellipse difference (Reference Literature 8). The speed of a circulating satellite is faster than the "first cosmic speed" of 7.9 km per second, which is necessary for revolution on the Earth surface, and is slower than the "second cosmic speed" of 11.2 km per second, which is necessary for escaping from the gravitational force of the Earth.

[Described in: FIG. 1 in the first embodiment, FIG. 18 in the fourth embodiment]

(Reference Literature 8): "What is "orbit" ?", [online], [Sep. 13, 2018 search], JAXA Space Information Center, the Internet CURL: http://spaceinfo.jaxa.jp/ja/orbit.html>
(13) "Quasi-Zenith Satellite"

A quasi-zenith satellite is an artificial satellite having an orbit passing through substantially the zenith of (position directly above) the Japanese archipelago. The Japanese positioning satellite "Michibiki", which is related to GPS complement and reinforcement, is a quasi-zenith orbit. The orbit of "Michibiki" is a synchronous orbit that has an orbital plane tilt angle of 40° approximately and completes revolution around the Earth in one day or 24 hours like rotation of the Earth, or a recurrent orbit that returns to the original position in one day. The altitude thereof is 32,000 km to 40,000 km approximately.

[Described in: FIGS. 8 and 9 in the second embodiment, FIGS. 14 and 15 in the third embodiment]
(14) "Perigee Altitude"

When an artificial satellite flies on an orbit, a place at which the satellite is closest to the ground surface is called "perigee". The height (altitude) from the satellite to the Earth surface at the "perigee" is called perigee altitude.

[Described in: Background Art, FIG. 20(b), FIG. 4(a) in the first embodiment, FIGS. 8(a) and 9(a) in the second embodiment]
(15) "Apogee Altitude"

When an artificial satellite flies on an orbit, a place at which the satellite is farthest from the ground surface unlike "perigee" is called "apogee". The height (altitude) from the satellite to the Earth surface at the "apogee" is called apogee altitude.

[Described in: Background Art, FIG. 20(b), FIG. 4(a) in the first embodiment, FIGS. 8(a) and 9(a) in the second embodiment]

Although the embodiments of the present invention are described above in detail with reference to the accompanying drawings, specific configurations are not limited to the present embodiment, but designing and the like in a range not departing from the scope of the present invention are included as well.

REFERENCE SIGNS LIST 1, 1a, 1b interference power estimation device
11 input unit
12 projection unit
13 range acquisition unit
14 altitude calculation unit
15 range repetitive processing unit
16 range interference calculation unit
17, 17a, 17b estimation result calculation unit
21 multi-satellite system determination unit
22 range combination unit
31 satellite orbit form determination unit
102 repetitive processing unit
103 inter-station vector calculation unit
104 visibility determination unit
105 antenna-directional-vector calculation unit
106 interference-receiving-station antenna directionality determination unit
107 first angle derivation unit
108 direction decomposition unit
109 second angle derivation unit
110 sum calculation unit
111 minimum value calculation unit
112 interference power calculation unit

The invention claimed is:
1. An interference power estimation method comprising:
a projection step of projecting an orbit of a satellite onto a map representing a ground surface;
a range acquisition step of determining a plurality of ranges on the map so that the projected orbit is included in the ranges;

an altitude calculation step of calculating an altitude of the orbit in each of the ranges;

a range interference calculation step of calculating, for each of the ranges, an interference power between the satellite at a position determined by a latitude and a longitude of the range and the altitude calculated for the range and a radio station installed on the ground surface; and a selection step of selecting a maximum value among the interference powers calculated for each of the ranges, where the maximum value is an estimation of amount of interference between the satellite and the radio station.

2. The interference power estimation method according to claim 1, wherein at the altitude calculation step, when the orbit is a circular orbit, the altitude in each of the ranges is a constant altitude set in advance, and when the orbit is an elliptical orbit, the altitude in the range onto which the orbit at a lowest altitude is projected is a perigee altitude of the elliptical orbit, and the altitude in each of other ranges is a lowest altitude on the orbit in an overhead space of the range.

3. The interference power estimation method according to claim 1, further comprising a range combination step of obtaining one or more combinations of the ranges, in overhead spaces of which a plurality of the satellites exist at the same timing, wherein the selection step calculates, for each combination, a sum of the interference powers calculated for the ranges included in the combination and selects, as the estimation result, a maximum value among the sums calculated for the respective combinations.

4. The interference power estimation method according to claim 1, further comprising:

a determination step of determining a kind of the orbit;

a first estimation result calculation step of specifying, when the orbit is determined to be of a geostationary satellite at the determination step, a position of the satellite based on an arbitrarily set longitude and predetermined latitude and altitude of the geostationary satellite and calculating, as the estimation result, an interference power between the satellite at the specified position and the radio station;

a second estimation result calculation step of acquiring, when the orbit is determined to be a polar orbit at the determination step, a plurality of possible positions for the satellite in sky based on an arbitrarily set altitude, calculating an interference power between the satellite at each acquired position and the radio station, and setting, as the estimation result, a maximum value among the interference powers calculated for the respective positions; and a third estimation result calculation step of performing the projection step, the range acquisition step, the altitude calculation step, the range interference calculation step, and the selection step when the orbit is an orbit of a circulating satellite other than a polar orbital satellite.

5. The interference power estimation method according to claim 1, wherein each range determined at the range acquisition step is a rectangle smaller than a rectangle including the entire orbit projected onto the map and contacts other ranges.

6. A non-transitory computer-readable medium having computer-executable instructions that, upon execution of the instructions by a processor of a computer, cause the computer to function as the interference power estimation method according to claim 1.

7. An interference power estimation device comprising:

a processor; and a non-transitory storage medium having computer program instructions stored thereon, when executed by the processor, perform to:

project an orbit of a satellite onto a map representing a ground surface;

determine a plurality of ranges on the map so that the projected orbit is included in the ranges;

calculate an altitude of the orbit in each of the ranges;

calculate, for each of the ranges, interference power between the satellite at a position determined by a latitude and a longitude of the range and the altitude calculated for the range and a radio station installed on the ground surface; and select a maximum value among the interference powers calculated for each of the ranges, where the maximum value is an estimation of amount of interference between the satellite and the radio station.

8. The interference power estimation device of claim 7 wherein when the orbit is a circular orbit, the altitude in each of the ranges is a constant altitude set in advance, and when the orbit is an elliptical orbit, the altitude in the range onto which the orbit at a lowest altitude is projected is a perigee altitude of the elliptical orbit, and the altitude in each of other ranges is a lowest altitude on the orbit in an overhead space of the range.

9. The interference power estimation device of claim 7 wherein the computer program instructions further perform to obtain one or more combinations of the ranges, in overhead spaces of which a plurality of the satellites exist at the same timing, calculates, for each combination, a sum of the interference powers calculated for the ranges included in the combination and selects a maximum value among the sums calculated for the respective combinations.

10. The interference power estimation device of claim 7 wherein the computer program instructions further perform to determine a kind of the orbit;

specify, when the orbit is determined to be of a geostationary satellite, a position of the satellite based on an arbitrarily set longitude and predetermined latitude and altitude of the geostationary satellite; and calculate an interference power between the satellite at the specified position and the radio station; and acquire, when the orbit is determined to be a polar orbit at the determination step, a plurality of positions at which the satellite can be located across whole sky based on an arbitrarily set altitude, calculate an interference power between the satellite at each acquired position and the radio station, and set a maximum value among the interference powers calculated for the respective positions.

11. The interference power estimation device of claim 7 wherein each range determined is a rectangle smaller than a rectangle including the entire orbit projected onto the map and contacts other ranges.

* * * * *